United States Patent
Lind

(10) Patent No.: US 11,824,430 B2
(45) Date of Patent: Nov. 21, 2023

(54) METHOD AND APPARATUS FOR SENSING THE INPUT VOLTAGE OF A POWER CONVERTER

(71) Applicant: NexGen Power Systems, Inc., Santa Clara, CA (US)

(72) Inventor: Anders Lind, San Juan Capistrano, CA (US)

(73) Assignee: Nexgen Power Systems, Inc., Santa Clara, CA (US)

( * ) Notice: Subject to any disclaimer, the term of this patent is extended or adjusted under 35 U.S.C. 154(b) by 0 days.

(21) Appl. No.: 17/524,136

(22) Filed: Nov. 11, 2021

(65) Prior Publication Data

US 2022/0158539 A1 May 19, 2022

Related U.S. Application Data

(60) Provisional application No. 63/114,139, filed on Nov. 16, 2020.

(51) Int. Cl.

| | |
|---|---|
| *H02M 1/42* | (2007.01) |
| *H02M 3/158* | (2006.01) |
| *H02M 1/32* | (2007.01) |
| *H02M 1/08* | (2006.01) |

(Continued)

(52) U.S. Cl.
CPC ....... *H02M 3/1588* (2013.01); *H02M 1/0009* (2021.05); *H02M 1/083* (2013.01); *H02M 1/32* (2013.01); *H02M 1/4225* (2013.01); *H02M 7/219* (2013.01); *H02M 1/4233* (2013.01)

(58) Field of Classification Search
CPC ............. H02M 1/0003; H02M 1/0009; H02M 1/0022; H02M 1/08; H02M 1/083; H02M 1/088; H02M 1/14; H02M 1/32; H02M 1/38; H02M 1/42; H02M 1/4208; H02M 1/4225; H02M 1/4233; H02M 7/12;

(Continued)

(56) References Cited

U.S. PATENT DOCUMENTS

| | | |
|---|---|---|
| 7,598,715 B1 | 10/2009 | Hariman et al. |
| 7,706,151 B2 | 4/2010 | Neidorff et al. |
| 8,077,490 B1 | 12/2011 | Prodic et al. |

(Continued)

OTHER PUBLICATIONS

U.S. Appl. No. 17/524,117, "Notice of Allowance", dated May 12, 2023, 11 pages.

(Continued)

*Primary Examiner* — Thienvu V Tran
*Assistant Examiner* — Shahzeb K Ahmad
(74) *Attorney, Agent, or Firm* — Kilpatrick Townsend & Stockton LLP

(57) ABSTRACT

A method of measuring an AC input voltage at an input of a power converter includes measuring a DC bus voltage corresponding to the power converter. During a positive half-cycle of the AC input voltage, the method includes measuring a first voltage at the input of the power converter. During a negative half-cycle of the AC input voltage, the method includes turning on a high-side switch, measuring a second voltage at the input of the power converter, and computing a third voltage equal to the second voltage minus the DC bus voltage. The method further includes providing the AC input voltage as the first voltage during the positive AC half-cycle and the third voltage during the negative AC half-cycle.

7 Claims, 32 Drawing Sheets

(51) Int. Cl.
*H02M 7/219* (2006.01)
*H02M 1/00* (2006.01)

(58) Field of Classification Search
CPC ........ H02M 7/155; H02M 7/21; H02M 7/217; H02M 7/219; H02M 3/1588
See application file for complete search history.

(56) References Cited

U.S. PATENT DOCUMENTS

| | | | |
|---|---|---|---|
| 8,493,049 | B2 | 7/2013 | Kwan et al. |
| 8,670,255 | B2 | 3/2014 | Gong et al. |
| 8,934,273 | B2 * | 1/2015 | Chalermboon ..... H02M 1/4208 323/207 |
| 10,439,508 | B2 | 10/2019 | Adragna |
| 10,720,829 | B1 * | 7/2020 | Huang .................. H02M 7/162 |
| 2011/0317459 | A1 | 12/2011 | Kuebrich et al. |
| 2016/0190912 | A1 * | 6/2016 | Lim .................... H02M 1/4225 363/84 |
| 2016/0241132 | A1 * | 8/2016 | Lin ...................... H02M 1/4225 |
| 2019/0319528 | A1 * | 10/2019 | Matsuura ............. H02M 7/217 |
| 2020/0112243 | A1 * | 4/2020 | Dusmez ............. H02M 1/4208 |
| 2021/0305907 | A1 | 9/2021 | Dong et al. |

OTHER PUBLICATIONS

U.S. Appl. No. 17/524,064, "Non-Final Office Action", dated Jun. 14, 2023, 9 pages.
U.S. Appl. No. 17/524,064, "Notice of Allowance", dated Sep. 27, 2023, 8 pages.
U.S. Appl. No. 17/524,067, "Non-Final Office Action", dated Aug. 22, 2023, 17 pages.

* cited by examiner

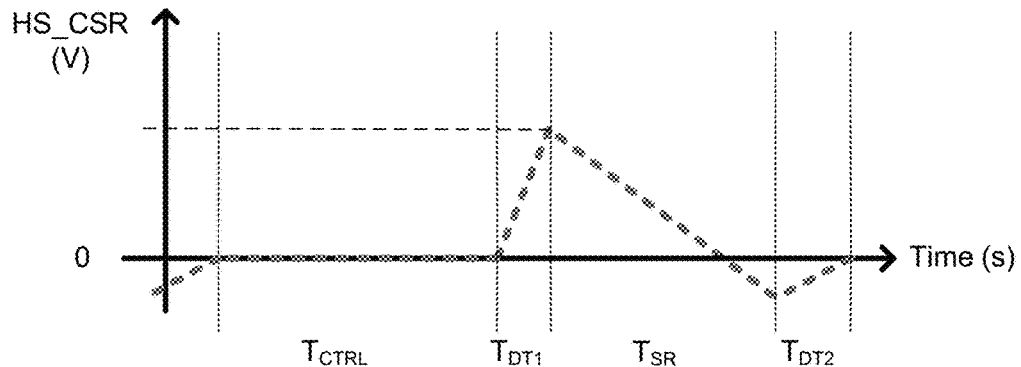
FIG. 10B
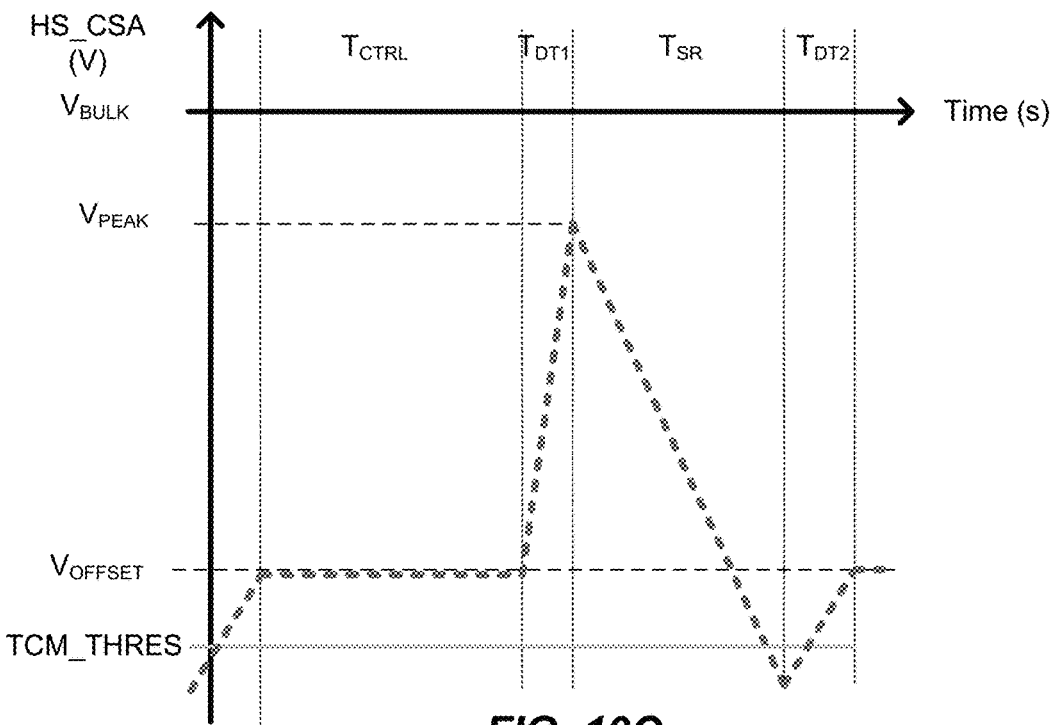
FIG. 10C
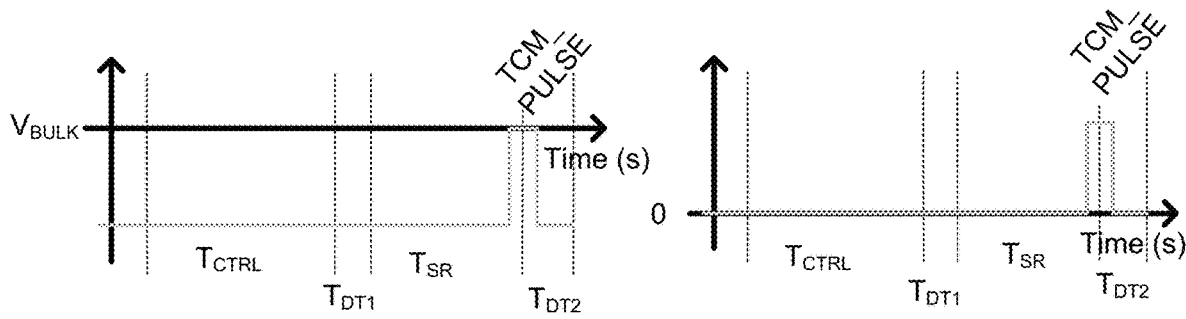
FIG. 10D        FIG. 10E

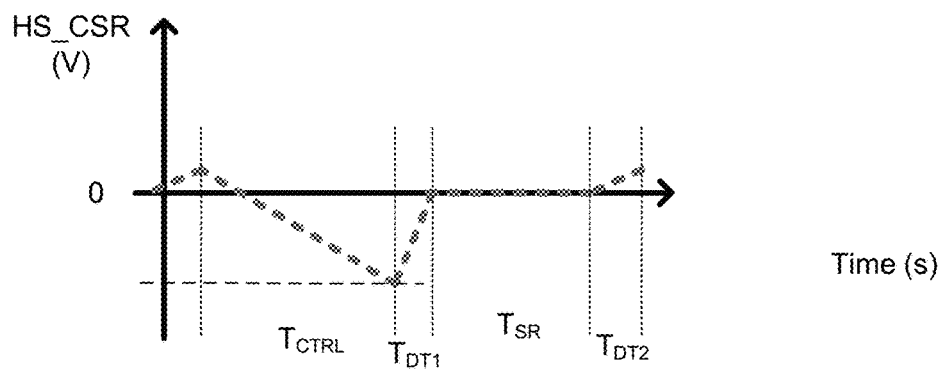
FIG. 13B
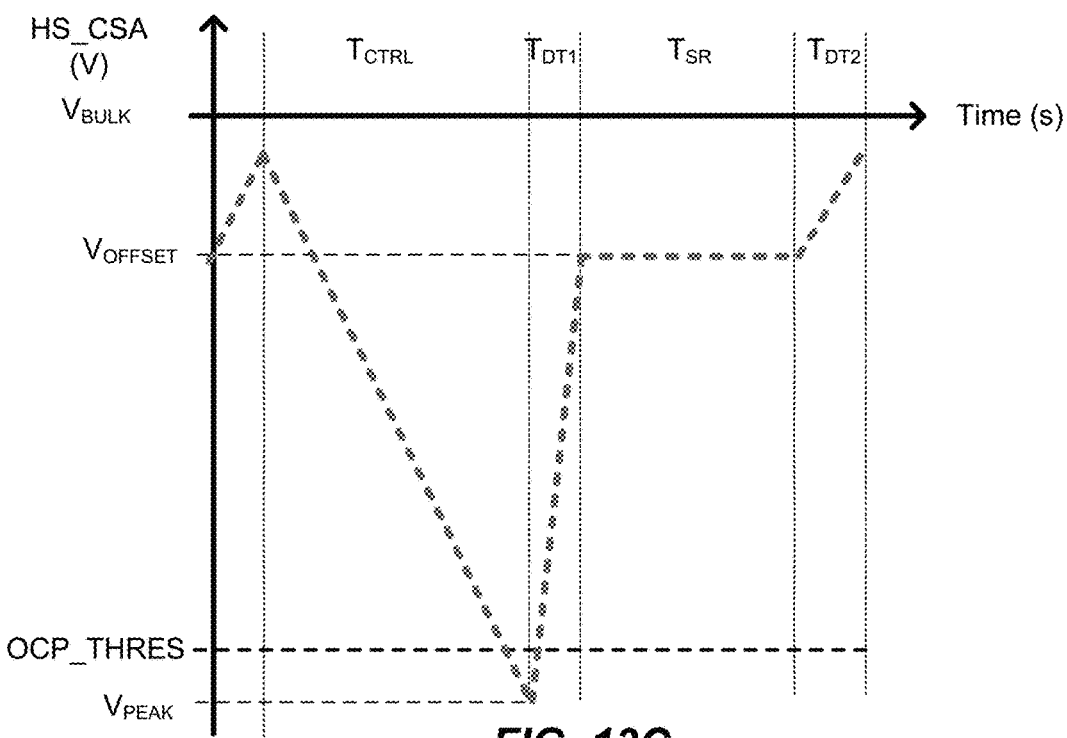
FIG. 13C
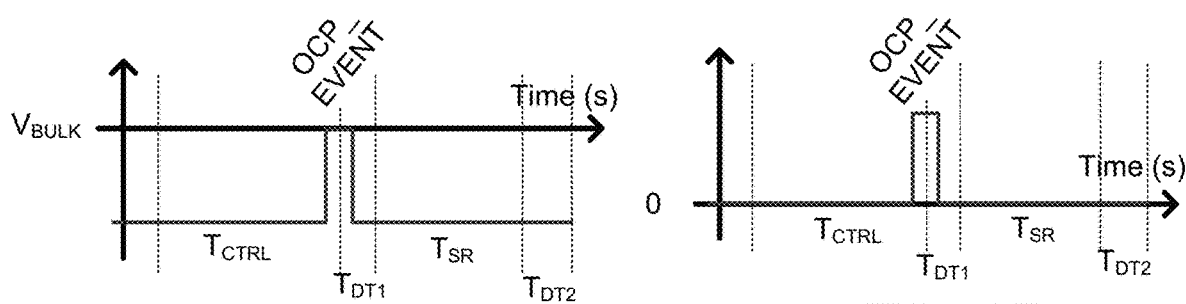
FIG. 13D  FIG. 13E

METHOD AND APPARATUS FOR SENSING THE INPUT VOLTAGE OF A POWER CONVERTER

CROSS-REFERENCES TO RELATED APPLICATIONS

This application claims the benefit of U.S. Provisional Application No. 63/114,139, filed on Nov. 16, 2020, the contents of which is hereby incorporated by reference in its entirety for all purposes.

The following regular U.S. patent applications (including this one) are being filed concurrently, and the entire disclosure of the other applications is incorporated by reference into this application for all purposes:

Application Ser. No. 17/524,030, entitled "Nonlinear, Discrete Time Control of Power Factor Correction Power Converter;"

Application Ser. No. 17/524,064, entitled "Method and System for Controlling the Power Factor of a Power Converter;"

Application Ser. No. 17/524,067, entitled "Method and System for Entering and Exiting a Frequency Clamp Mode for Variable Frequency, Offline Switch-Mode Power Converters;"

Application Ser. No. 17/524,117, entitled "Method and Apparatus for Digital, Closed-Loop Control of CRCM Switch-Mode Power Converters;"

Application Ser. No. 17/524,126, entitled "Method and Apparatus for Over-Current Protection and CRCM Control in Power Converters;" and Application Ser. No. 17/524,136, entitled "Method and Apparatus for Sensing the Input Voltage of a Power Converter."

BACKGROUND OF THE INVENTION

A boost power converter operates in a Critical Conduction Mode (CrCM) by charging an inductor from 0 A to a peak current via an input source voltage, and then discharging the inductor into an output capacitor. The peak inductor current is regulated such that an average input power is approximately equal to an average output power. For providing a large output power, a large peak inductor current has to flow through the inductor into the output capacitor.

Despite the progress made in the area of boost power converters, there is a need in the art for improved methods and systems related to boost power converters.

SUMMARY OF THE INVENTION

The present invention generally relates to the field of electronics, and more specifically to devices and methods for controlling a switching power converter. Embodiments of the invention provide voltage and current regulating converters with power factor correction.

Numerous benefits are achieved by way of the present disclosure over conventional techniques. For example, embodiments of the present disclosure provide a power factor correction circuit that prevents over-current conditions while enabling operation in CrCM mode. Additionally, embodiments of the present invention provide higher switching frequencies than available using conventional techniques. These and other embodiments of the disclosure, along with many of its advantages and features, are described in more detail in conjunction with the text below and corresponding figures.

Embodiments of the present invention provide the following apparatuses and methods:

An apparatus (e.g., implemented as a circuit) to sense high bandwidth bidirectional inductor current in a totem-pole converter (e.g., a bridgeless totem-pole boost PFC converter) using current-sense resistor based per-switch, current-sensing.

An apparatus (e.g., implemented as a circuit) to compare sensed inductor current against a reference via a comparator, which can utilize a programmable DAC reference. The inductor current is compared against a 'CrCM' threshold in one AC half-cycle of a switching cycle. The threshold can be set to 0 A or a negative current in some embodiments. In the other AC half-cycle, the inductor current is compared to an over-current protection (OCP) level threshold. The "positive" and "negative" peak inductor current thresholds are single-ended, meaning that a positive reference in both cases gives rise to a "CrCM" or "OCP" compare value of the inductor current depending on input voltage polarity.

An apparatus (e.g., implemented as a circuit) to rescale a DAC reference FS range to a given level depending on system input voltage polarity.

An apparatus (e.g., implemented as a circuit) to re-reference a 'ground' DAC reference, for example, referenced to bulk-capacitor 'negative' electrode, to a bulk voltage, also referred to as a DC bus voltage. The bulk voltage can also be referred to as the output voltage. The DAC reference can be a bulk capacitor 'positive' electrode. In some embodiments, re-referencing is achieved via a current-mirror. Thus, embodiments of the present invention are able to detect "CrCM" or "OCP" in the 'high-side' switch of a totem-pole switching converter.

An apparatus (e.g., implemented as a circuit) to re-reference a comparator edge/pulse, which can indicate either "CrCM" or "OCP", from a bulk-capacitor 'positive' electrode to the bulk-capacitor 'negative' electrode.

A method and apparatus (e.g., implemented as a circuit) to provide Over-Current Protection, also referred to as an over-current indication, in one AC half-cycle for a specific switch, and CrCM indication for the complementary switch in the totem-pole switching converter, with the roles and functions of the switches 'swapped' during the other AC half-cycle in which the voltage polarity is opposite to the voltage polarity in the one AC half-cycle.

An apparatus (e.g., implemented as a circuit or a microprocessor) to count comparator triggers and switching periods and compare the counts to each other.

An apparatus (e.g., implemented as a circuit, a microprocessor, or a firmware algorithm) to modify the synchronous rectifier conduction time based on the pulse count comparison between triangular current mode pulses and pulses corresponding to the switching cycle.

A fully digital, discrete-time-only control system, which controls the 'anchor' of an inductor current against a reference by increasing or decreasing an SR conduction time based on pulse counting and comparison with a number of switching cycles in a "constant on-time" CrCM totem-pole switching converter (e.g., a PFC boost converter).

A method and apparatus that enables high switching frequency with controllable current control to 'anchor' the inductor current to a selected value, for example, a value programmable by a DAC reference or other reference, thereby facilitating "CrCM" control of a PFC circuit, for example, a bridgeless totem-pole boost PFC converted operating under the "constant on-time" principle.

An interleaving method that relies on timing for a single set of pulse width modulate values that is 'copied' and phase-shifted to multiple phases to ensure desired current sharing between phases.

An interleaving method that generates a single set of pulse width modulation values based on inputs from multiple phases.

An interleaving method that uses a "pulse-counting" strategy to ensure CrCM for all phases, resulting in no phase operating in a CrCM/hard-switching mode. This interleaving method generates a "worst-case" SR switching time corresponding to the pulse width of the synchronous rectifier switch signal ($T_{SR}$) that is long enough to ensure CrCM for the worst-case phase.

The system can combine (i.e., OR together) the switching cycle counter pulses from all phases, and combine (i.e., OR together) the TCM indication pulses from all phases and compare these two counts. As an example, 3 counts per switching cycle can be used for three phases, compared to 1 count per switching cycle for a single phase, and 3 TCM indication pulses can be used for three phases. In this case, the comparison between the number of switching cycles for all three phases and the number of TCM indication pulses for all three phases indicates that $T_{SR}$ is "long enough" for all three phases.

The system has Over-Current condition indicated per-phase and can truncate $T_{CTRL}$ on a per-phase basis while not changing the 'copied' pulse width modulation values on the other phases when truncating that of one phase.

The system can implement phase-shedding in an organic manner due to the OR'ing action of the pulse counters.

In some embodiments, the system will only enable/disable phases during an AC zero crossing.

The system can scale the inductor charging time during AC zero crossings if a phase was enabled/disabled during that AC zero crossing. For example, if a two-phase system enables the $2^{nd}$ phase, the inductor charging time may be halved to maintain the same (i.e., constant) power from the previous AC half-cycle to the next AC half-cycle. Thus, the processed input power can be scaled to represent the total power instead of the power-per-phase.

BRIEF DESCRIPTION OF THE DRAWINGS

FIG. 10B is a simplified plot of the voltage across the high-side current sense resistor during the positive AC half-cycle according to an embodiment of the present invention.

FIG. 10C is a simplified plot of the output of the high-side current sense amplifier during the positive AC half-cycle according to an embodiment of the present invention.

FIG. 10D is a simplified plot of the output of the high-side comparator 1024 according to an embodiment of the present invention.

FIG. 10E is a simplified plot of the TCM pulse after it is re-referenced using the high-side to low-side level shift circuit 1025.

FIG. 13B is a simplified plot of the voltage across the high-side current sense resistor during the negative AC half-cycle according to an embodiment of the present invention.

FIG. 13C is a simplified plot of the output of the high-side current sense amplifier during the negative AC half-cycle according to an embodiment of the present invention.

FIG. 13D is a simplified plot of the output of the high-side comparator according to an embodiment of the present invention.

FIG. 13E is a simplified plot of the OCP pulse after it is re-referenced using the high-side to low-side level shift circuit 1325.

DETAILED DESCRIPTION OF THE INVENTION

The boost converter, when operated in the Critical Conduction (CrCM) mode operates by charging an inductor from 0 A to a peak current via the input voltage (source), and then discharging the inductor into the output capacitor. The inductor peak current is regulated such that average input power is approximately equal to average output power. For a greater output power (load current), the inductor is charged to a greater peak current.

The input current, ignoring switching frequency ripple, for a converter with a Power Factor near 1 (i.e., a Power Factor Correcting (PFC) converter), must be similar in shape and phase to the (AC) input voltage. The CrCM PFC inductor is thus charged to a peak value that roughly follows the input voltage (i.e., shape and phase). The time it takes to charge the inductor to the target peak current is a function of input voltage, inductance value, which can be assumed to be constant, and target peak current. Since the target peak current changes over the rectified AC cycle, referred to as an AC half-cycle, according to input voltage, the net-result is an unchanging inductor charging time.

An 'outer' voltage loop controls the inductor charging time corresponding to the pulse width of the control switch signal ($T_{CTRL}$) at a loop bandwidth lower than the AC frequency (such that $T_{CTRL}$ remains substantially constant across the (rectified) AC (half-)cycle) to regulate the output voltage, which is substantially DC, but with some rectified AC voltage ripple, to the desired level.

An 'inner' current loop ensures the CrCM nature of the converter in which the switching frequency or off-time corresponding to the pulse width of the SR switch signal ($T_{SR}$) is controlled to start the next switching cycle exactly at the time when inductor is fully demagnetized.

Figure 1:
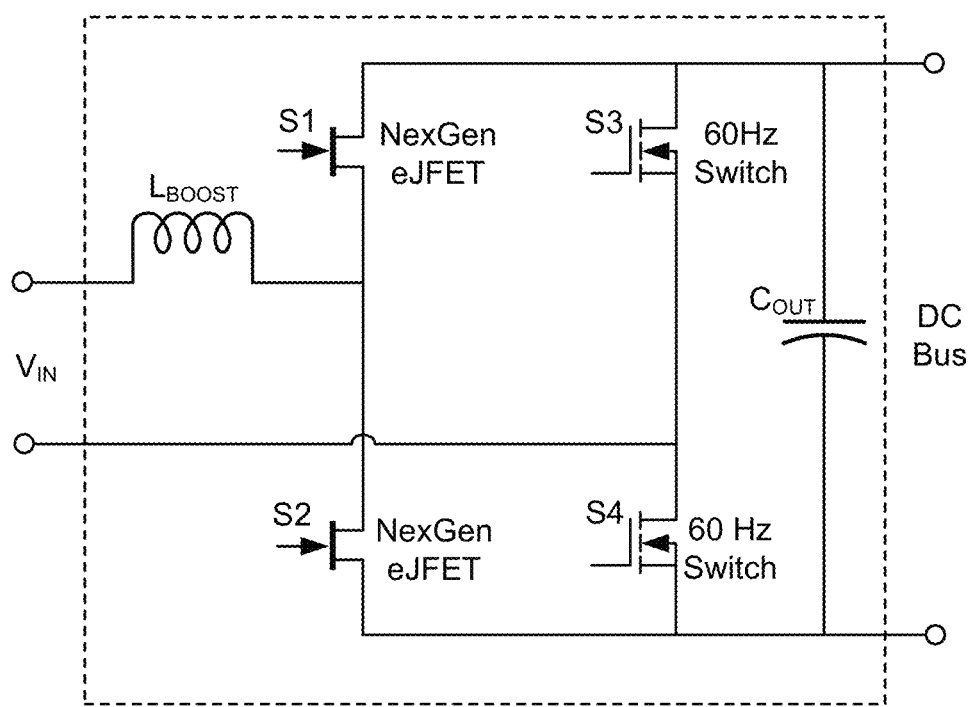
FIG. 1 is a simplified schematic diagram of a bridgeless totem-pole power factor converter operated in the critical conduction mode that can be utilized for explaining embodiments of the present disclosure.

FIG. 1 is a simplified schematic diagram of a bridgeless totem-pole power factor power converter 100, also referred to as a converter, operated in the critical conduction mode that can be utilized for explaining embodiments of the present disclosure. Converter 100 receives a cyclically varying input voltage $V_{IN}$ (e.g., an alternating current (AC) power supply from an electrical outlet or wall socket), and includes a boost inductor $L_{BOOST}$, a first switch S1, a second switch S2, a third switch S3, a fourth switch S4, and a capacitor COUT. In one embodiment, each of first switch S1 and second switch S2 is an enhanced mode junction field effect transistor (eJFET), such as the eJFET NXG2EA070R170 available from NexGen Power Systems, Inc. In some operational modes, during the positive AC half-cycle of the cyclically varying input voltage $V_{IN}$, fourth switch S4 is turned on and third switch S3 is turned off for the entire positive AC half-cycle. During the negative AC half-cycle of the cyclically varying input voltage $V_{IN}$, third switch S3 is turned on and fourth switch S4 is turned off for the entire negative AC half-cycle.

For purposes of clarity, first switch S1, second switch S2, third switch S3, and fourth switch S4 are referred to as switches since they function in either an ON or OFF state. A variety of electronic devices can be utilized to implement these switches, including a variety of transistors, e.g., BJT, IGBT, MOSFET, JFET, etc., diodes, silicon controlled rectifiers, and the like. Referring to FIG. 1, first switch S1 and second switch S1 are "high frequency" (HF) switches, operating, for example, over a range of frequencies from tens of kilohertz through megahertz. Third switch S3 and fourth switch S4 are "low frequency" (LF) switches, operating, for example, at AC frequencies of ~50-60 Hz.

In addition to referencing first switch S1 and second switch S2 as being in the high frequency leg and third switch S3 and fourth switch S4 as being in the low frequency leg, these switches can also be referenced in terms of their position in the schematic diagram illustrated in FIG. 1. First switch S1 and third switch S3 are positioned on the "high-side" (HS) and second switch S2 and fourth switch S4 are positioned on the "low-side" (LS) of the schematic diagram.

Thus, the four switches can be referenced as follows:
S1: high-frequency, high-side switch
S2: high-frequency, low-side switch
S3: low-frequency, high-side switch
S4: low-frequency, low-side switch As described more fully herein, the functions that first switch S1 and second switch S2 serve during operation depend on the polarity of the half-cycle of the AC input signal. During the positive half-cycle of the AC input signal: S4 (LF, LS switch) is ON; S2 (HF, LS switch) serves as the control (CTRL) switch and the current through S2 is monitored for over-current protection (OCP); and S1 (HF, HS switch) serves as the synchronous rectifier (SR) switch and the current through S1 is monitored for Triangular Current Mode (TCM) control. During the negative half-cycle of the AC input signal: S3 (LF, HS switch) is ON; S1 (HF, HS switch) serves as the CTRL switch and the current through S1 is monitored for OCP; and S2 (HF, LS switch) serves as the SR switch and the current through S2 is monitored for TCM control.

Figure 2:
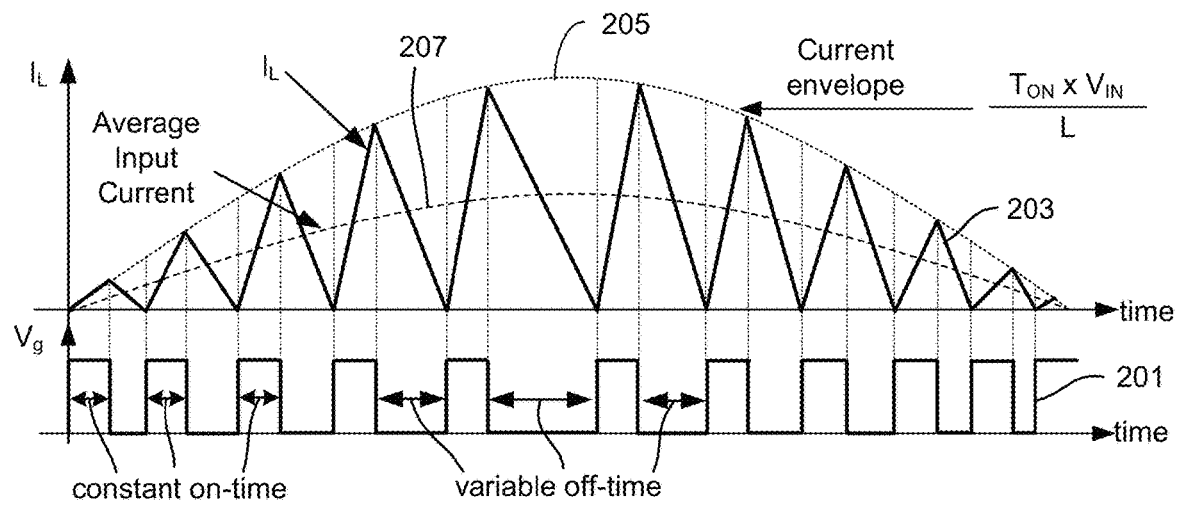
FIG. 2 shows a set of plots illustrating a low switching frequency operation of a power converter circuit (e.g., a CrCM boost converter) with a "constant on-time" control that can be utilized for explaining embodiments of the present disclosure.

FIG. 2 shows a set of plots illustrating a low switching frequency operation of a power converter circuit (e.g., a CrCM boost converter) with a "constant on-time" control that can be utilized for explaining embodiments of the present disclosure. Referring to FIG. 2, curve 201 denotes constant on-time control signals having variable off-time intervals, which are configured to turn on and turn off second switch S2. Curve 203 denotes an inductor current flowing through the boost inductor $L_{BOOST}$. Curve 205 (dotted line) denotes a current envelope during an AC half-cycle. Curve 207 (dashed line) denotes an average input current. As illustrated in FIG. 2, the on-time is represented by Vg being at its "high" level, while the off-time is represented by Vg being at its "low" level. The on-time is constant during the AC half-cycle, with the off-time varying, i.e. increasing near the center of the AC half-cycle.

As shown in FIG. 2, the inductor current (curve 203) is a function of the input signal and has a small peak amplitude value in the vicinity of the zero-crossing point of the input signal. When second switch S2 is turned off after the on-time interval expires, the energy stored in the inductor is discharged, i.e., the inductor current is sloped down back to zero. Second switch S2 is then turned on again, with the inductor current reaching a higher peak amplitude value, so that the time utilized for the inductor current to go back to zero being longer because it starts from a higher peak amplitude value. Each of the on-time control signals has a time period ($T_{ON}+T_{OFF}$), where $T_{ON}$ is the constant on-time interval and $T_{OFF}$ is the variable off-time interval. The periods of the on-time control signals increase as the input signal $V_{IN}$ increases due to the fact that the inductor current decreases at the rate equal to $(V_{BUS}-V_{IN})/L$, where $V_{BUS}$ and L are constant and $V_{IN}$ increases. In other words, the switching frequency, which is equal to $1/(T_{ON}+T_{OFF})$, has a minimum frequency value at the center point of the input signal (i.e., at the peak amplitude) and a maximum frequency value at both ends of the input signal (i.e., in the vicinity of the zero-crossing points).

The resulting average inductor current $I_L$ is similar in shape and phase to the input voltage (not shown). The current envelope represented by curve 205 is guided by a multiplier on the input voltage, and thus has the same shape and phase as the input voltage, while the amplitude is programmed by the outer loop. So long as the CrCM mode is maintained, the inductor current $I_L$ reaches exactly to 0 A and does not linger there before Vg goes high. Thus, the conventional, constant on-time ensures PFC functionality with the inductor current reaching zero before each on-time and not becoming negative before each on-time. As described more fully below, embodiments of the present invention enable the inductor current to become negative (also known as TCM control) before the on-time to provide benefits not available using conventional techniques. Accordingly, embodiments of the present invention enable CrCM operation using TCM control.

Figure 3:
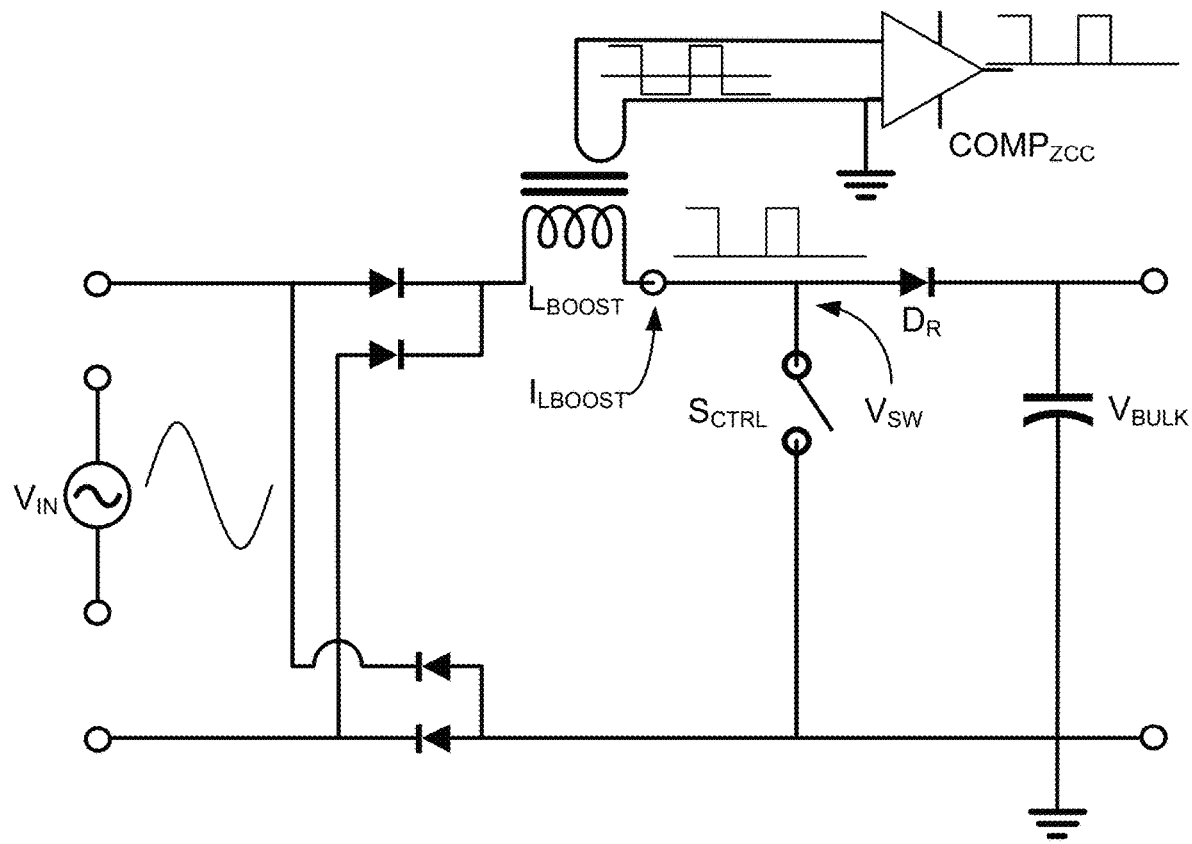
FIG. 3 is simplified schematic diagram illustrating a conventional CrCM control scheme.

FIG. 3 is simplified schematic diagram illustrating a conventional CrCM control scheme. As illustrated in FIG. 3, exactly upon demagnetization ($I_{LBOOST}$ current reaches 0 A), the diode ($D_R$) becomes reverse biased, and the switch-node starts going from being equal to $V_{BULK}$ to a low voltage. The switch-node rings (i.e., in a sinusoidal shape) symmetrically around the input voltage with a frequency depending on $L_{BOOST}$ and the switch output capacitance. As an example, for $V_{IN}$=200 V and $V_{BULK}$=400 V, $L_{BOOST}$=17.5 pH, and $C_{OSS}$=22.8 pF. As explained more fully below, embodiments of the present invention utilize a switch, with controlled timing, in place of diode $D_R$ to achieve higher efficiency.

Figure 4:
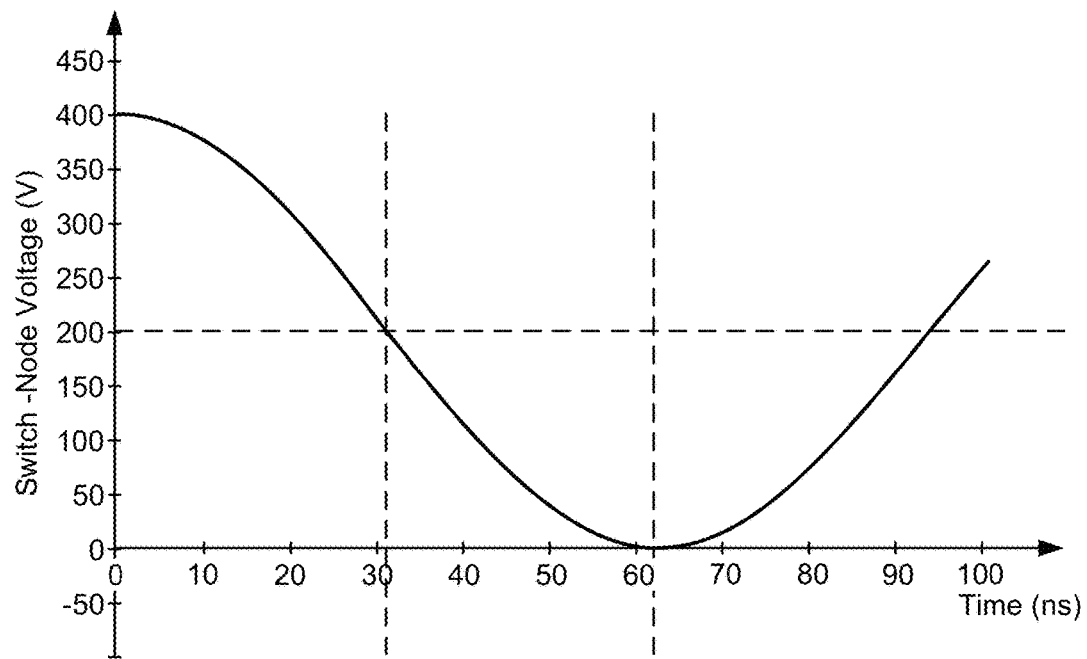
FIG. 4 is a plot illustrating simulated switch-node voltage as a function of time.

FIG. 4 is a plot illustrating simulated switch-node voltage as a function of time. In FIG. 4, the simulated switch-node voltage between the time $D_R$ becomes reverse biased (t=0 ns) and $S_{CTRL}$ (ideally) turns ON to initiate next switching cycle (t=62 ns). The time when $V_{SW}=V_{IN}$ is indicated at t=31 ns, which is the time, when the boost inductor voltage is 0 V and, hence, the trigger-point for comparator $COMP_{ZCC}$ of FIG. 3.

In a conventional boost converter, a synchronous rectifier operated in "diode emulation" mode (i.e. as an "active diode") is used in combination with an additional boost inductor winding to achieve CrCM.

Figure 5:
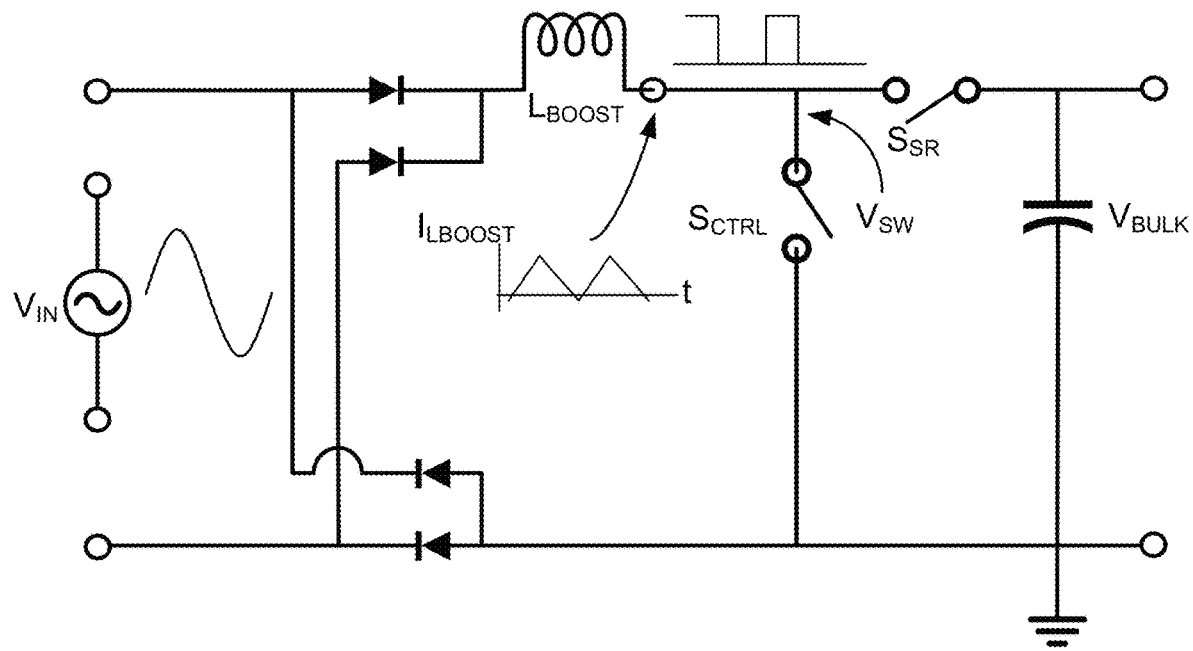
FIG. 5 is a simplified schematic diagram illustrating inductor current sensing.

When employing synchronous rectification, referring to FIGS. 3 and 5, the rectifier diode ($D_R$) is replaced with a switch ($S_{SR}$), that is responsible for the synchronous rectification instead of the diode. The switch may be self-controlled (i.e., simply based on its own terminal voltages and currents) to act exactly as a diode would, in which case conventional methods (i.e., sensing when $V_{SW}=V_{IN}$) and apparatus (i.e., additional winding+comparator on the boost inductor) can be utilized. However, it is advantageous to have the ability to keep $S_{SR}$ on for a longer period than a diode would be, and thus allow for negative inductor current to flow (i.e., TCM control). In that case, it is useful to sense when to turn $S_{SR}$ off instead of when to turn $S_{CTRL}$ on. While $S_{SR}$ remains ON, the voltage on the switch-node does not change, and there is NO indication of when demagnetization occurred or when a specific negative inductor current was reached (i.e., on an additional inductor winding). Instead, it would be typical to perform inductor current sensing and triggering of a comparator based on this current reaching a certain threshold. As described herein, embodiments of the present invention sense the inductor current to determine when to turn $S_{SR}$ off. Moreover, embodiments of the present invention enable not only inductor current sensing, but operate at sufficient frequencies to react to the sensed inductor current reaching a predetermined threshold.

FIG. 5 is a simplified schematic diagram illustrating inductor current sensing. The circuit illustrated in FIG. 5 can be used to ensure CrCM. As illustrated in FIG. 5, the inductor current $I_{LBOOST}$ can be sensed with a resetting current-sense transformer due to its unipolar nature. In this way, the low-frequency AC content can be separated from the high-frequency switching currents, and the current-sense transformer may be selected/designed appropriately. It should be noted that the switching frequency and duty-cycle may limit the design/choice of the current sense transformer.

Inductor current sensing using a current-sense transformer is significantly more challenging, when implemented in a bridgeless design, since the AC rectification occurs after the inductor. As a result, the current in the inductor is bidirectional and bipolar and the low AC frequency and the switching frequency are both sensed. Referring to FIG. 5, the inductor current $I_{LBOOST}$ is mostly positive but also negative at times. It will be appreciated that in a bridgeless design, the inductor boost current changes polarity when the input voltage changes polarity. Thus, in the negative AC half-cycle, the inductor boost current is mostly negative but also positive at times. Typically, the polarity changes at the AC frequency (~50-60 Hz). Thus, current sensing that is both bidirectional and bipolar is provided by embodiments of the present invention that does not utilize a current sense transformer. The control system implemented by embodiments of the present invention is able to control the inductor current in a manner that results in the inductor current reaching zero or a negative value for, in some cases, every switching cycle, with low propagation delays.

In some systems, bipolar current is sensed via a current sense transformer. In this implementation, in order to achieve a wide frequency range current sense transformer, a circuit that is physically large, and not inexpensive, is utilized. In contrast with this design, embodiments of the present invention increase power density and decrease cost, both of which are desirable.

In a fully digital system, analog signals are sampled with an analog-to-digital converter (ADC) in order to act on them. The highest frequency that can be represented by the sampling system is ½ of the sampling frequency. In the case of reacting to a specific level (i.e., a specific comparison value), the propagation delay between the current being sampled and the pulse width modulation signal changing its level is at least a maximum of the sampling period plus some computational time. Thus, in a sampled system, the sampling period is a function of the maximum of the desired/required propagation delay. In systems operating at high switching frequencies, this is impractical.

In an average current mode system, specific timing or filtering of the inductor current can make sampling of the inductor current practical. In a hybrid system, however, the comparison against a threshold is performed in the analog domain using a discrete comparator and, accordingly, the sampling is done once per switching cycle at exactly the correct time using an analog comparison. The comparison triggers the action (CrCM) "immediately." In such a system, sampling of the "instantaneous" current is not practical on a continuous basis (i.e., Periodic Interrupt Timing triggered sampling at a fixed sampling rate), and therefore, there is no analog to digital conversion of the inductor current. Instead, the comparator output (i.e., the rising edge) generates an asynchronous interrupt to the digital system to terminate the present switching period and initiate a new one. Of course, a fully analog system works in much the same way.

In order to address these challenges, conventional systems using sensed inductor current values have can implement multiple categories of control including: 1) Average Current Mode Control; and 2) Constant On-Time CrCM control (or Triangular Current Mode Control).

For Continuous Conduction Mode (CCM) operation, the average inductor current is controlled to a reference level by changing the duty ratio (also referred to as the duty cycle). The average inductor current must be sensed, but since the high-frequency content needs not be represented (for average current mode), the current sensing is not tied to the switching frequency, and frequency scaling is somewhat possible. Since there isn't, necessarily, cycle-by-cycle sampling and processing requirements, it is possible to scale switching frequency without increasing requirements to sampling frequency and/or current sensing.

Figure 6:
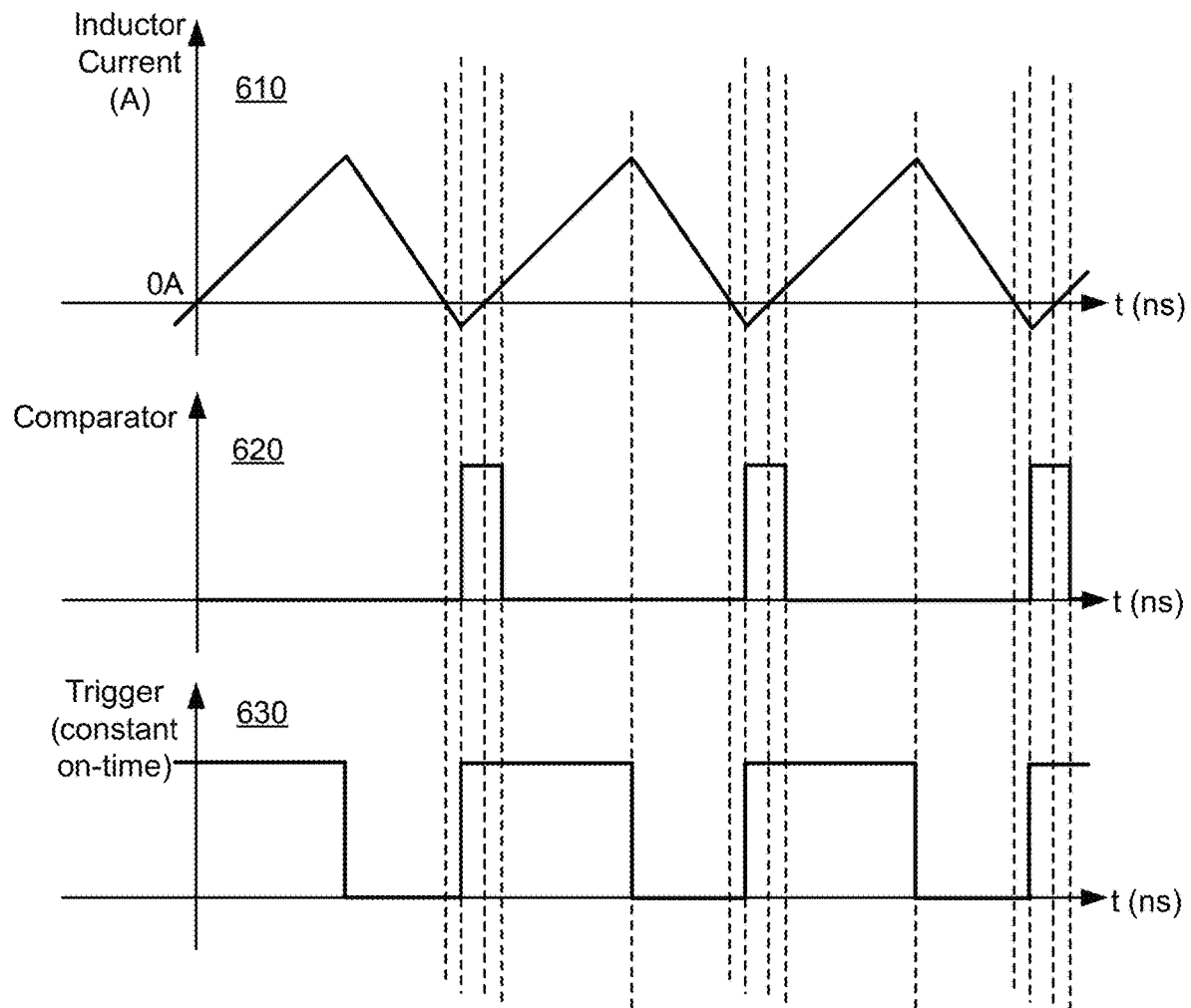
FIG. 6 shows a set of plots illustrating inductor current, a comparator output, and a "constant on-time" being triggered by the rising edge of the comparator.

For CrCM (with TCM), the "instantaneous" inductor current is sampled and action is taken immediately on a per-cycle basis:

FIG. 6 shows a set of plots illustrating inductor current, a comparator output, and a "constant on-time" being triggered by the rising edge of the comparator. In FIG. 6, the inductor current shown in plot 610 is sensed with a sensing circuit and compared against a threshold (e.g., 0 A). The output of the comparator is illustrated in plot 620 and used to initiate the next Constant On-Time (COT) shown in plot 630.

Although this method ensures CrCM operation and the compare value can be set to be negative (i.e., instead of 0 A) to ensure TCM operation, any delay between the compare values matching and the actual trigger edge (e.g., as a result of propagation delay) will cause a timing error. The inventor has determined that for a digital system controlled by a digital microprocessor, digital microprocessors includes strengths of keeping accurate time and are impaired by asynchronous interruptions compared to their clock frequency. Using an analog comparator as illustrated in FIG. 6, when an edge is sensed and used to generate an interrupt, digital controllers do not respond quickly to such an interrupt.

The inventors have also determined that the time period between reaching the threshold on the comparator and change of the comparator output results in a time delay. During this time delay, the system will overshoot the threshold. Managing these delays as switching frequencies increase is problematic. Moreover, the percentage-wise timing error of the propagation delay compared to the demagnetization time must be kept in check. Otherwise, the inductor current may become impractically negative. In addition, the resonant period between boost inductor and switch output capacitance must typically be at least four times greater than propagation delay in order to maintain soft switching, which is an important property of CrCM operation.

The analog comparator responsible for the comparison and its associated propagation delay must be selected according to system switching frequency, and some natural limit exists, where the propagation delay is too great compared to the demagnetization time for practical implementation (i.e., comparator speed). As a result, conventional methods do not readily enable a scaling of switching frequency to higher frequencies.

For instance, the overshoot for inductor current is vastly different for low, medium, and high input voltages. When the input voltage is low, the overshoot is particularly high, even when the peak current is the same for the various voltages. Thus, the negative peak current differs greatly as a function of voltage.

Embodiments of the present invention address these shortcomings in conventional systems and address these challenges in order to significantly increase switching frequency. In particular, embodiments of the present invention utilize current sensing of high bandwidth, bipolar and bidirectional inductor current in bridgeless totem-pole designs. Moreover, embodiments of the present invention reduce or eliminate asynchronous interrupts in the context of digitally controlled systems, moving away from "hybrid" systems. Furthermore, embodiments of the present invention decouple the control loop speed, which is conventionally associated with propagation delay limitations, including comparator propagation delay limitations, from the switching frequency, enabling systems to provide reaction to sample-values that are NOT necessary on a per-cycle basis.

As described more fully herein, some embodiments of the present invention implement multiple interleaved phases without individual control loops/control paths by copying a single set of pulse width modulation values that is generated to multiple phases (i.e., phase-shifted for proper interleaving) and utilizing the filter inductor and predetermined timing requirements to ensure appropriate current sharing. Fundamental principles ensure the additional benefits provided by other systems are maintained, including input DM (Differential Mode) current canceling, bulk capacitor switching-related ripple current cancellation, and the like.

In a CrCM boost PFC converter using the "constant on-time" control principle, the pulse width modulation (PWM) signal, which can be referred to as a set of PWM signal values or a PWM sequence, includes a pre-programmed "on-time" corresponding to the pulse width of the control switch signal ($T_{CTRL}$) that remains fairly constant across the AC cycle, and an "off-time" corresponding to the pulse width of the synchronous rectifier switch signal ($T_{SR}$) that varies. The total switching cycle in a synchronous-rectified, bridgeless totem-pole CrCM boost PFC converter is represented in FIG. 7.

Figure 7:
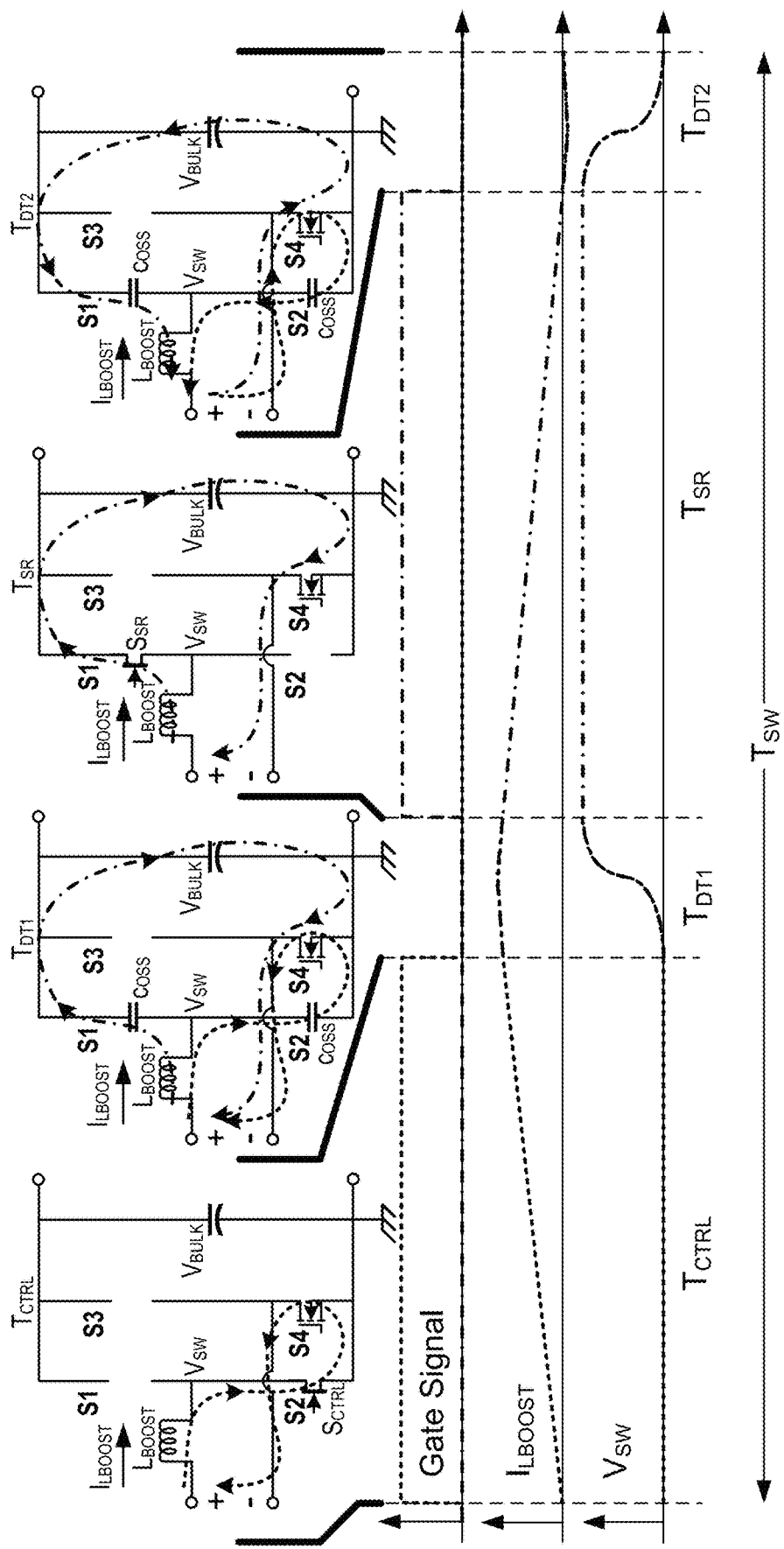
FIG. 7 shows a set of plots illustrating four sections of a total switching period according to an embodiment of the present invention.

FIG. 7 shows a set of plots illustrating four sections or intervals of a total switching period according to an embodiment of the present invention. During the time period illustrated by $T_{CTRL}$, inductor $L_{BOOST}$ is charged during the positive AC half-cycle as current flows through S2, which is used as the control switch during the positive AC half-cycle. The current flow through S2 is described more fully with respect to FIGS. 11A and 11B. During this time, S2 and S4 are ON and the input voltage is applied across the inductor. The charging of the inductor during the time period illustrated by $T_{CTRL}$ is shown by the increase in current $I_{LBOOST}$. During $T_{DT1}$, both S1 and S2 are OFF and a resonant transition occurs. During the time period illustrated by $T_{SR}$, S1 is ON and conducts, which causes the inductor $L_{BOOST}$ to discharge its energy into the output capacitor $V_{BULK}$, illustrated by the inductor current decreasing to zero and becoming slightly negative. During $T_{DT2}$, the opposite resonant transition occurs.

An outer control loop generates the "constant" on-time based on feedback of the actual bulk voltage vs. a reference. $T_{DT1}$ ideally varies with $I_{LBOOST}$ at the beginning of $T_{DT1}$ interval (i.e., higher current results in lesser time), but may be a fixed, constant time. During $T_{DT1}$, the voltage across the first switch S1, represented by $C_{OSS}$, resonantly rings down to 0 V. $T_{DT1}$ is selected in some implementations such that first switch S1, operating as and represented by the synchronous rectifier (SR) switch $S_{SR}$, turns on exactly at the time the voltage across the switch reaches 0 V. $T_{SR}$ is selected such that the inductor current reaches exactly 0 A (or in some cases a threshold current that is slightly negative) at the end of $T_{SR}$. $T_{DT2}$ may be a fixed time, or may vary. In some embodiments, $T_{DT2}$ is selected such that second switch S2, operating as and represented by the ConTRoL switch $S_{CTRL}$, turns on exactly at the time the voltage across it reaches 0 V.

If $T_{DT1}$ and $T_{DT2}$ are both predetermined constants, and $T_{CTRL}$ is known and changing slowly with respect to the AC Cycle, which is consistent with a constant on-time control system, $T_{SR}$ is the only time interval that changes across the AC cycle and causes the switching frequency to vary. $T_{SR}$ is thus used to ensure the inductor is fully demagnetized before the SR switch is turned OFF, however, but not turned OFF significantly after full demagnetization. Accordingly, the threshold for $I_{LBOOST}$ can be set at zero or $I_{NEG}/I_{POS}$ for the positive/negative AC half-cycle. The PWM signal for one phase is thus generated based on the actual inductor current for that particular phase.

Each phase can, therefore, ensure CrCM operation (i.e., the inductor current reaching exactly 0 A or slightly negative/positive during each cycle) as well as ensure Over-Current Protection, which provides an indication in case the maximum current is exceeded in that phase's inductor.

Referring to FIG. 7, during operation, a single PWM signal is generated as follows:

$T_{DT1}$ and $T_{DT2}$ are either variable and change to reflect expected inductor current at the start of their respective intervals (e.g., same for any/all phases) or fixed (e.g., same for all phases).

$T_{CTRL}$ is programmed to be the same for all phases based on the feedback signal, such that the output voltage shared by all phases remains in regulation.

$T_{SR}$ is programmed to be long enough for the worst-case phase to remain in the CrCM, such that none of the phases enter CCM, which would occur if $T_{SR}$ were too short and did not allow for the inductor current to reach 0 A before $T_{CTRL}$ was turned on again.

If any of the phases experience an over-current event, $T_{CTRL}$ for that particular phase is truncated for that pulse. If this condition persists, that phase is shut down while the others can remain active.

The single PWM signal is then 'copied' and phase-shifted to the various phases (e.g., 180 degrees shift for a phase count of 2; 120 degrees for a phase count of 3, and the like).

Although FIG. 7 has been described in terms of the positive AC half-cycle, when the input voltage is negative during the negative AC half-cycle, the operation is mirrored, with the operation of S2 and S4 being replaced by the operation of S1 and S3, as well as the operation of S1 and S3 being replaced by the operation of S2 and S4. During the negative AC half-cycle, S3 is ON and S4 is OFF, S1 is turned on during the time period illustrated by $T_{CTRL}$ and S2 is turned on during the time period illustrated by $T_{SR}$. Thus, depending on the input voltage polarity, S1 can function as the synchronous rectifier switch (positive AC half-cycle) or the control switch (negative AC half-cycle). Similarly, depending on the input voltage polarity, S2 can function as the synchronous rectifier switch (negative AC half-cycle) or the control switch (positive AC half-cycle).

In order to measure the inductor current, embodiments of the present invention utilize a novel apparatus in order to implement the novel method of pulse counting as described herein, thereby sensing whether the current crossed a reference threshold and applying control changes based on this pulse counting technique.

Figure 8A:
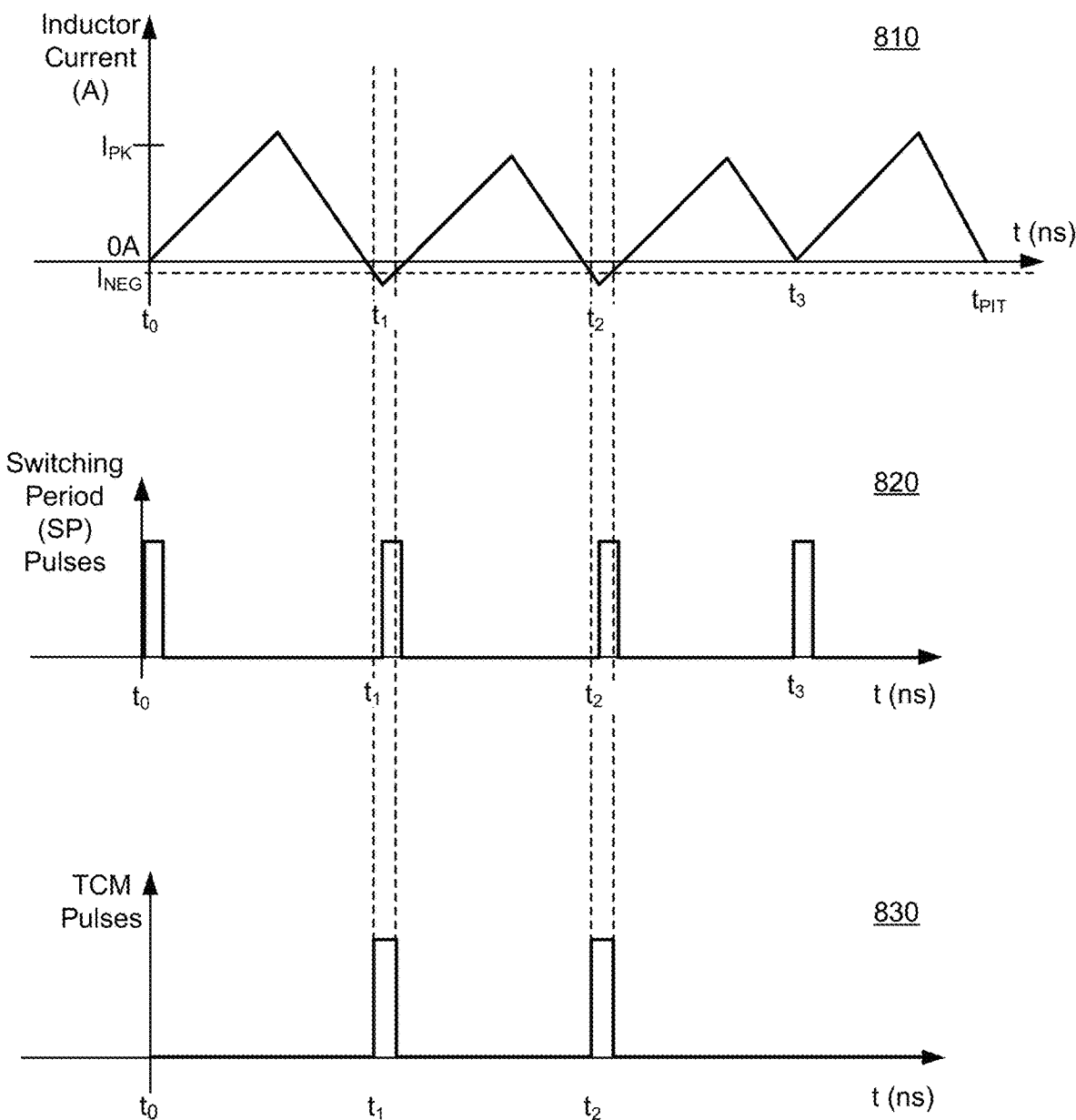
FIG. 8A shows a set of plots illustrating inductor current, a switching period pulse indicator, and a triangular current mode pulse indicator during a positive AC half-cycle according to an embodiment of the present invention.

FIG. 8A shows a set of plots illustrating inductor current, a switching period pulse indicator, and a TCM pulse indicator during a positive AC half-cycle according to an embodiment of the present invention. Plot 810 illustrates inductor current, plot 820 illustrates the timing of the switching period indicated by $T_{SW}$ in FIG. 7, and plot 830 illustrates TCM pulses, which correspond to the inductor current corresponding to CrCM operation, and are compared to the switching period pulses. The switching cycle pulses are referred to as switching period (SP) pulses. As discussed herein, at a predetermined interval, which can be set using a Period Interrupt Timer (PIT), the counted pulses are compared, providing a difference between the SP pulses and the TCM pulses, also referred to as TCM indications, CrCM pulses, or CrCM indications, that count the number of times the 'negative' peak reaches the threshold $I_{NEG}$, thereby indicating CrCM operation.

If the value provided by the comparison (i.e., the difference between the SP pulses and the TCM pulses) is positive as illustrated in FIG. 8A, the significance is that not all switching cycles had the inductor current go negative enough. This means that the synchronous rectifier conduction time illustrated by $T_{SR}$ was too short as measured as an average during the interval since the last comparison. In response to the comparison being positive, the pre-programmed synchronous rectifier conduction time illustrated by $T_{SR}$ is increased.

If, on the other hand, the comparison is zero, indicating that the number of SP pulses equals the number of TCM pulses during predetermined interval, then the inductor current, as measured as an average during the interval since the last comparison, is too negative. In response to the comparison being zero, the pre-programmed SR conduction time illustrated by $T_{SR}$ is decreased, which will result in the inductor current becoming more positive. In this manner, the negative inductor current is 'anchored' to a reference, for example, measured using a DAC, and will cycle up-and-down about this anchor. As will be evident to one of skill in the art, variations on the methods and systems described herein are possible. However, the methods and systems to either increase or decrease the SR conduction time with a modifier (i.e., a value near '1') multiplied by a theoretically calculated optimum time, could be looked at as a control loop compensator stage, and thus a variety of different compensation schemes can be implemented that are more or less optimal and/or complex in order to ensure appropriate response, stability, loop gain and bandwidth, etc. As discussed herein, although a threshold of zero is used in this exemplary embodiment, embodiments of the present invention can utilize other thresholds including thresholds less than zero or greater than zero.

Referring to FIG. 8A, three full switching cycles are illustrated. At time to, the ConTRoL switch (e.g., second switch S2) transitions ON, and a pulse characterized by a rising edge is produced to indicate the switching period pulse. This pulse is counted in a register location (e.g. "SP pulse count"). Since, as illustrated in FIG. 8A, the current at time to does not cross $I_{NEG}$, which is a threshold current, the comparator output is not triggered and no TCM pulse is generated. At time $t_1$, the current drops below the threshold $I_{NEG}$ and, as a result, the comparator output is triggered and a TCM pulse is generated. This pulse is counted in a register location (e.g. "TCM pulse count"). At exactly the valley of the inductor current (i.e., very shortly after $t_1$), the switch transitions ON again, and a switching period pulse is generated to indicate this. The SP pulse count is incremented accordingly. Similarly, at time $t_2$, the current drops below $I_{NEG}$ and, as a result, the comparator output is triggered and a TCM pulse is generated and counted (i.e., the TCM pulse count is incremented). In a manner similar to time to, at time $t_3$, the inductor current does not cross below $I_{NEG}$. As a result, the comparator output is not triggered and no TCM pulse is generated. However, since the ConTRoL switch still transitions ON, the SP pulse count is incremented. Thus, for this set of four cycles corresponding to the predetermined time interval, for example, defined using a PIT, the SP pulse count is 4 while the TCM pulse count is 2. The difference between the pulses generated by the pulse counter and the comparator is thus 2, which indicates that not all switching cycles had the inductor current go negative enough. As a result, the pre-programmed SR conduction time illustrated by $T_{SR}$ will be modified with a modifier that is increased compared to the previous setting for the pre-programmed SR conduction time.

In contrast with conventional systems, which would use the edge of the TCM pulse to initiate the next switching cycle, embodiments of the present invention pre-program the SR conduction time that will be used during a number of switching cycles (i.e., four in this example of a particular PIT time interval). This SR conduction time is then utilized during the number of switching cycles present in the PIT time interval. After the switching cycles within a PIT time interval have been completed (i.e. four switching cycles in this example), an analysis is performed to determine if the SR conduction time was too short or too long. If, as described above, the SR conduction time is too short, resulting in less than four TCM pulses, then the SR conduction time modifier will be increased and multiplied by the pre-programmed SR conduction time value for the next predetermined PIT time interval. Once the TCM pulse count is equal to the SP pulse count, the SR conduction time is assumed to be too long, and will be decreased until, once again, the difference between the number of switching cycles (i.e., the number of SP pulses) and the number of comparator pulses (i.e., the number of TCM pulses) is positive. Utilizing the comparison between the SP pulse count and the TCM pulse count, the impact of propagation delays between reaching the threshold on the comparator input and initiation of the next switching cycle is reduced or eliminated.

It will be appreciated that although the threshold for the comparator was set to $I_{NEG}$ in the example illustrated in FIG. 8A, this is not required by the present invention and other thresholds can be utilized for comparison with the inductor current. Moreover, although a difference of zero between the numbers of SP pulses and TCM pulses in the predetermined time period was used in the exemplary embodiment illustrated in FIG. 8A, embodiments of the present invention are not limited to using a difference of zero and other values greater than zero, for example, one, can be utilized. One of ordinary skill in the art would recognize many variations, modifications, and alternatives.

It will likewise be appreciated that the "increase on positive, decrease on 0" control/compensation scheme discussed herein, which is easily implemented and well suited to illustrate embodiments of the present invention, is only one of a plethora of control/compensation approaches. With a longer history of modifier values (correction factors) and pulse counts and reaction to "how positive" the value is, rather than just a Boolean check for >0, more optimized control loop response times, loop gain and bandwidth and stability can be achieved. One of ordinary skill in the art would recognize that any optimizations based on the fundamental concept of counting TCM pulses and comparing against SP pulse counts are slight variations of, but maintain the spirit and the core of the embodiments of the present invention described herein.

Figure 8B:
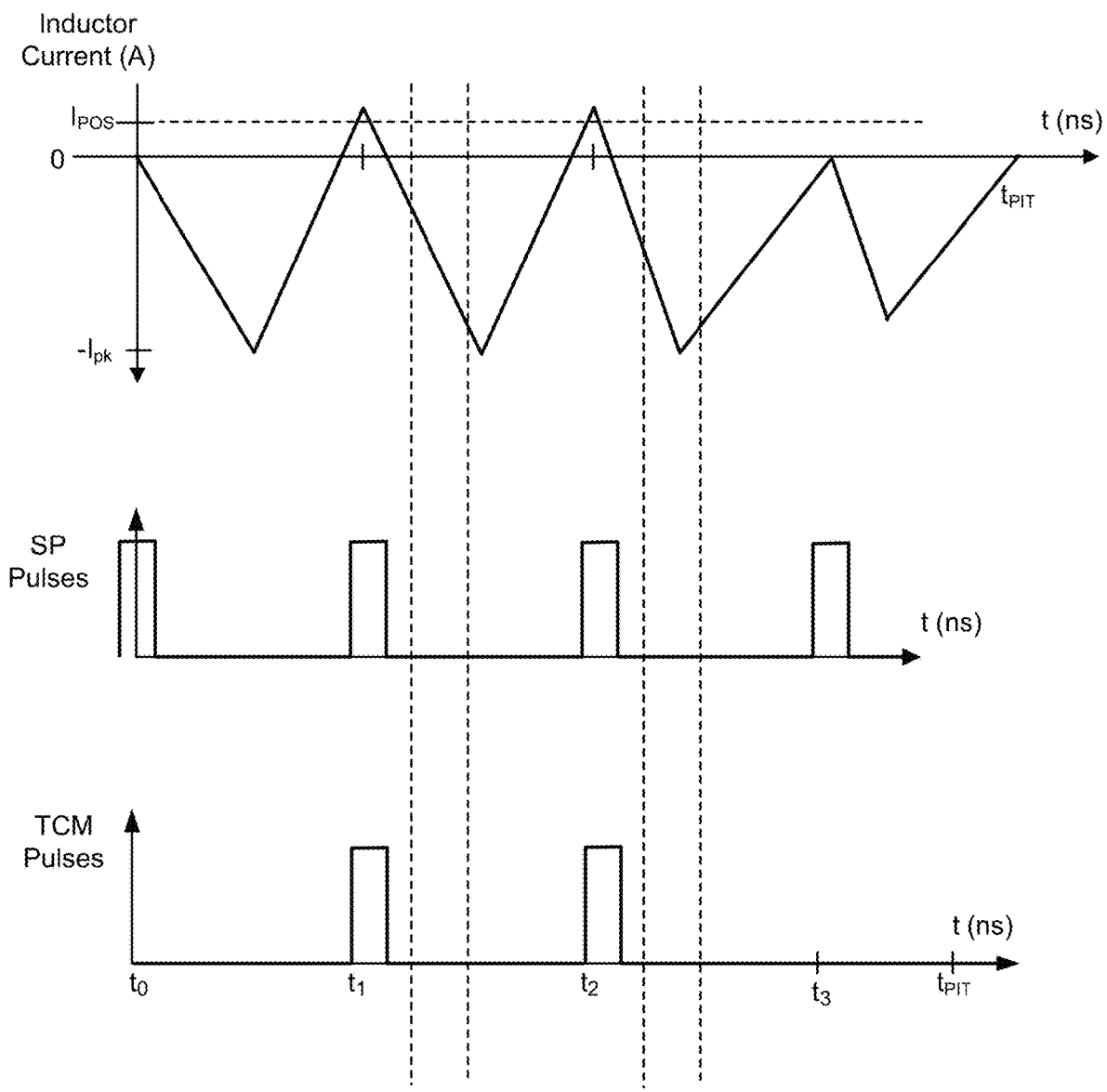
FIG. 8B shows a set of plots illustrating inductor current, switching period pulses, and triangular current mode pulses during a negative AC half-cycle according to an embodiment of the present invention.

FIG. 8B shows a set of plots illustrating inductor current, SP pulses, and TCM pulses during a negative AC half-cycle according to an embodiment of the present invention. In the embodiment illustrated in FIG. 8B, the inductor current flow is inverted in comparison to that of FIG. 8A and ranges between the peak current $-I_{pk}$ and values slightly greater than the threshold current $I_{POS}$. The operation is similar to that illustrated in FIG. 8A except for the bipolar aspect of the inductor current during the negative AC half-cycle. In a manner similar to that discussed in relation to FIG. 8A, because SP−TCM=2 in the predetermined time period $t_{PIT}$, TSR will be increased during the next predetermined time period in order to cause the inductor current to increase above $I_{POS}$ at either or both times $t_0$ and $t_3$.

Figure 9:
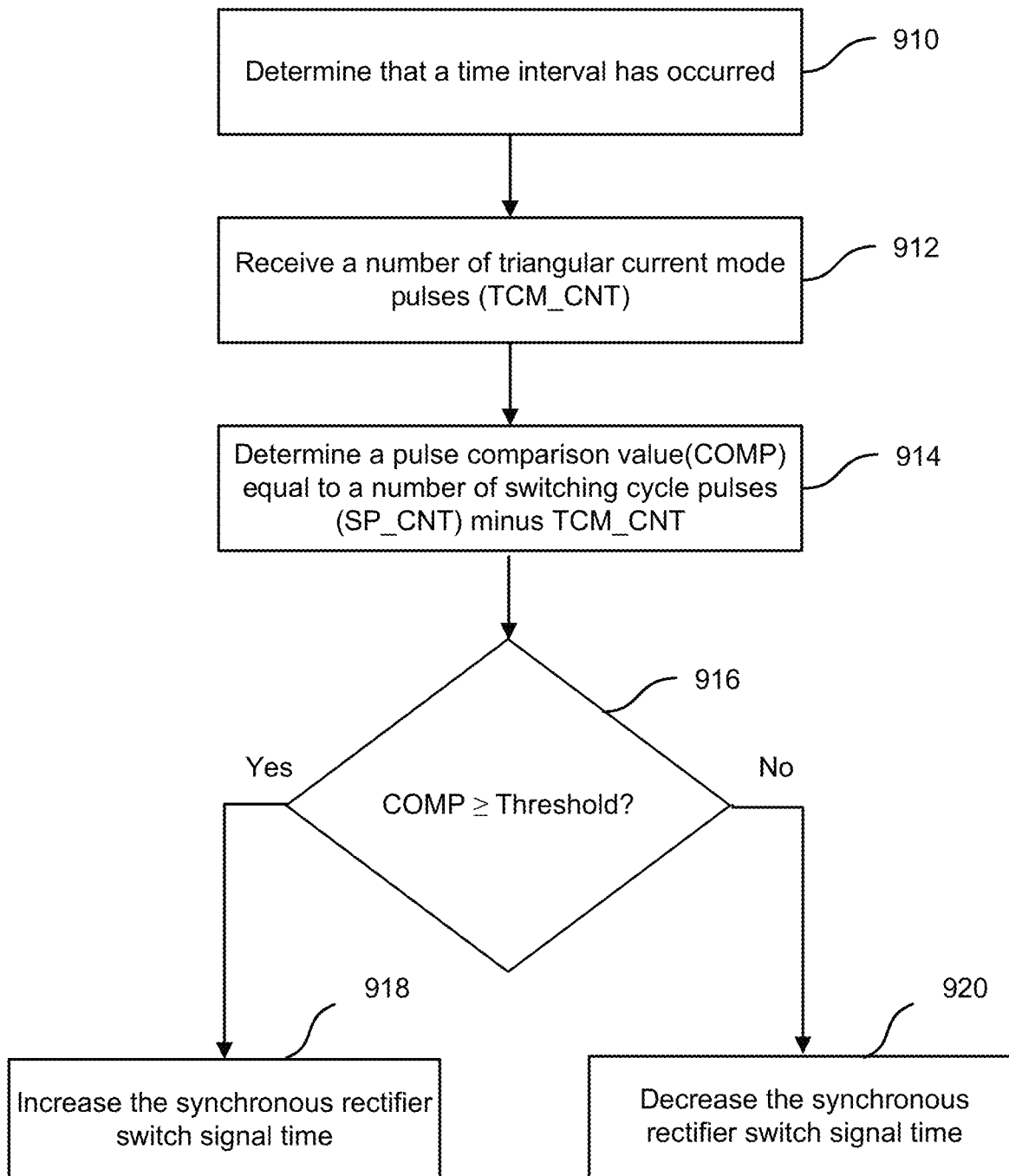
FIG. 9 is a simplified flowchart illustrating a method of setting a synchronous rectifier on-time value according to an embodiment of the present invention.

FIG. 9 is a simplified flowchart illustrating a method of setting a synchronous rectifier on-time value according to an embodiment of the present invention. The method 900 includes determining that a time interval has occurred (910) and receiving a number of triangular current mode (TCM) pulses measured during the time interval (912). The time interval can be associated with a periodic interrupt timer.

The method also includes determining a pulse comparison value equal to a number of switching period pulses during the time interval minus the number of TCM pulses during the time interval (914). If the pulse comparison value is greater than or equal to a threshold (Yes at 916), the method includes increasing the synchronous rectifier on-time of a synchronous rectifier switch signal (918). On the other hand, if the pulse comparison value is less than the threshold (No at 916), the method includes decreasing the synchronous rectifier on-time of a synchronous rectifier switch signal (920).

In an embodiment, increasing the synchronous rectifier on-time includes increasing a correction factor and multiplying an initial synchronous rectifier on-time by the increased correction factor. Increasing the correction factor can include adding a modifier to an initial correction factor. In other embodiments, decreasing the synchronous rectifier on-time includes decreasing a correction factor and multiplying an initial synchronous rectifier on-time by the decreased correction factor. Decreasing the correction factor can include subtracting a modifier from an initial correction factor.

During a positive AC half-cycle, the number of TCM pulses can correspond to a number of times an inductor current is less than or equal to a negative current threshold. During a negative AC half-cycle, the number of TCM pulses can correspond to a number of times the inductor current is greater than or equal to a positive current threshold.

It should be appreciated that the specific steps illustrated in FIG. 9 provide a particular method of setting a synchronous rectifier on-time value according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10A:
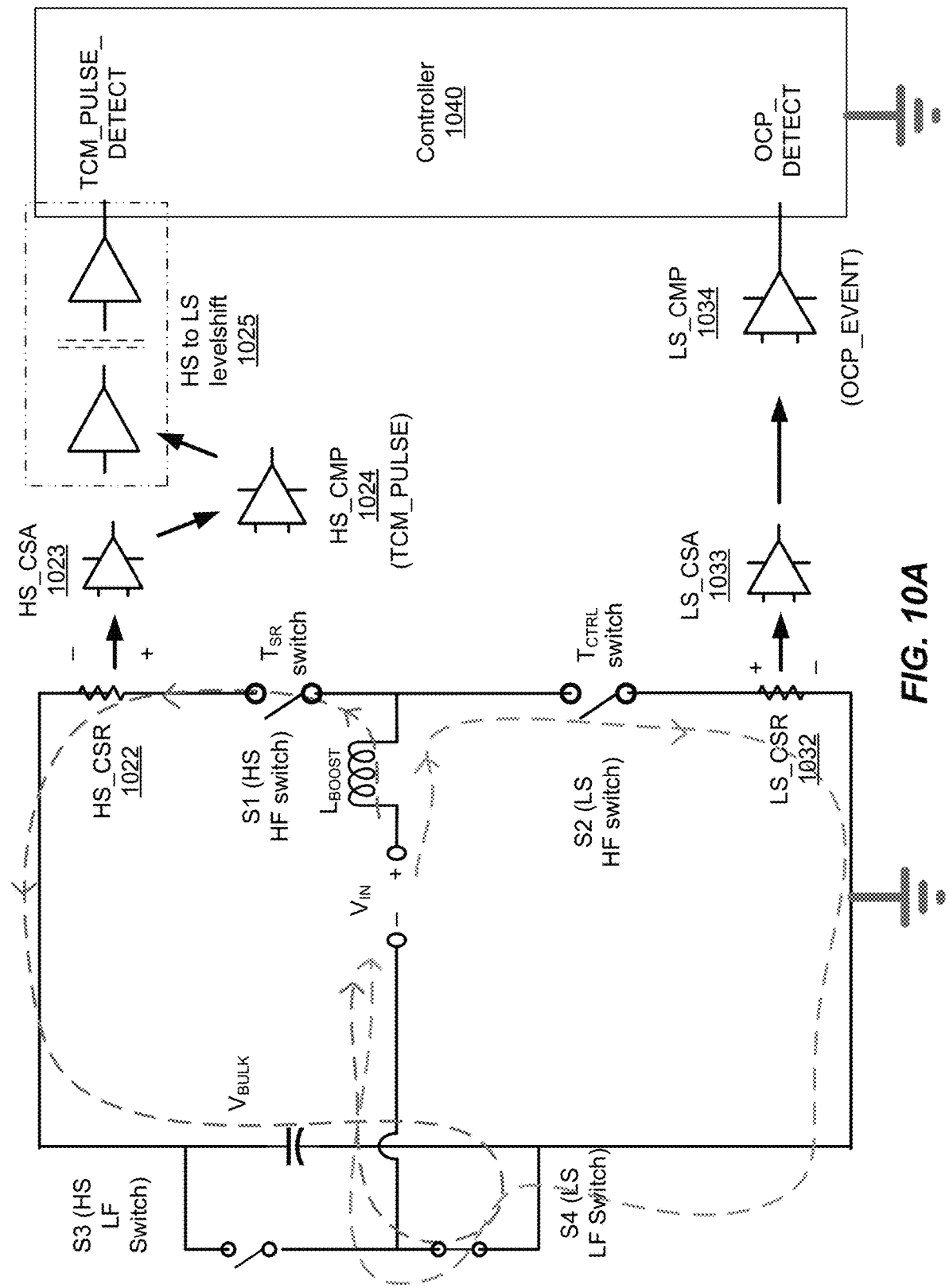
FIG. 10A is a simplified schematic diagram illustrating operation of a circuit during a positive AC half-cycle according to an embodiment of the present invention.

FIG. 10A is a simplified schematic diagram illustrating operation of a circuit during a positive AC half-cycle according to an embodiment of the present invention. As illustrated in FIG. 10A, when the AC input voltage $V_{IN}$ is positive, setting of $T_{CTRL}$ is implemented using the low-side switch, which provides for OCP and setting of $T_{SR}$ is implemented using the high-side switch, which provides for TCM pulse generation. Current flowing through high-side current sense resistor 1022 is provided as an input to a high-side current sense amplifier 1023 and current flowing through low-side current sense resistor 1032 is provided as an input to a low-side current sense amplifier 1033. During the positive AC half-cycle, S3 operates as the SR switch and S4 operates as the control switch.

The output of the high-side current sense amplifier 1023 is provided as an input to a high-side comparator 1024, which generates the TCM pulse, referenced as TCM_PULSE. The TCM pulse is re-referenced using a high-side to low-side level shift circuit 1025. The re-referenced signal is then provided at input TCM_PULSE_DETECT of controller 1040.

Referring to the low-side of the circuit, the output of the low-side current sense amplifier 1033 is provided as an input to a low-side comparator 1034, which generates the OCP pulse, referenced as OCP EVENT. The OCP pulse is then provided at input OCP DETECT of controller 1040.

FIG. 10B is a simplified plot of the voltage across the high-side current sense resistor during the positive AC half-cycle according to an embodiment of the present invention. As illustrated in FIG. 10B, the voltage during the control period corresponding to $T_{CTRL}$ is zero, the voltage increases during the first dead time $T_{DT1}$, and decreases during the SR period corresponding to $T_{SR}$, decreasing below zero. The voltage increases during the second dead time $T_{DT2}$, initiating another control period.

FIG. 10C is a simplified plot of the output of the high-side current sense amplifier during the positive AC half-cycle according to an embodiment of the present invention. The voltage at the output of the high-side current sense amplifier is equal to $V_{OFFSET}$ during the control period corresponding to $T_{CTRL}$, the voltage increases during the first dead time $T_{DT1}$, and decreases during the SR period corresponding to $T_{SR}$, decreasing below $V_{OFFSET}$ and the TCM threshold voltage in this example. The voltage increases back to $V_{OFFSET}$ during the second dead time $T_{DT2}$, initiating another control period.

FIG. 10D is a simplified plot of the output of the high-side comparator 1024, which generates the TCM pulse when the voltage output by the high-side current sense amplifier 1023 crosses the TCM threshold voltage. FIG. 10E is a simplified plot of the TCM pulse after it is re-referenced using the high-side to low-side level shift circuit 1025.

Figure 10F:
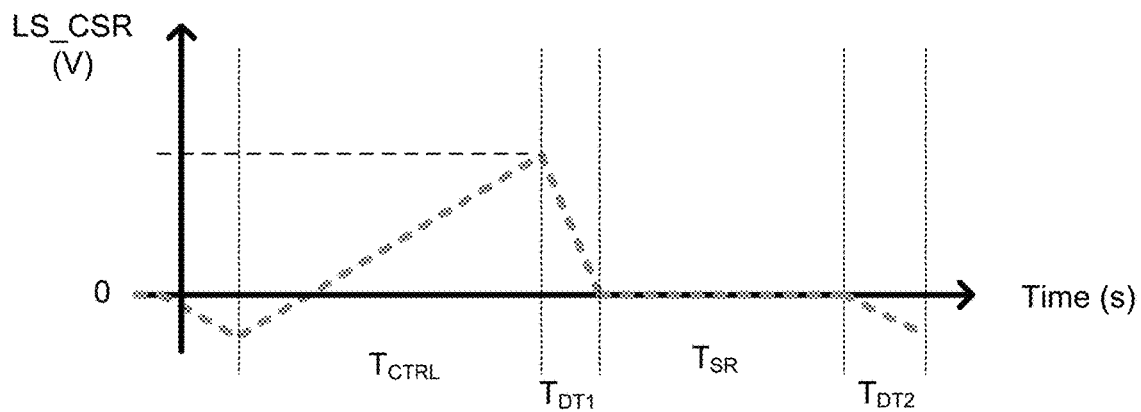
FIG. 10F is a simplified plot of the voltage across the low-side current sense resistor during the positive AC half-cycle according to an embodiment of the present invention.

FIG. 10F is a simplified plot of the voltage across the low-side current sense resistor during the positive AC half-cycle according to an embodiment of the present invention. As illustrated in FIG. 10F, the voltage during the control period corresponding to $T_{CTRL}$ increases, the voltage decreases during the first dead time $T_{DT1}$, and is equal to zero during the SR period corresponding to $T_{SR}$. The voltage decreases during the second dead time $T_{DT2}$, initiating another control period.

Figure 10G:
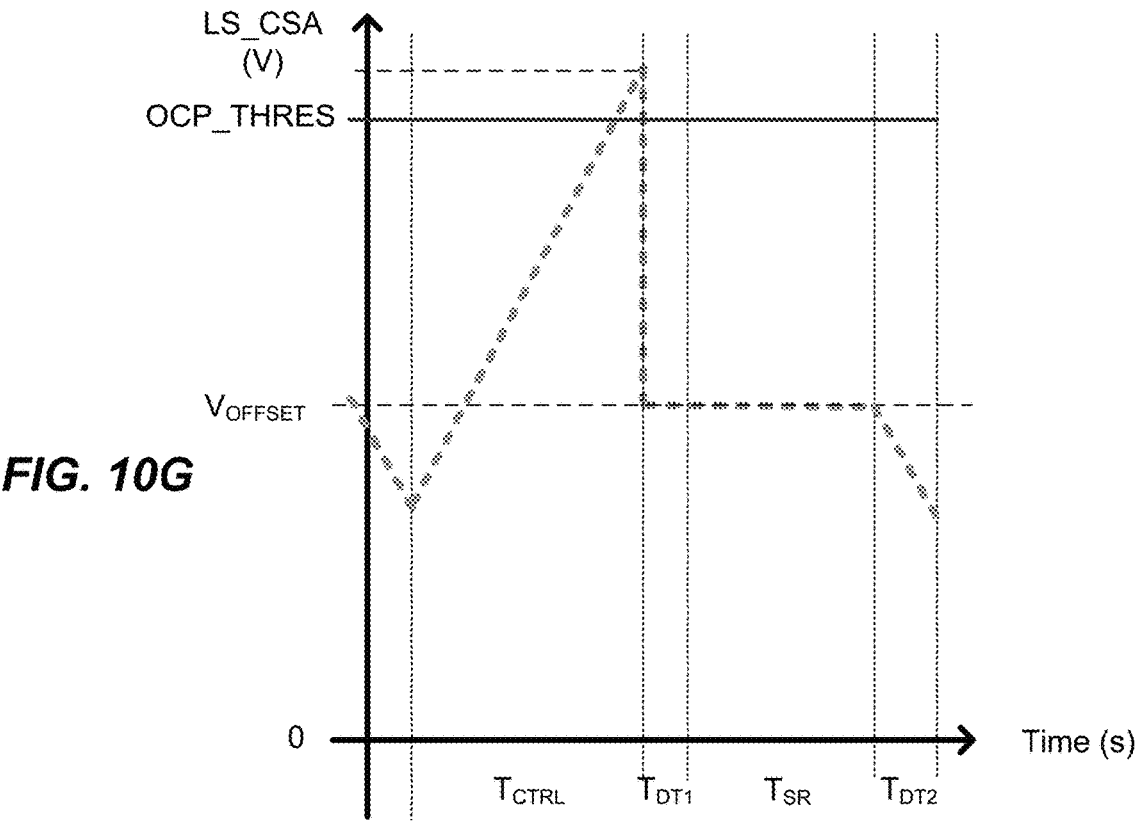
FIG. 10G is a simplified plot of the output of the low-side current sense amplifier during the positive AC half-cycle according to an embodiment of the present invention.

FIG. 10G is a simplified plot of the output of the low-side current sense amplifier during the positive AC half-cycle according to an embodiment of the present invention. The voltage at the output of the low-side current sense amplifier increases during the control period corresponding to $T_{CTRL}$, crossing the OCP threshold near the end of the control period in this example. The voltage is equal to $V_{OFFSET}$ during the first dead time $T_{DT1}$ and the SR period corresponding to $T_{SR}$. The voltage decreases during the second dead time $T_{DT2}$, initiating another control period.

Figure 10H:
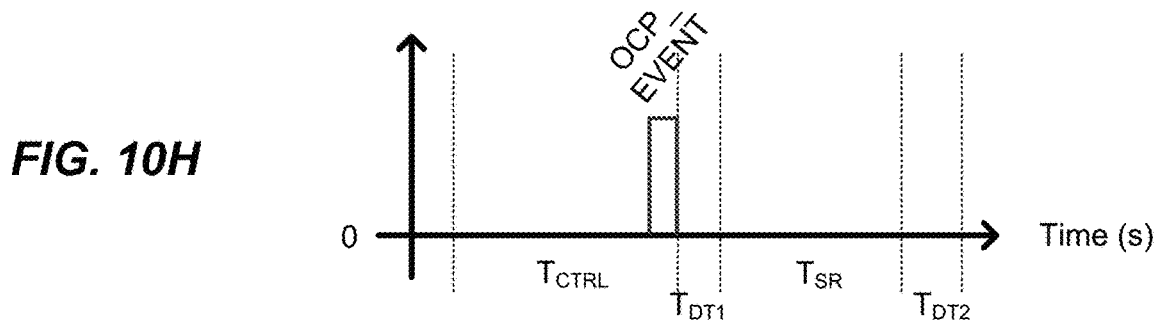
FIG. 10H is a simplified plot of the output of the low-side comparator 1034 according to an embodiment of the present invention.

FIG. 10H is a simplified plot of the output of the low-side comparator 1034, which generates the OCP pulse when the voltage output by the low-side current sense amplifier 1033 crosses the OCP threshold voltage.

Figure 11A:
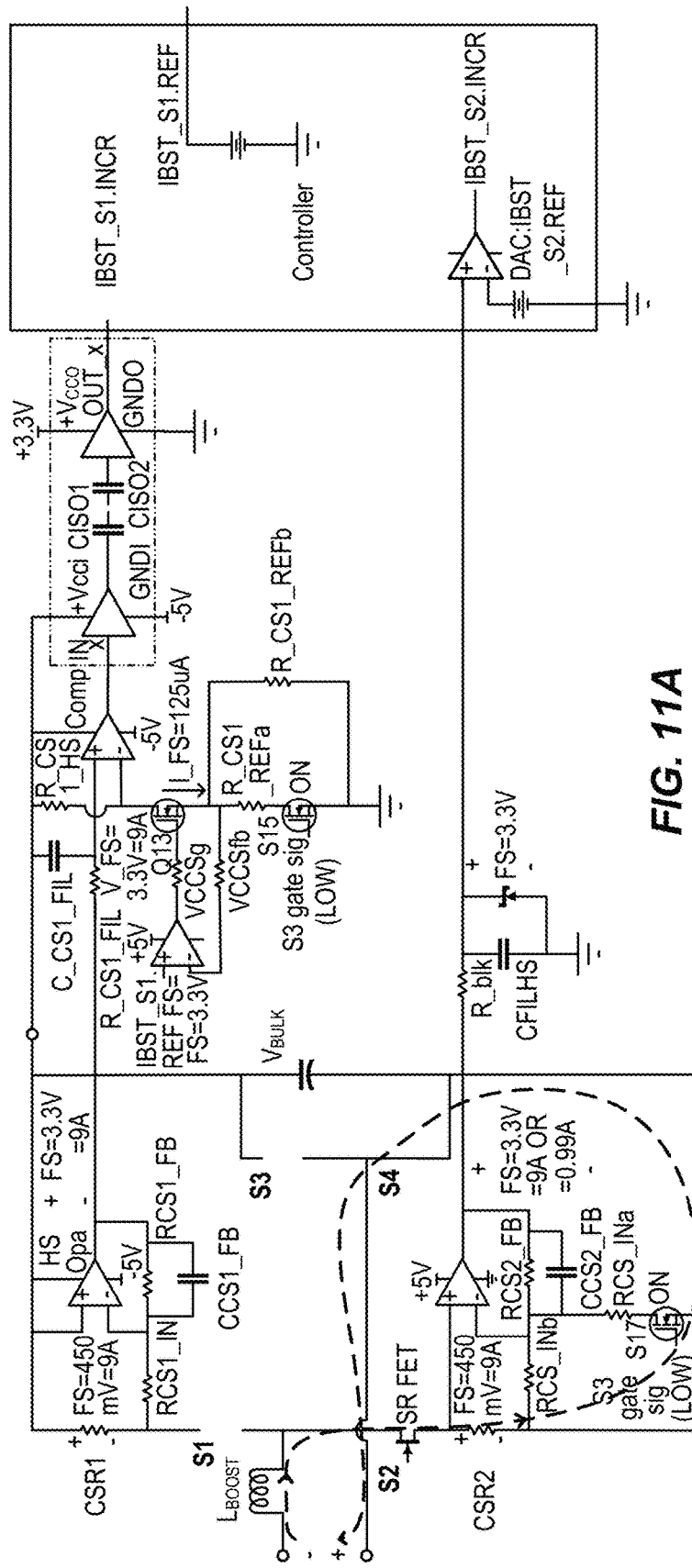
FIG. 11A is a simplified schematic diagram illustrating operation of a circuit during a first section of a total switching period during a positive AC half-cycle according to an embodiment of the present invention.
Figure 12A:
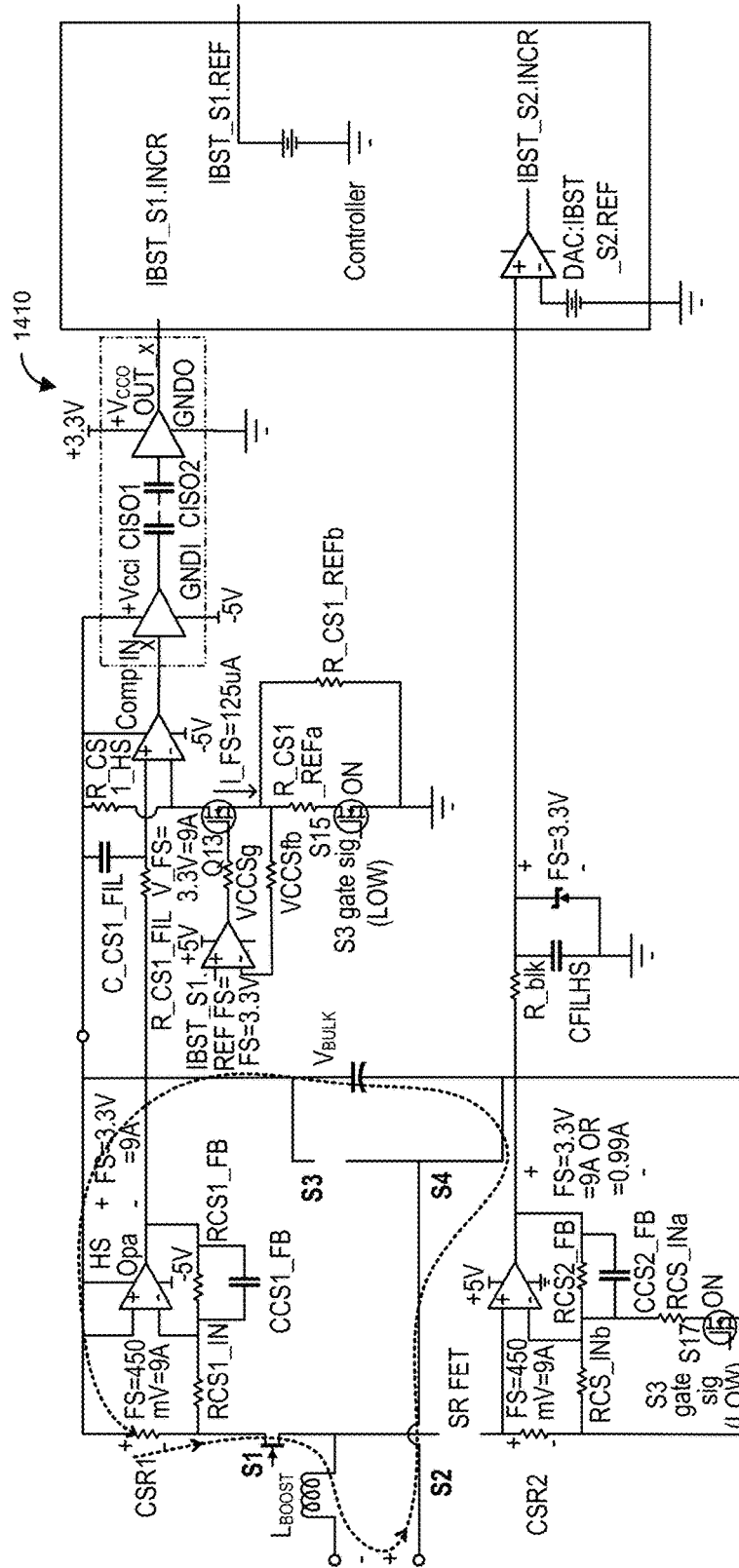
FIG. 12A is a simplified schematic diagram illustrating operation of a circuit during a third section of a total switching period during a positive AC half-cycle according to an embodiment of the present invention.

FIGS. 11A and 12A provide a specific implementation of the circuit and devices illustrated in FIGS. 10A-10H. Accordingly, the description provided in relation to FIGS. 10A—10H is applicable to FIGS. 11A and 12A as appropriate.

FIG. 11A is a simplified schematic diagram illustrating operation of a circuit during a first section of a total switching period during a positive AC half-cycle according to an embodiment of the present invention. For sake of clarity, current flow and sensing during the dead times $T_{DT1}$ and $T_{DT2}$ are not illustrated so that current flow during the time periods illustrated by $T_{CTRL}$ and $T_{SR}$ can be illustrated. Referring to FIG. 11A, the input voltage is positive during the positive AC half-cycle and the ConTRoL switch (i.e., second switch S2) is conducting. A current sense resistor CSR2 is in series with second switch S2 and senses the magnetizing current of the inductor $L_{BOOST}$ during the positive AC half-cycle. Switch S17 is OFF, so the gain in the diff-amp stage enables a Full-Scale magnetizing current (e.g., 9 A) to flow, which correspond to a Full-Scale DAC reference on the comparator (e.g., 3.3V). The comparator IBST_S2 will produce an edge if the magnetizing current, which is increasing while S2 is conducting, reaches the threshold (DAC reference "IBST_S2.REF"). This comparator output is used to protect for over-current (i.e., Over-Current Protection), which is not expected to trigger during normal operation.

Embodiments of the present invention, rather than triggering immediate action upon detection of a comparator edge, the edge is simply counted, which does not require any immediate action to be taken. At a time interval that may be decoupled (i.e., asynchronous) from the switching interval (i.e., either the switching period or the switching frequency), the number of TCM pulses that are counted is compared against the counted number of switching periods.

Figure 11B:
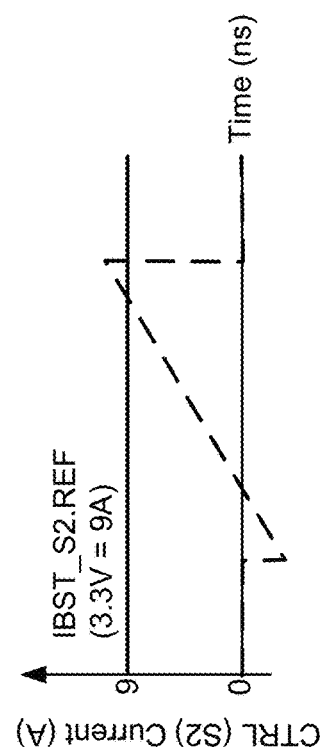
FIG. 11B is a plot illustrating an inductor current measured during the first section of the total switching period illustrated in FIG. 11A (dashed) and a positive reference for Over-Current Protection indication (solid).

FIG. 11B is a plot illustrating an inductor current measured during the first section of the total switching period illustrated in FIG. 11A (dashed) and a positive reference for Over-Current Protection indication (solid). In FIG. 11B, the inductor current being conducted by S2 and present at the input of comparator IBST_S2 is illustrated during magnetization. The (buffered/amplified) voltage across CSR2 is compared against a reference to detect over-current conditions. The diff-amp is single-ended and will not reproduce negative output, so the input to the comparator with DAC reference IBST_S2.REF is 0 V if the indicated current is negative. In FIG. 11B, an atypical condition is illustrated in which the voltage at the comparator exceeds the threshold and an over-current condition results. In this example, the DAC full-scale output of 3.3 V is equivalent to 9 A, which is the over-current condition threshold. Thus, a positive measurement is compared to a positive threshold. As will be evident to one of skill in the art, the DAC full-scale output corresponding to the over-current condition threshold can be set as appropriate to the particular application and the output of 3.3 V corresponding to 9 A is merely exemplary and not intended to limit embodiments of the present invention.

After the constant on-time conduction interval of the control switch, for example, second switch S2, and the first dead time $T_{DT1}$, first switch S1 is turned ON, and conducts the demagnetization current of $L_{BOOST}$. This portion of the operation is illustrated in relation to FIGS. 12A and 12B.

FIG. 12A is a simplified schematic diagram illustrating operation of a circuit during a third section of a total switching period during a positive AC half-cycle according to an embodiment of the present invention. As illustrated in FIG. 12A, the input voltage is positive during the positive AC half-cycle and the inductor demagnetization current is carried by S1 until the inductor is completely demagnetized. Then, additional current flow results in a slight magnetization in the 'negative' direction (i.e., the current direction after the 0 A crossing indicated by arrows indicating current flow in FIG. 12A).

The current is carried through current-sense resistor CSR1, whose voltage is differentially amplified by the "HS Opa." The amplifier gain and the value of CSR1 are selected such that highest expected current (e.g., 9 A) corresponds to the comparator rails (e.g., 3.3 V for +'0' V/–5 V rails). A DAC reference voltage is used to bias a current source (Q13) such that Full-Scale DAC output (e.g. 3.3 V) corresponds to highest expected 'negative' inductor current (e.g., –1 A) by means of the current source causing a voltage drop across R_CS1_HS. The opamp (i.e., HS Opa) is single-ended, and will produce 0 V whenever a 'negative' voltage would have resulted. The output of HS Opa is compared to a positive voltage threshold using comparator COMP. Thus, the circuit operation illustrated in FIG. 12A enables a fast loop (i.e., high frequency) CrCM check.

Figure 12B:
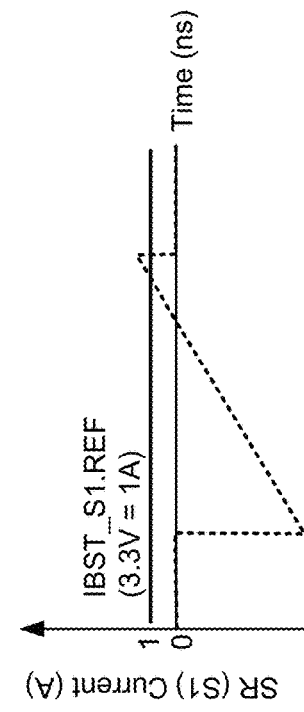
FIG. 12B is a plot illustrating an inductor current measured during the third section of the total switching period illustrated in FIG. 12A (dashed) and a positive reference for TCM indication (solid).

FIG. 12B is a plot illustrating an inductor current measured during the third section of the total switching period illustrated in FIG. 12A (dashed) and a positive reference for TCM indication (solid). In FIG. 12B, a polarity-flipped version of the CSR1 voltage representing boost inductor current carried by S1 during the S1 conduction interval is illustrated. In this way, exceeding a positive threshold is utilized to indicate that the inductor current is negative. As discussed herein, the value of the positive threshold will be used in relation to the value to which the inductor current decreases, for example, –1 A. As illustrated in FIG. 12B, the S1 current (in the polarity-flipped version illustrated), decreases past 0 A until it reaches a level of –1 A in this example. Comparing FIGS. 12A and 12B to FIG. 7, the $I_{LBOOST}$ current at the end of the time period corresponding to $T_{SR}$ reaches zero and becomes slightly negative.

Thus, for a positive input voltage polarity (i.e., the positive AC half-cycle), the sensing and compare-to-reference system is thus capable of both Over-Current detection and protection based on the maximum value of the magnetizing current, as well as CrCM (i.e., TCM) mode detection based on the maximum "negative" demagnetizing current value. Both functions are enabled by use of the appropriate full-scale range of the respective DAC references. A comparator will trigger if over-current occurs (i.e., the 'positive' inductor current is above a certain threshold) and another comparator will trigger if CrCM (i.e., TCM) current occurs (i.e., the 'negative' inductor current is below a certain threshold).

Operation during the negative AC half-cycle is discussed in relation to FIGS. 13A-13H and 14-17.

Figure 13A:
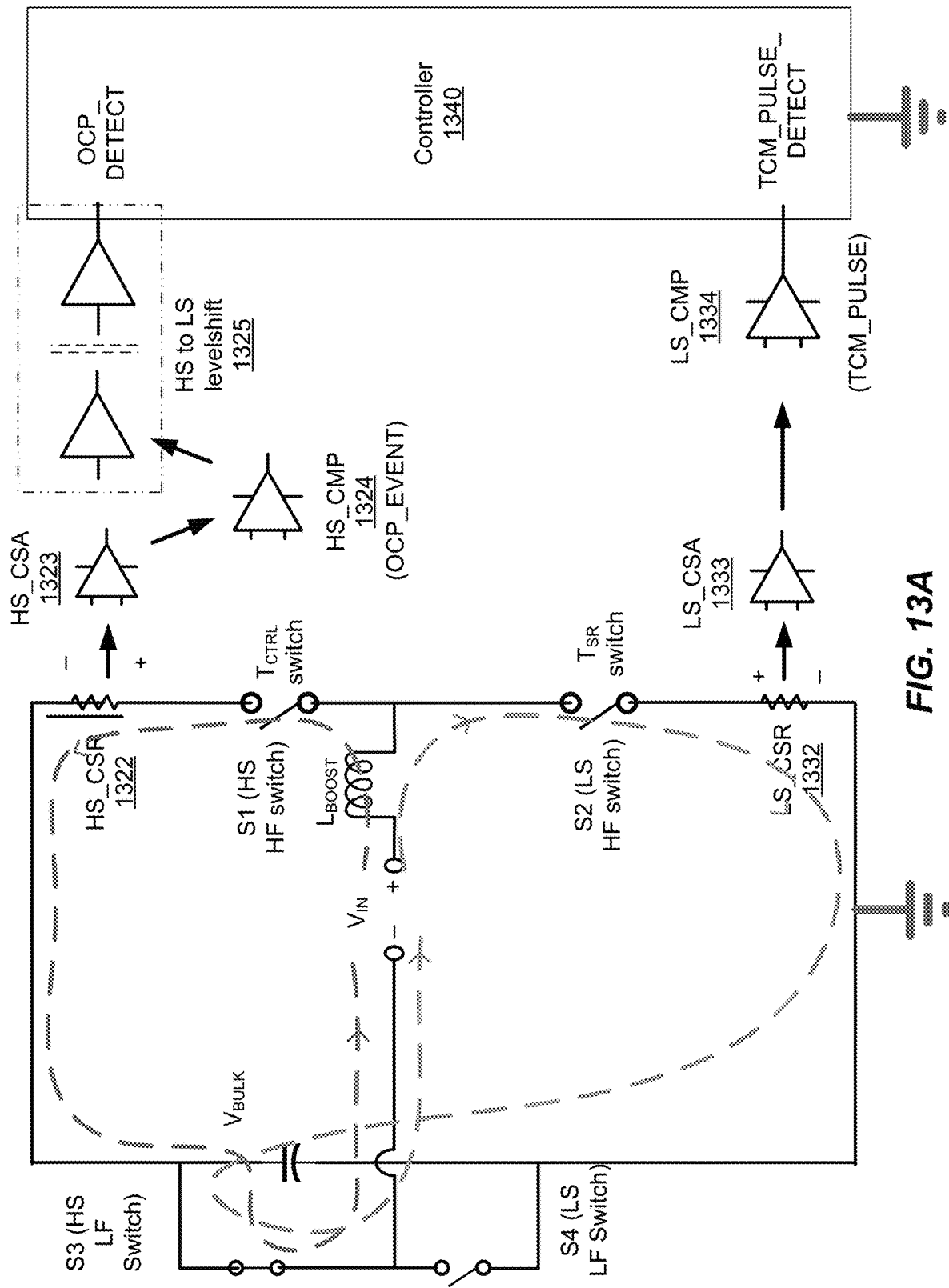
FIG. 13A is a simplified schematic diagram illustrating operation of a circuit during a negative AC half-cycle according to an embodiment of the present invention.

FIG. 13A is a simplified schematic diagram illustrating operation of a circuit during a negative AC half-cycle according to an embodiment of the present invention. As illustrated in FIG. 13A, when the AC input voltage $V_{IN}$ is negative, $T_{SR}$ is implemented using the low-side switch, which provides for TCM pulse generation and $T_{CTRL}$ is implemented using the high-side switch, which provides for OCP. Current flowing through high-side current sense resistor 1322 is provided as an input to a high-side current sense amplifier 1323 and current flowing through low-side current sense resistor 1332 is provided as an input to a low-side current sense amplifier 1333. During the negative AC half-cycle, S3 operates as the control switch and S4 operates as the SR switch.

The output of the high-side current sense amplifier 1323 is provided as an input to a high-side comparator 1324, which generates the OCP pulse, referenced as OCP EVENT. The OCP pulse is re-referenced using a high-side to low-side level shift circuit 1325. The re-referenced signal is then provided at input OCP DETECT of controller 1340.

Referring to the low-side of the circuit, the output of the low-side current sense amplifier 1333 is provided as an input to a low-side comparator 1334, which generates the TCM pulse, referenced as TCM_PULSE. The TCM pulse is then provided at input TCM_PULSE_DETECT of controller 1340.

FIG. 13B is a simplified plot of the voltage across the high-side current sense resistor during the negative AC half-cycle according to an embodiment of the present invention. As illustrated in FIG. 13B, the voltage during the control period illustrated by $T_{CTRL}$ decreases, the voltage increases during the first dead time $T_{DT1}$, and is equal to zero during the SR period illustrated by $T_{SR}$. The voltage increases during the second dead time $T_{DT2}$, initiating another control period.

FIG. 13C is a simplified plot of the output of the high-side current sense amplifier during the negative AC half-cycle according to an embodiment of the present invention. The voltage at the output of the high-side current sense amplifier decreases during the control period illustrated by $T_{CTRL}$, decreasing below OCP threshold voltage in this example. The voltage increases during the first dead time $T_{DT1}$, and is equal to $V_{OFFSET}$ during the SR period illustrated by $T_{SR}$. The voltage increases above $V_{OFFSET}$ during the second dead time $T_{DT2}$, initiating another control period.

FIG. 13D is a simplified plot of the output of the high-side comparator 1324, which generates the OCP pulse when the voltage output by the high-side current sense amplifier 1323 crosses the OCP threshold voltage. FIG. 13E is a simplified plot of the OCP pulse after it is re-referenced using the high-side to low-side level shift circuit 1325.

Figure 13F:
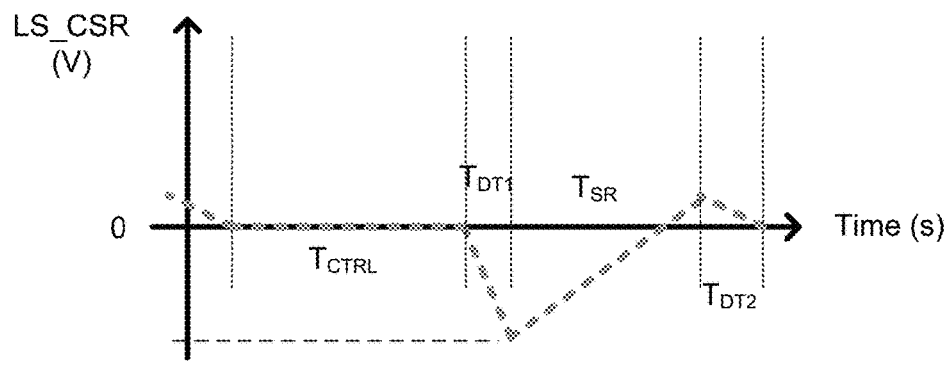
FIG. 13F is a simplified plot of the voltage across the low-side current sense resistor during the negative AC half-cycle according to an embodiment of the present invention.

FIG. 13F is a simplified plot of the voltage across the low-side current sense resistor during the negative AC half-cycle according to an embodiment of the present invention. As illustrated in FIG. 13F, the voltage is equal to zero during the control period illustrated by $T_{CTRL}$, the voltage decreases during the first dead time $T_{DT1}$, and increases during the SR period illustrated by $T_{SR}$. The voltage decreases during the second dead time $T_{DT2}$, initiating another control period.

Figure 13G:
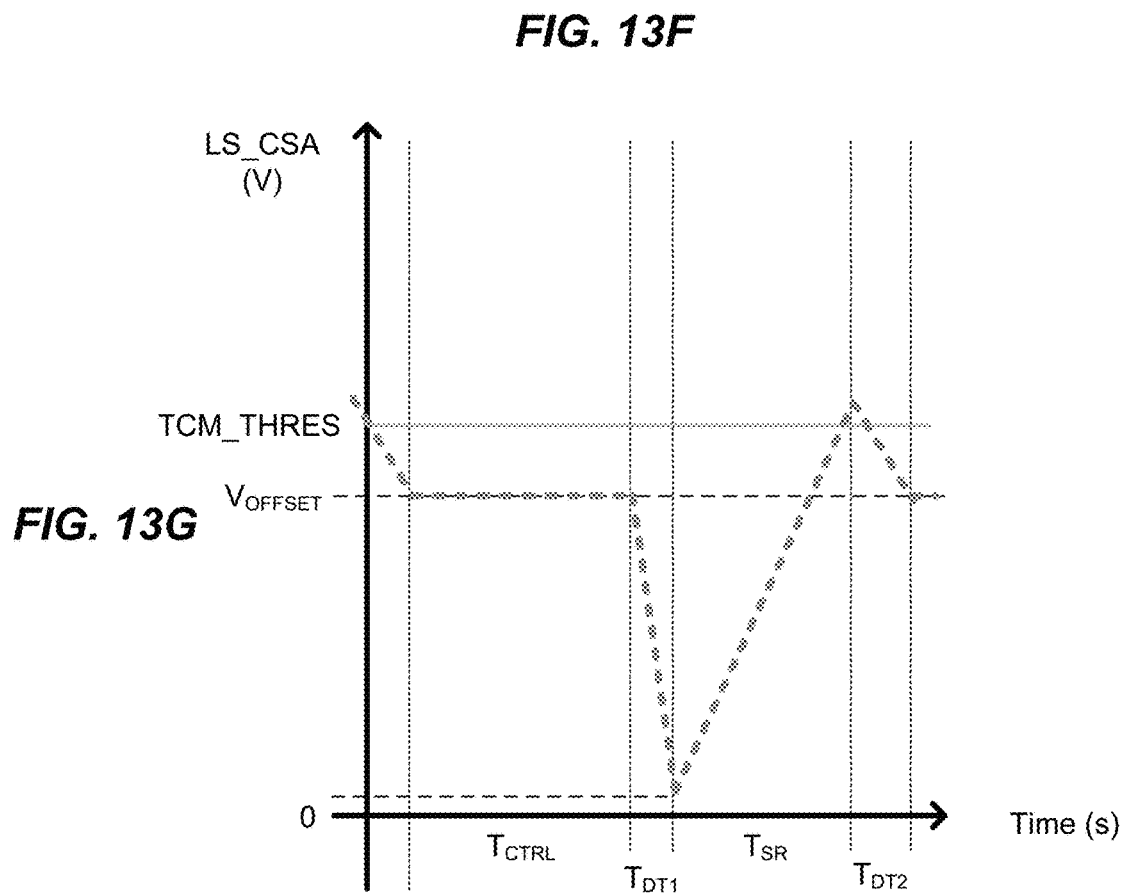
FIG. 13G is a simplified plot of the output of the low-side current sense amplifier during the negative AC half-cycle according to an embodiment of the present invention.

FIG. 13G is a simplified plot of the output of the low-side current sense amplifier during the negative AC half-cycle according to an embodiment of the present invention. The voltage at the output of the low-side current sense amplifier is equal to $V_{OFFSET}$ during the CTRL period illustrated by $T_{CTRL}$, decreases during the first dead time $T_{DT1}$, and increases during the SR period illustrated by $T_{SR}$, crossing the TCM threshold voltage near the end of the SR period in this example. The voltage decreases during the second dead time $T_{DT2}$, initiating another control period.

Figure 13H:
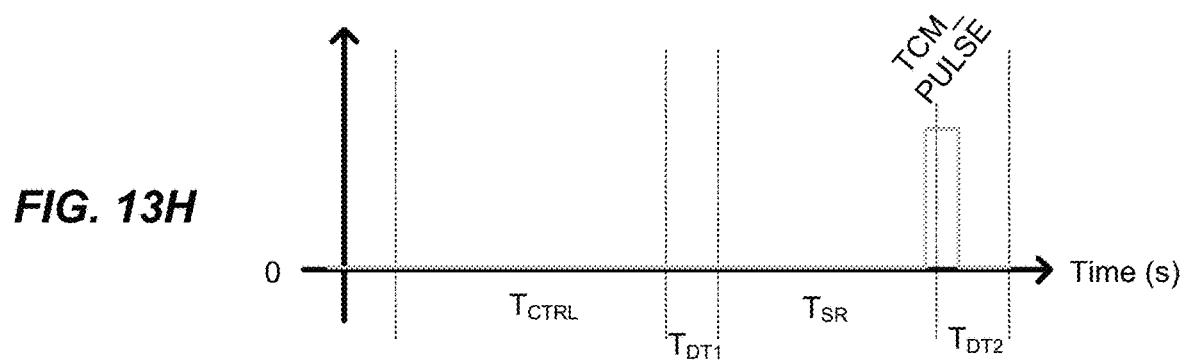
FIG. 13H is a simplified plot of the output of the low-side comparator according to an embodiment of the present invention.

FIG. 13H is a simplified plot of the output of the low-side comparator 1334, which generates the TCM pulse when the voltage output by the low-side current sense amplifier 1333 crosses the TCM threshold voltage.

Figure 14:
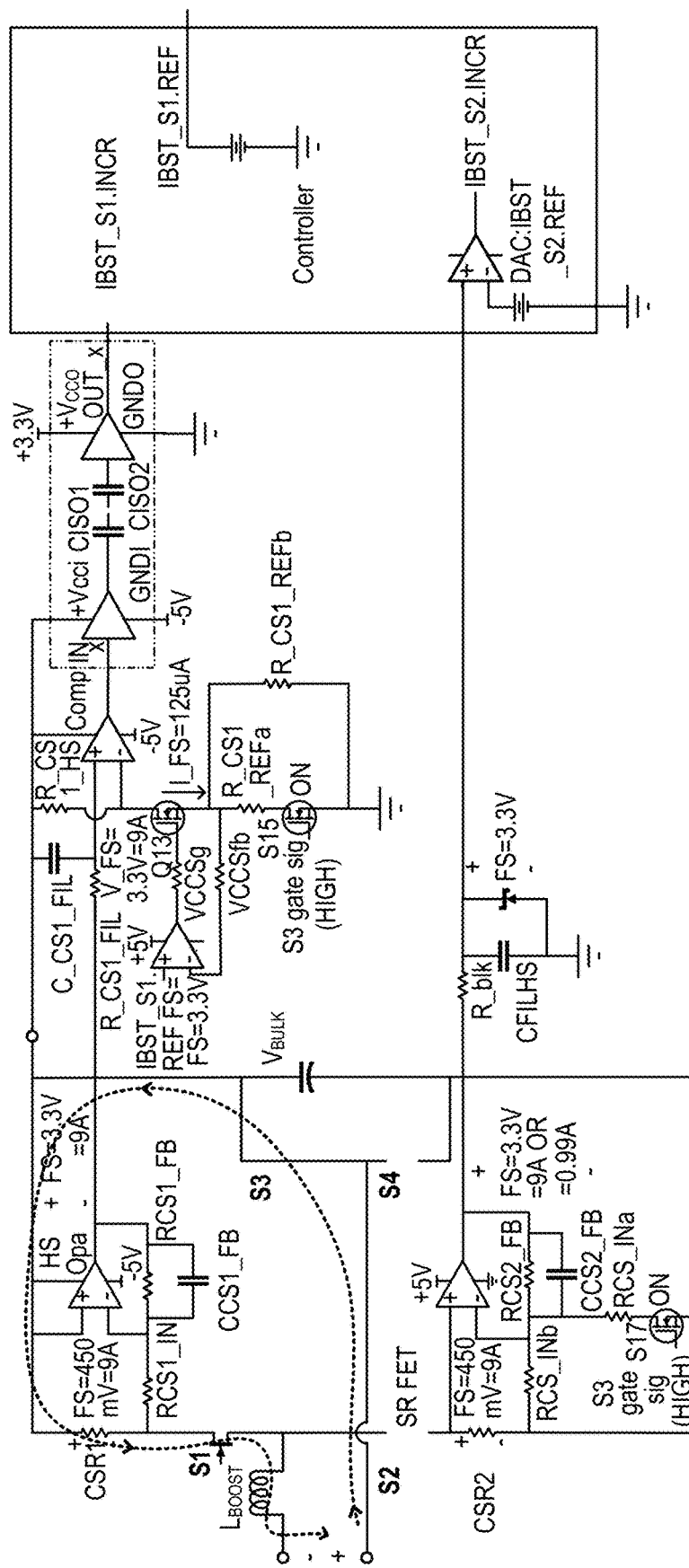
FIG. 14 is a simplified schematic diagram illustrating operation of a circuit during a first section of a total switching period during a negative AC half-cycle according to an embodiment of the present invention.
Figure 16:
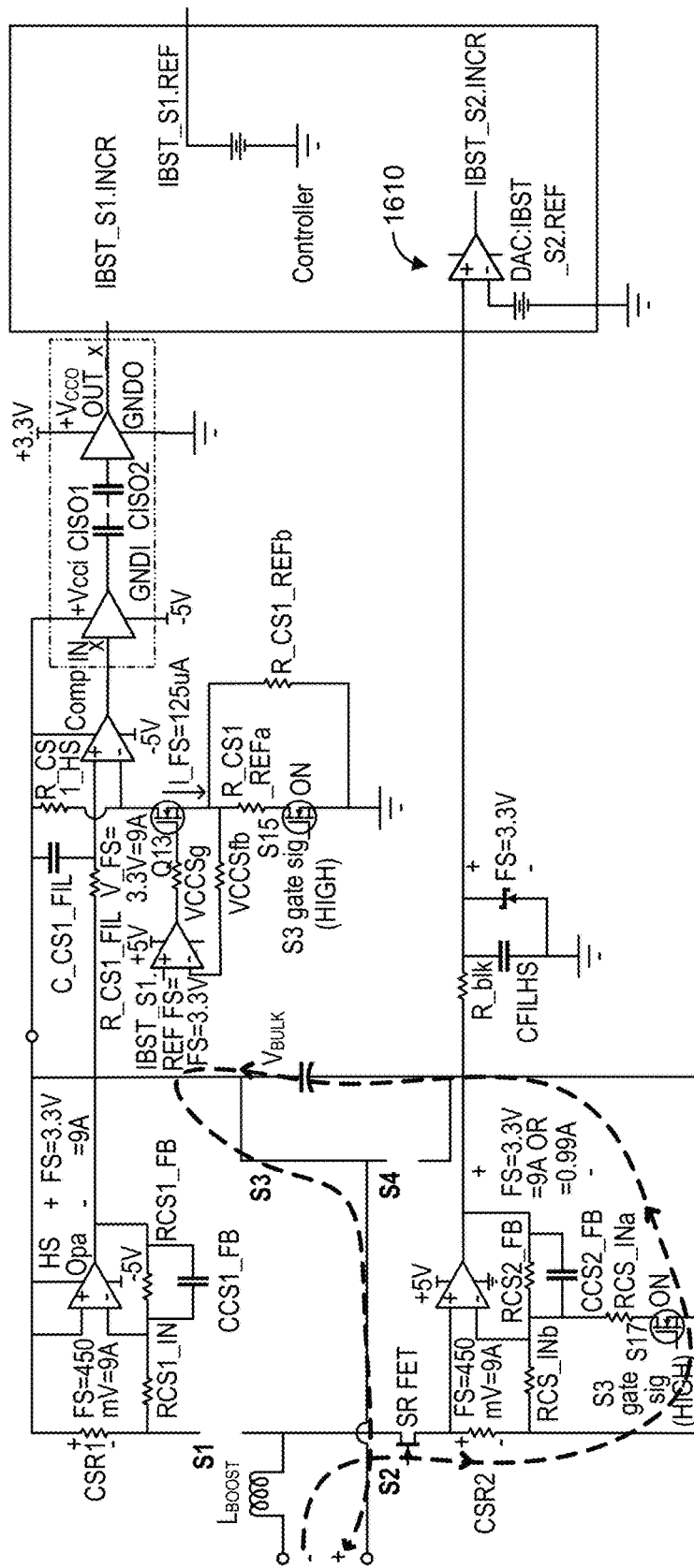
FIG. 16 is a simplified schematic diagram illustrating operation of a circuit during a third section of a total switching period during a negative AC half-cycle according to an embodiment of the present invention.

FIGS. 14 and 16 provide a specific implementation of the circuit and devices illustrated in FIGS. 13A-13H. Accordingly, the description provided in relation to FIGS. 13A-13H is applicable to FIGS. 14 and 16 as appropriate.

FIG. 14 is a simplified schematic diagram illustrating operation of a circuit during a first section of a total switching period during a negative AC half-cycle according to an embodiment of the present invention. During this first section of the total switching period, magnetization of the boost inductor occurs. As illustrated in FIG. 14, the current flow indicated shows that S1 conducts the inductor magnetizing current during the negative input voltage polarity half-cycle. Although S1 is turned on during the both of the sections illustrated in FIGS. 14 and 16, the operation is different. In FIG. 14, current flow through S1 is charging the inductor and S1 is acting as a control switch, whereas in FIG. 14, current flow through S1 is discharging the inductor as S1 acts as a synchronous rectifier switch. Thus, FIG. 14, which illustrates operation with a negative input voltage during the negative AC half-cycle, enables an OCP check.

Figure 15:
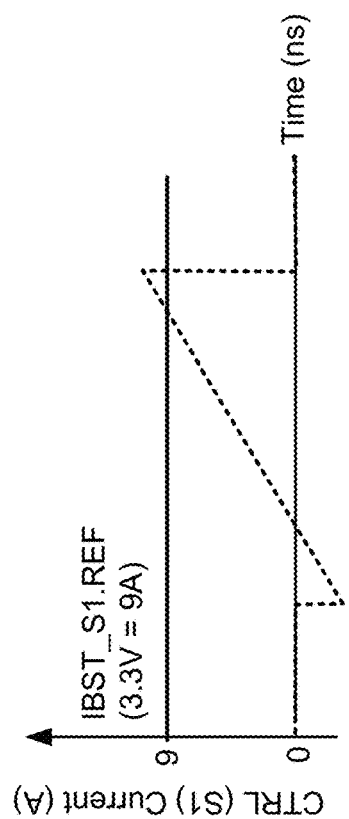
FIG. 15 is a plot illustrating an inductor current measured during the first section of the total switching period illustrated in FIG. 14 (dashed) and a positive reference for OCP indication (solid).

FIG. 15 is a plot illustrating an inductor current measured during the first section of the total switching period illustrated in FIG. 14 (dashed) and a positive reference for OCP indication (solid). The inductor current flowing through S1 during magnetization of the inductor when the input voltage is negative is illustrated. In FIG. 15, the current direction that the comparator receives at the input of the comparator is polarity-flipped because although the inductor current is negative it appears as a positive voltage at the comparator. Thus, the differential amp HS Opa is still scaled, by CSR1, to provide a full scale output voltage (e.g., 3.3 V) at a full scale peak current (e.g., 9 A). However, S15 is ON, causing the full scale DAC reference voltage (e.g., 3.3 V) to translate to a much higher current through R_CS1_HS than experienced during the positive input voltage AC half-cycle. Thus, a full scale DAC reference voltage (e.g., 3.3 V) corresponds to a magnetizing peak current of the highest expected current during normal operation (e.g., 9 A), thereby providing indications of over-current conditions and over-current protection. Thus, FIG. 15, which illustrates operation with a negative input voltage during the negative AC half-cycle, enables a fast loop (i.e., high frequency) OCP check.

FIG. 16 is a simplified schematic diagram illustrating operation of a circuit during a third section of a total switching period during a negative AC half-cycle according to an embodiment of the present invention. During the negative input voltage polarity demagnetization interval, second switch S2, acting as synchronous rectifier switch, conducts the inductor current. At the end of this third section, the inductor current $I_{LBOOST}$ is negative.

Figure 17:
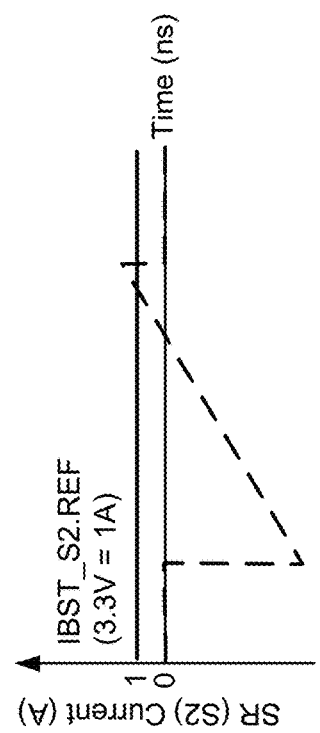
FIG. 17 is a plot illustrating an inductor current measured during the third section of the total switching period illustrated in FIG. 16 (dashed) and a positive reference for TCM indication.

FIG. 17 is a plot illustrating an inductor current measured during the third section of the total switching period illustrated in FIG. 16 (dashed) and a positive reference for TCM indication. In this figure, the representation of the inductor demagnetization current is illustrated along with a comparison against a 'negative' DAC reference, whose full scale voltage is different than it was during positive AC half-cycle. The highest 'negative' current is amplified with a gain to correspond to the full scale DAC reference IBST_S2.REF. Since S17 is ON, the gain of the differential amplifier is different during the negative input voltage half-cycle in comparison with the positive input voltage half-cycle and the full scale FS 'negative' value may be selected independently from the full scale 'positive' voltage in this manner. As a result, the full scale 'negative' value may be 1 A, while the full scale 'positive' value is 9 A.

Accordingly, using the circuits illustrated herein, the TCM indicator (i.e., 'negative' inductor current) is indicated by a comparator output edge, and the OCP (Over-Current Protection) is afforded by the same sensing/amplifying/DAC reference components enabling multiple uses of single components. In some embodiments, a parallel resistor switch allows optimal DAC full scale scaling to provide the best resolution depending on the function being implemented, either TCM or OCP.

Referring to FIG. 16, comparator 1610 is used to generate a series of pulses IBST_S2.INCR that represent the number of times that the inductor current decreases below the threshold value at the end of the time period illustrated by $T_{SR}$ during the negative AC half-cycle. As described in relation to FIG. 8B, the pulses counted, illustrated by TCM Pulses in FIG. 8B, can then be compared to the number of cycles, illustrated by SP Pulses in FIG. 8B. For comparison, during the positive AC half-cycle, comparator Comp is used to generate a series of pulses IBST_S1.INCR, using a level translator, that represent the number of times that the inductor current decreases below the threshold value at the end of the time period illustrated by $T_{SR}$ during the positive AC half-cycle. As described in relation to FIG. 8A, the pulses counted, illustrated by TCM pulses in FIG. 8A, can then be compared to the number of switching cycles, illustrated by SP Pulses in FIG. 8A.

Figure 18A:
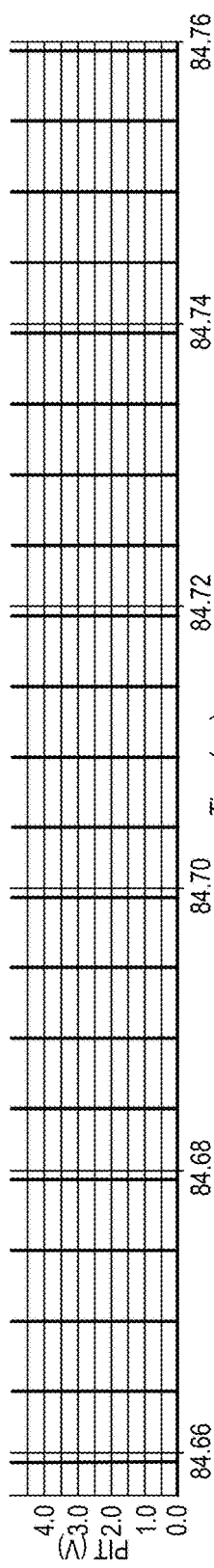
FIGS. 18A-18D are a set of plots illustrating a periodic interrupt timer, a SR conduction time correction factor, a TCM pulse indicator, and an inductor current according to an embodiment of the present invention.
Figure 18B:
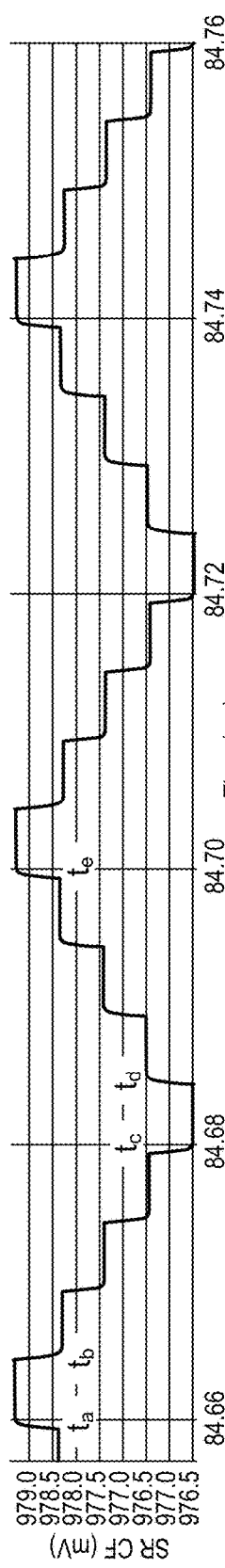
Figure 18C:
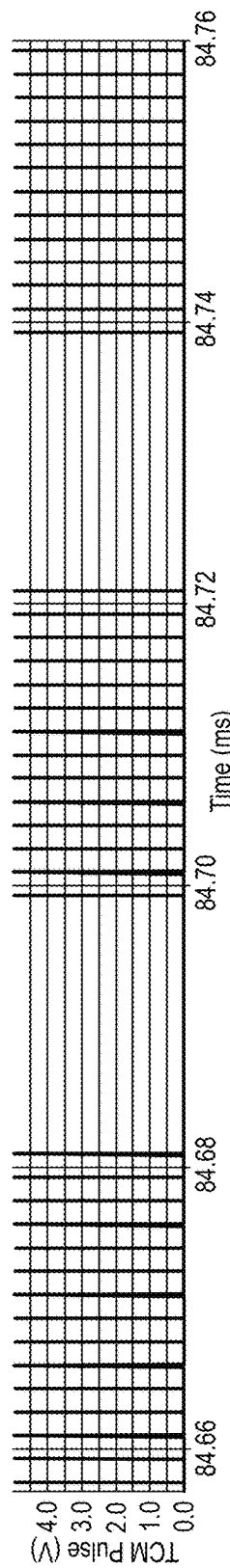
Figure 18D:
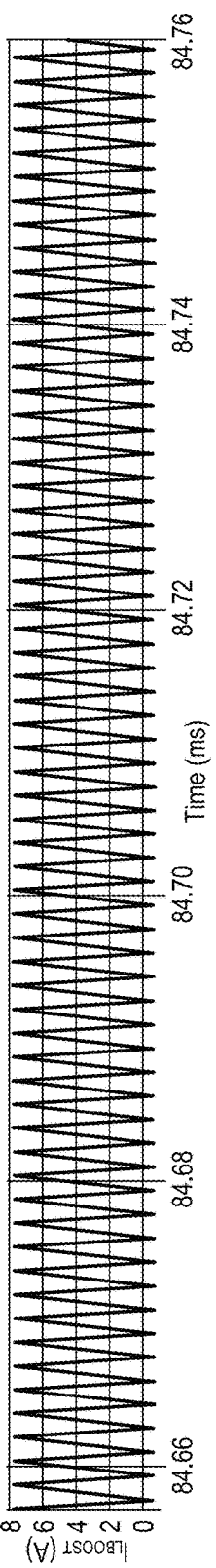

FIGS. 18A-18D are a set of plots illustrating a periodic interrupt timer, a SR conduction time correction factor, a TCM pulse indicator, and an inductor current according to an embodiment of the present invention. Specifically, FIG. 18A is a plot illustrating operation of a periodic interrupt timer, FIG. 18B is a plot illustrating a SR conduction time correction factor, FIG. 18C is a plot illustrating a TCM pulse indicator, and FIG. 18D is a plot illustrating an inductor current. The plots illustrated in FIG. 18A-D correspond to a closed loop system that is counting pulses and modifying the SR conduction time based on the number of pulses counted compared to the number of cycles. As illustrated, the systems described herein compare the number of switching cycles (i.e., the number of SP pulses) to the number of CrCM indicated pulses (i.e., the number of TCM pulses) at every PIT time interval shown in FIG. 18A. The PIT time interval can be compared to time $t_{PIT}$ illustrated in FIG. 8A during which four switching cycles occur. In FIG. 18A, three switching cycles occur during each PIT time interval. In FIG. 18A, the 'spikes' indicate the trigger of the PIT, and the 'distance' between two adjacent 'spikes' corresponds to $t_{PIT}$ in FIG. 8A.

The predicted SR conduction time is multiplied by a correction factor (e.g., 1 if the prediction is correct) that is indicated in FIG. 18B. The correction factor starts out at ~0.9785 and is increased at the first PIT time interval to ~0.9795. This would be in accordance with the previous interval between two PIT time interval pulses having more SP pulses than TCM pulses. The ERROR signal changes by a constant (e.g., 0.001, 0.002, 0.003, or the like) in either direction, but could be asymmetric or variable, at each PIT interrupt. The inductor current shown in FIG. 18D is 'anchored' to an appropriate (e.g., programmed) negative value as desired.

When the number of TCM pulses equals the number of SP pulses, indicating that the inductor current decreased to at least the predetermined threshold during each switching cycle, the correction factor is decreased, thereby decreasing the SR conduction time. This decrease in the correction factor is illustrated during time $t_a$ to $t_b$, as well as during the following three time periods. Once the SR conduction time decreases to a point at which the number of TCM pulses is less than the number of SP pulses, indicated by time $t_c$, the correction factor is once again increased to increase the SR conduction time. The time period between time $t_c$ and $t_d$, as well as the following three time periods, are characterized by the number of TCM pulses being less than the number of SP pulses. The SR conduction time is increased until the number of TCM pulses equals the number of SP pulses, which corresponds to time $t_e$.

Since the timing of when the set of TCM pulses is compared to the number of SP pulses in the PIT time interval does not need to be correlated with the switching period and the PIT duration can depend on the desired loop bandwidth, the system successfully achieves a decoupling of current sense sampling rate and application of said samples as well as eliminates the switching frequency limitation from comparator propagation delay as well as the need for propagation delay compensation. Current sensing is achieved cheaply and with small physical size in some embodiments, while preserving both low-frequency (LF) content (e.g., rectified AC frequency such as 120 Hz) and high-frequency (HF) content (e.g., switching frequency on the order of 1 MHz). Moreover, the embodiments described herein allow for the use of a single (per switch) current-sense amplifier, comparator and DAC reference to achieve two distinct features: Over-Current Protection and CrCM control (i.e., constant on-time control).

Since embodiments of the present invention update the SR conduction time at a frequency that is decoupled from the switching frequency, for example, a frequency related to the AC frequency, the control system does not depend on the switching frequency. In contrast with systems in which the control system is coupled to the switching frequency, resulting in scaling of the control system in conjunction with scaling of the switching frequency, embodiments of the present invention provide benefits not available using conventional systems as a result of this decoupling. If the switching frequency is increased for embodiments of the present invention, the comparison between the number of SP pulses and the number of TCM pulses will utilize an increased number of pulses, but not need to be performed at a different rate. One of ordinary skill in the art would recognize many variations, modifications, and alternatives.

Figure 19A:
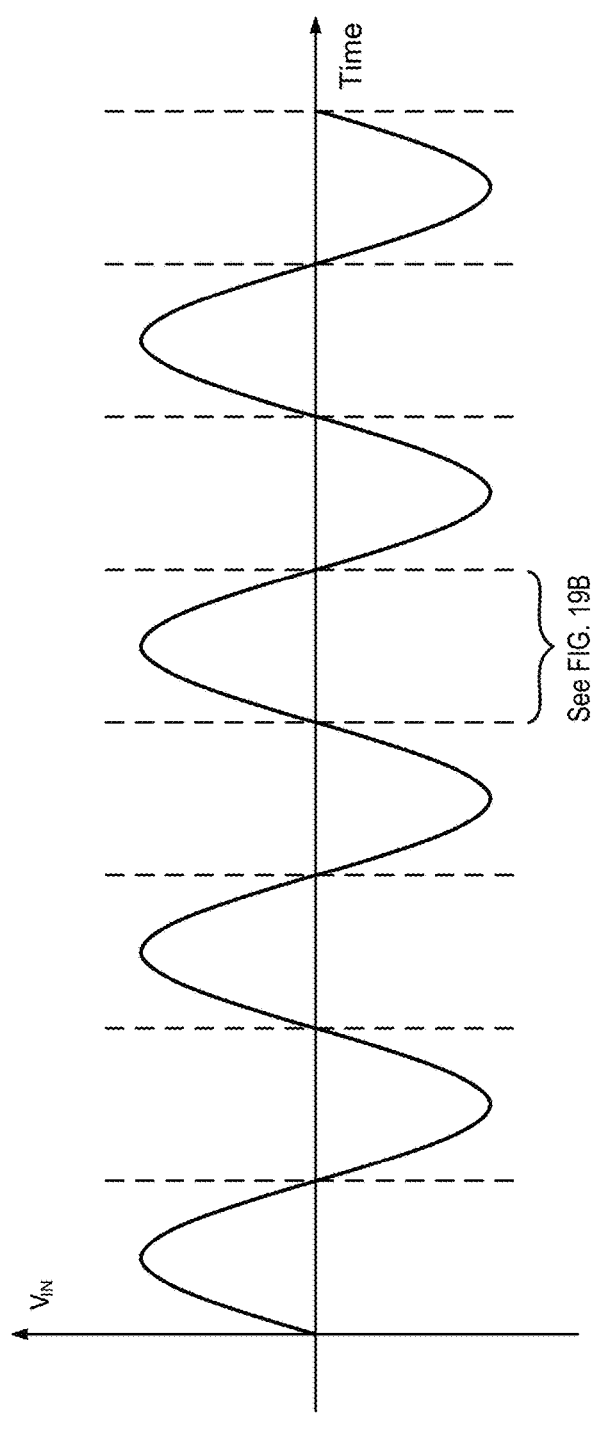
FIG. 19A is a plot of an AC cycle as a function of time.
Figure 19B:
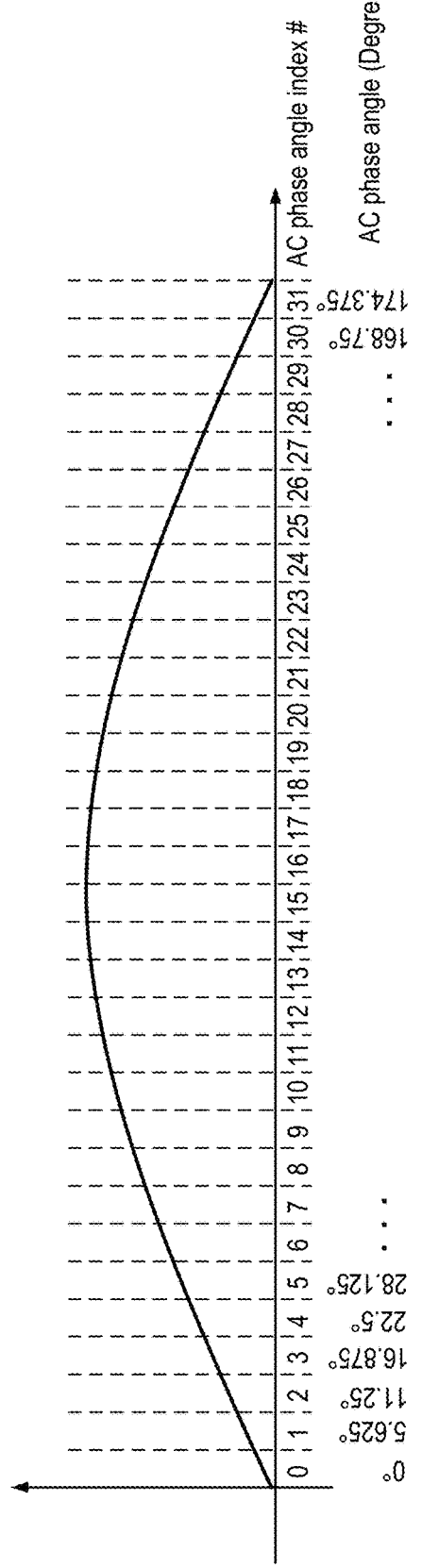
FIG. 19B is a plot illustrating an example programming of a periodic interrupt timer according to an embodiment of the present invention.

FIG. 19A is a plot of an AC cycle as a function of time. FIG. 19B is a plot illustrating an example programming of a periodic interrupt timer according to an embodiment of the present invention. The Period Interrupt Timer (PIT) can be implemented independently from other systems elements. In some implementations, the bandwidth of the 'inner' TCM control loop may depend on the interval duration, which can be represented in terms of frequency. In some embodiments, benefits can be achieved by synchronizing the interval to the AC frequency as illustrated in FIG. 19B. In FIG. 19B, the PIT is programmed to synchronize to the AC half-cycle time duration using a 'binary' number of intervals in which the number of PIT time intervals is equal to $2^M$, where M is a positive integer. Thus, the duration of each of the PIT time intervals is equal to the duration of the AC half-cycle (e.g., $\frac{1}{120}$ Hz) divided by $2^M$.

The number of PIT time intervals (i.e., AC phase angle indexes) in an AC half-cycle may be selected based on a variety of factors. A particular selection would ensure each PIT time interval does not have an excessive amount of SP pulses within a single PIT period. For a nominal switching frequency of ~1 MHz, the AC half-cycle could reasonably be split into ~1024 or 2048 PIT time intervals (i.e., M=10 or M=11), which would result in the number of possible pulses within one predetermined time interval to less than ~15. Since the AC cycle has a relatively stable frequency, the prediction of zero crossings can be accurate, enabling the AC half-cycle to be divided into a number of PIT time intervals synchronized to the AC half-cycle. Although 32 PIT time intervals are illustrated in FIG. 19B for purposes of clarity, it will be appreciated that the number of intervals is typically several orders of magnitude larger than this example. It should be noted that the AC phase angle can be determined given the particular PIT time interval of the total number of PIT time intervals. For example, in FIG. 19B, for PIT time interval 16 of 32, the AC phase angle is at ~90° corresponding to the maximum (peak value) of input voltage and for PIT time interval 32 of 32, the AC phase angle is substantially 180°.

In the embodiments described herein, the programmed SR conduction time is recalculated every (integer number of) PIT time interval based on the most recent samples of the relevant quantities and a correction factor that is approximately equal to one is determined based on the pulse counting and comparison performed based on the previous PIT time interval. Thus, the pulse comparison in the current PIT time interval is 'inherited' from last PIT time interval. Since, in some implementations, the changes in the SR conduction time are assumed to not change from one PIT time interval to another, the correction factor is 'inherited' from the previous PIT time interval and only changed differentially, not absolutely. It should be noted that since the PIT time interval is independent of the switching frequency, and can be defined as a function of the AC frequency, the control system can operate at a frequency corresponding to the PIT interval and be independent of the switching frequency. Accordingly, the PIT timer interval can be longer than the switching period, enabling the controller to operate at lower frequencies than the switching cycle in a manner that is decoupled from the switching frequency. As a result, the switching frequency can be increased while the controller and control system continues to operate at the same PIT frequency, merely resulting in an increased number of SP pulses in each PIT time interval. Additionally, comparator propagation delay will result in little to no impact on the control system since the pulses generated by the comparator can be counted despite the fact that they may be delayed.

Figure 20A:
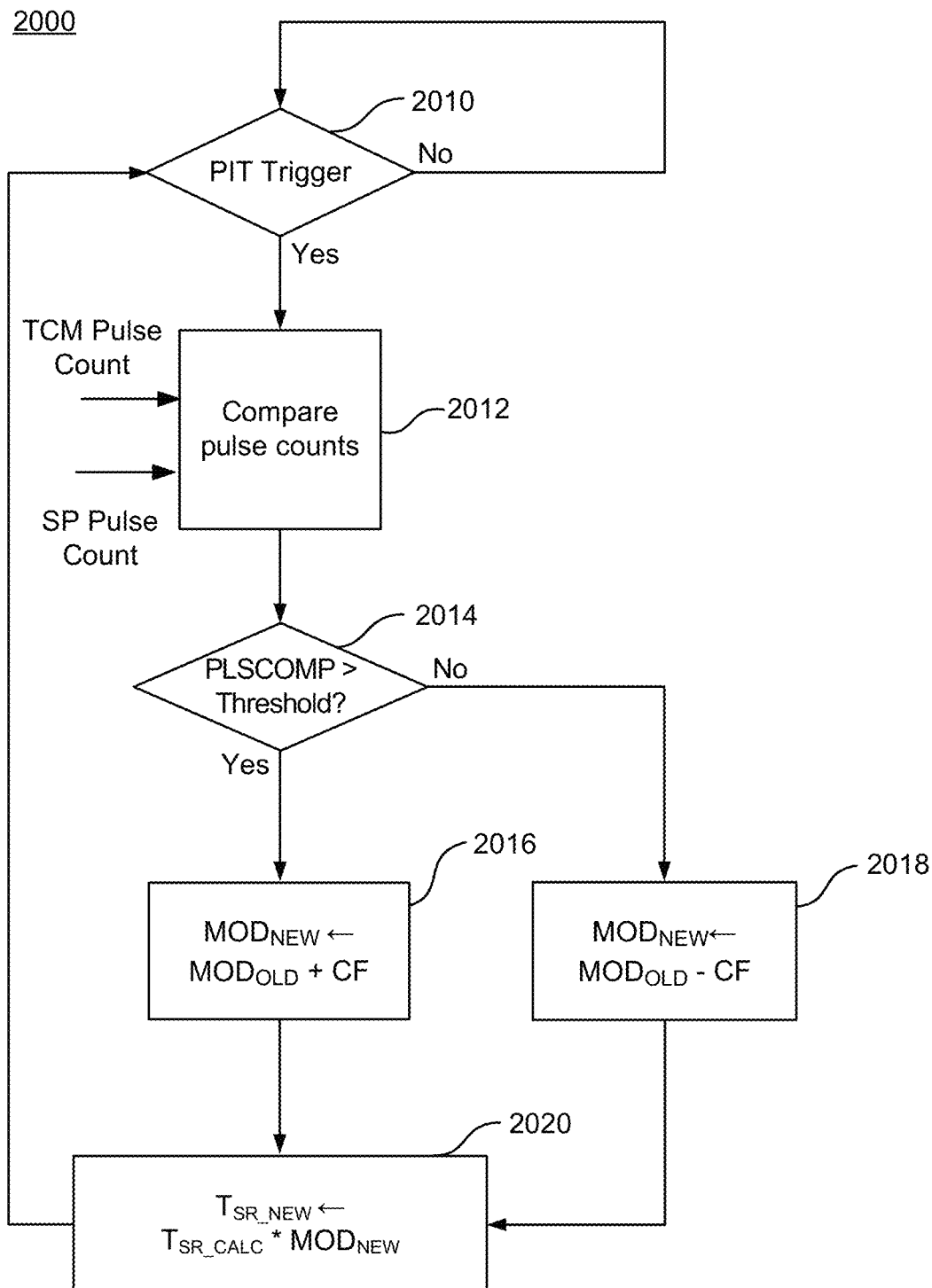
FIG. 20A is a simplified flowchart illustrating a method of setting a synchronous rectifier switch on-time according to an embodiment of the present invention.

FIG. 20A is a simplified flowchart illustrating a method of setting a synchronous rectifier switch on-time according to an embodiment of the present invention. The synchronous rectifier switch on-time can be referred to as a constant on-time although one of skill in the art will appreciate that the on-time will be modified during operation. The method 2000 includes determining that a periodic interrupt timer time interval or other suitable time interval has occurred (2010) and receiving a number of SP pulses during the periodic interrupt timer time interval or other suitable time interval and a number of TCM pulses measured during the periodic interrupt timer time interval or other suitable time interval (2012). The method also includes determining a pulse comparison value PLSCOMP equal to the number of SP pulses minus the number of TCM pulses during the periodic interrupt timer time interval or other suitable time interval (2012). The PLSCOMP is compared to a threshold at block 2014.

If the pulse comparison value is greater than a threshold, for example, a threshold of zero, then the synchronous rectifier switch on-time is increased, whereas, if the pulse comparison value is less than or equal to the threshold, for example, zero or negative, then the synchronous rectifier switch on-time is decreased. Referring to FIG. 20A, if the pulse comparison value is greater than the threshold (e.g., greater than zero) at block 2014, a modifier is increased by adding a correction factor (CF) to an initial modifier (2016) and the increased modifier is multiplied by an initial synchronous rectifier switch on-time to provide the new synchronous rectifier switch on-time (2020). If, on the other hand, the pulse comparison value is less than or equal to the threshold at block 2014, the modifier is decreased by subtracting a correction factor from the initial modifier (2018) and the decreased modifier is multiplied by the initial synchronous rectifier switch on-time to provide the new synchronous rectifier switch on-time (2020). The correction factor can be a constant value that is a small fraction of the modifier, for example, a correction factor of 0.003 or the like corresponding to a modifier of ~1. In some embodiments, the correction factor is a function of the pulse comparison value so that the increase or decrease in the synchronous rectifier on-time is a function of the pulse comparison value. As an example, the increase or decrease in the synchronous rectifier on-time can increase with the pulse comparison value as the correction factor is an increasing function of the pulse comparison value. As an example, for high pulse comparison values, for instance a pulse comparison value of 4, a larger correction factor could be utilized, for example, a correction factor of 0.01. For smaller pulse comparison values, for instance a pulse comparison value of 1-2, a smaller correction factor could be utilized, for example, the correction factor of 0.003 discussed above. In other embodiments, the increase or decrease in the synchronous rectifier on-time can be a function of the threshold.

Operation then returns to determining that a periodic interrupt timer time interval or other suitable time interval has occurred (2010) and the process is repeated for each PIT time interval or other suitable time interval, with the $T_{SR\_CALC}$ and $MOD_{OLD}$ value of iteration 2 being the $T_{SR\_NEW}$ and $MOD_{NEW}$ value of iteration 1 and so forth.

In some embodiments, the threshold is less than zero. As will be evident to one of skill in the art, the PIT can be asynchronous in relation to the switching frequency. In this case, it is possible that a TCM pulse can be counted in the absence of a corresponding SP pulse, resulting in a difference less than zero. On the following cycle, the "missing" WP pulse will likely be present, resulting in a difference increased by two. Furthermore, in some cases, depending on the timing between the SP pulses and the TCM pulses, the difference between the SP pulses and the TCM pulses can be greater than zero. Accordingly, the threshold can be set to different values as appropriate to the application.

Another embodiment could decrease $T_{SR}$ if PLSCOMP<1 and increase $T_{SR}$ is PLSCOMP≥1, thereby utilizing a threshold of one rather than zero as illustrated at decision block 2014. Other values for the threshold greater than one can also be utilized. One of ordinary skill in the art would recognize many variations, modifications, and alternatives.

It should be appreciated that the specific steps illustrated in FIG. 20A provide a particular method of setting a synchronous rectifier switch on-time according to an embodiment of the present invention. Other sequences of steps may also be performed according to alternative embodiments. For example, alternative embodiments of the present invention may perform the steps outlined above in a different order. Moreover, the individual steps illustrated in FIG. 20A may include multiple sub-steps that may be performed in various sequences as appropriate to the individual step.

Furthermore, additional steps may be added or removed depending on the particular applications. One of ordinary skill in the art would recognize many variations, modifications, and alternatives.

Figure 20B:
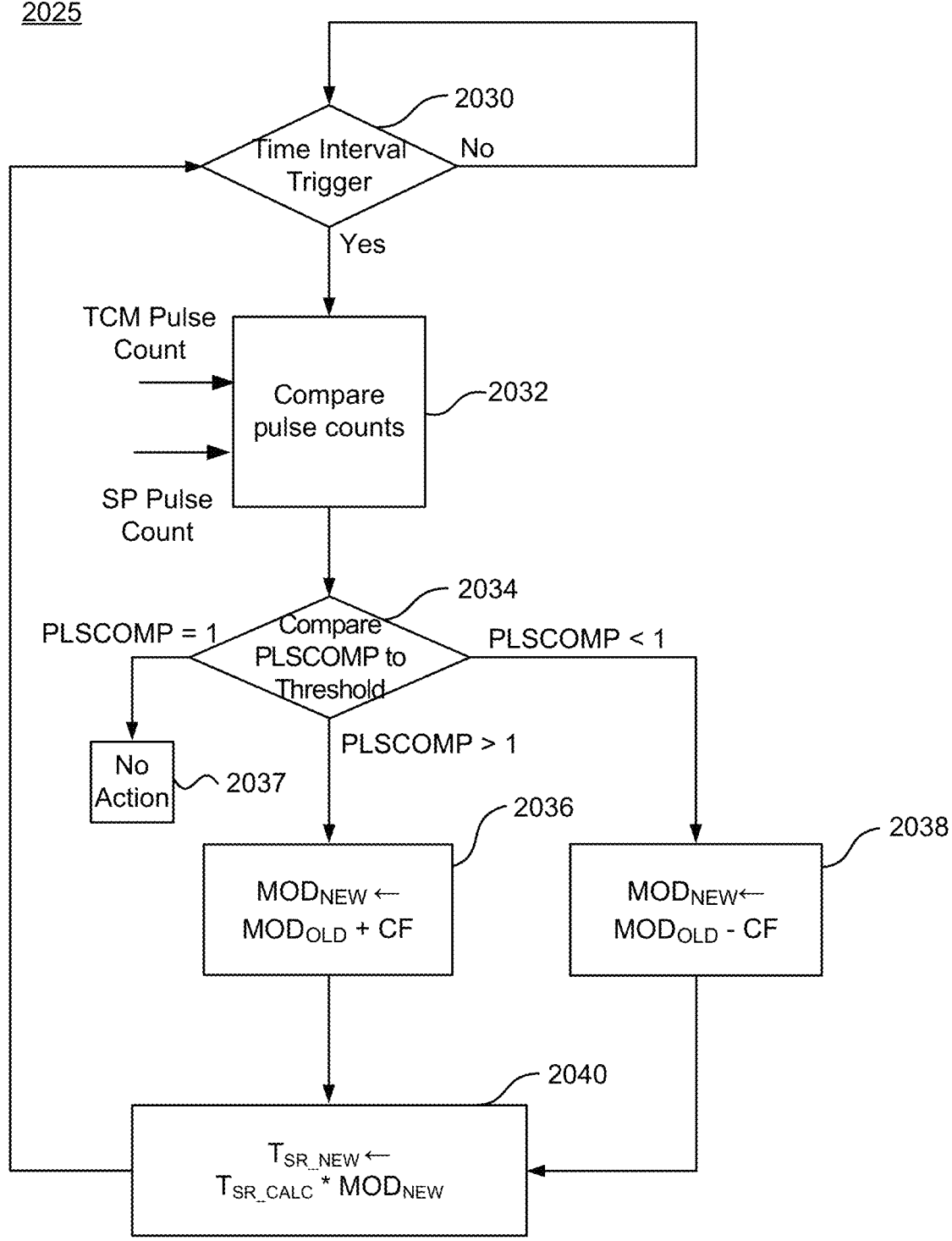
FIG. 20B is a simplified flowchart illustrating a method of setting a synchronous rectifier switch on-time according to another embodiment of the present invention.

FIG. 20B is a simplified flowchart illustrating a method of setting a synchronous rectifier switch on-time according to another embodiment of the present invention. FIG. 20B shares similarities with FIG. 20A and the description provided in relation to FIG. 20A is applicable to FIG. 20B as appropriate. In FIG. 20B, the following algorithm can be utilized:

IF PLSCOMP<1, THEN Decrease $T_{SR}$
ELSE IF PLSCOMP=1 THEN Maintain current $T_{SR}$
ELSE IF PLSCOMP>1, THEN Increase $T_{SR}$ Referring to FIG. 20B, the method 2025 includes determining that a time interval, for example, a periodic interrupt timer time interval, has occurred (2030) and receiving a number of SP pulses during the time interval and a number of TCM pulses measured during the time interval. The method also includes determining a pulse comparison value PLSCOMP equal to the number of SP pulses minus the number of TCM pulses during the periodic interrupt timer time interval or other suitable interval (2032).

The pulse comparison value is compared to a threshold at block 2034. In the embodiment illustrated in FIG. 20B, the threshold is one. If the pulse comparison value is equal to one (PLSCOMP=1), then no adjustment is made to $T_{SR}$. If the pulse comparison value PLSCOMP is greater than one (PLSCOMP>1), then the synchronous rectifier switch on-time is increased, whereas, if the pulse comparison value is less one (PLSCOMP<1), then the synchronous rectifier switch on-time is decreased. Referring to FIG. 20B, if the pulse comparison value is greater than one, a modifier is increased by adding a correction factor (CF) to an initial modifier (2036) and the increased modifier is multiplied by an initial synchronous rectifier switch on-time to provide the new synchronous rectifier switch on-time (2040). If, on the other hand, the pulse comparison value is less than one, the modifier is decreased by subtracting a correction factor from the initial modifier (2038) and the decreased modifier is multiplied by the initial synchronous rectifier switch on-time to provide the new synchronous rectifier switch on-time (2040). If, as discussed above, the pulse comparison value is equal to one, then no action is taken (2037).

Operation then returns to determining that the time interval has occurred (2030) and the process is repeated for each time interval, for example, each PIT time interval, with the $T_{SR\_CALC}$ and $MOD_{OLD}$ value of iteration 2 being the $T_{SR\_NEW}$ and $MOD_{NEW}$ value of iteration 1 and so forth.

It should be appreciated that the specific steps illustrated in FIG. 20B provide a particular method of setting a synchronous rectifier switch on-time according to another embodiment of the present invention. Other sequences of steps may also be performed according to alternative embodiments. For example, alternative embodiments of the present invention may perform the steps outlined above in a different order. Moreover, the individual steps illustrated in FIG. 20B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20C:
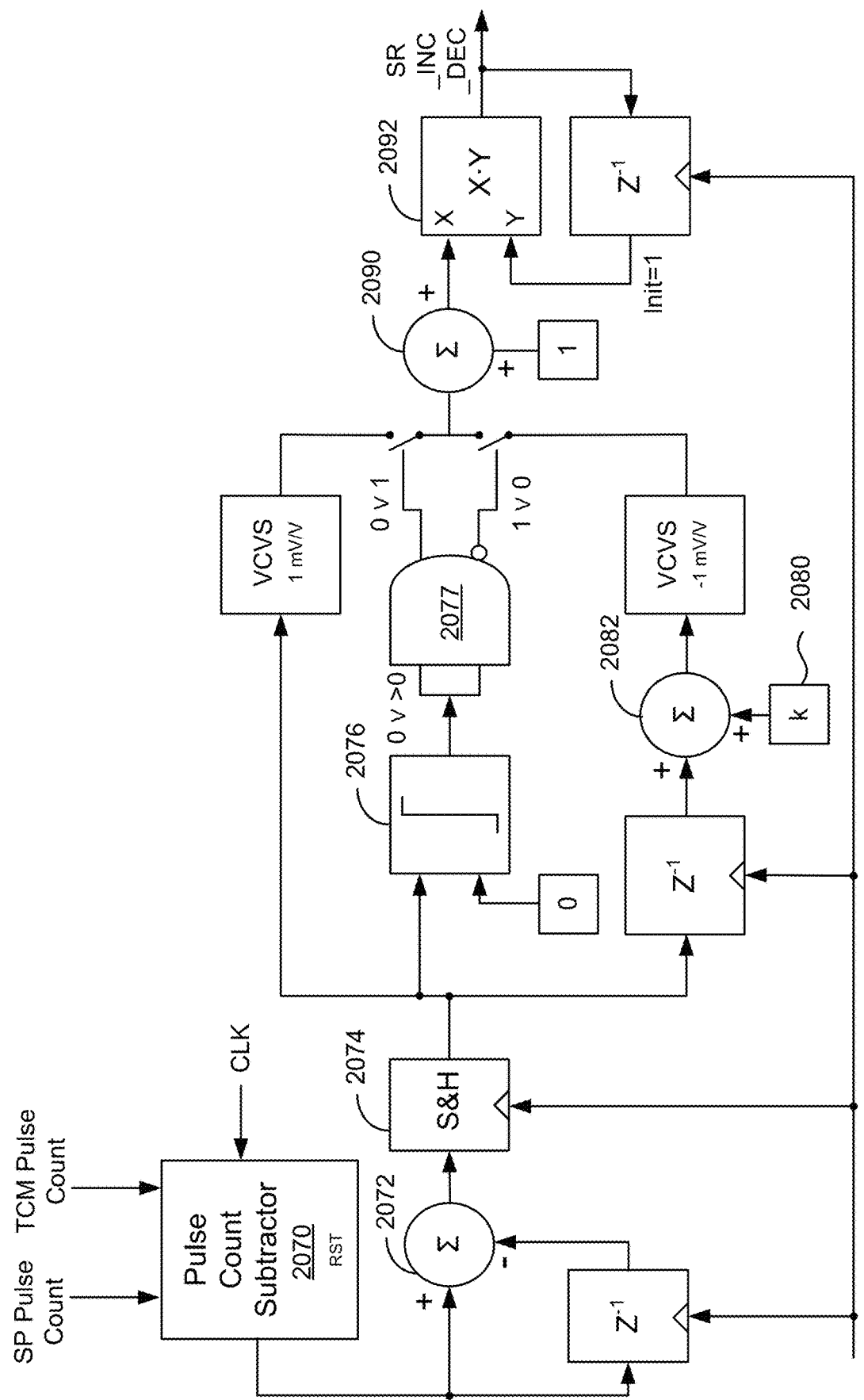
FIG. 20C is a simplified schematic diagram of a synchronous rectifier switch on-time calculator according to an embodiment of the present invention.

FIG. 20C is a simplified schematic diagram of a synchronous rectifier switch on-time calculator according to an embodiment of the present invention. The calculator illustrated in FIG. 20C can be utilized to implement blocks 2012, 2014, 2016, 2018, and 2020 discussed in relation to FIG. 20A.

Referring to FIG. 20C, the SP pulse count and the TCM pulse count are received at pulse count subtractor 2070, which computes the difference in the pulse counts. In some embodiments, pulse count subtractor 2070 is always counting up, not resetting in response to the PIT. Accordingly, the difference is provided to summer 2072, which produces the difference between SP pulses and TCM pulses during a PIT time interval, which is provided to sample and hold circuit 2074. Thus, referring to FIG. 20A, the pulse count determined at 2012 corresponds to the difference provided to sample and hold circuit 2074. The difference between SP pulses and TCM pulses during a PIT time interval is compared to zero using comparator 2076. In other embodiments, rather than using zero as one of the inputs to comparator 2076, other thresholds for the difference between SP pulses and TCM pulses during a PIT time interval can be utilized.

In this embodiment utilizing a threshold of zero, if the difference is greater than zero, the correction factor is added to the modifier, whereas, if the difference is equal to zero, the correction factor is subtracted from the modifier. In the implementation shown in FIG. 20C, the output of comparator 2076 is either zero or a value greater than zero represented by (0 v>0). The AND gate with a NAND output 2077 thus outputs a complementary pair of either a 0 and 1 or a 1 and 0. The new modifier is summed with one at summer 2090 and used as an input to multiplier 2092. The initial or previously calculated $T_{SR}$ is utilized as the other input to multiplier 2092. Accordingly, as illustrated at block 2020 of FIG. 20A, the calculated $T_{SR}$ is multiplied by the new modifier to produce the new $T_{SR}$, which is used to increment or decrement $T_{SR}$ as illustrated by SR_INC_DEC at the output of multiplier 2092. As illustrated in FIG. 20C, gain 2080 (i.e., k) is used to set the value of the correction factor that is provided to summer 2082.

Current sensing can be performed by the choice of an appropriate controller reference. In conventional systems, since only a single diode will be carrying current, one of the current sensor will not be carrying current. However, if employing TCM control, the current is bidirectional. The voltage representing sensed current is negative compared to a 'ground' reference when representing a 'magnetizing' inductor current (i.e., a desirable, positive inductor current), but goes positive for a negative current. In order to compare the current against a negative threshold (i.e., for TCM control), it would be necessary to generate a negative threshold, which is not directly possible using a DAC, resulting in the need for an inverting op amp.

Some embodiments of the present invention enable AC voltage sensing, AC zero-crossing detection, and/or bulk voltage sensing using a standard controller ground without the need for an AC rectifier. As described herein, embodiments of the present invention enable AC voltage sensing, AC zero-crossing detection, and bulk voltage sensing, while enabling bidirectional current sensing with a unipolar DAC referencing at full scale for both positive (i.e., peak-current or over-current protection) as well as negative (i.e., TCM or CrCM control) bidirectional inductor current. Moreover, although the description herein is provided in relation to an ADC sample and hold configuration, it will be appreciated that the embodiments are also fully applicable to analog circuits as well. One of ordinary skill in the art would recognize many variations, modifications, and alternatives.

In a conventional bridge-rectified boost circuit, the "GND" reference is at the 'bottom' of the bulk capacitor. The AC input voltage sensing circuit is individually rectified. This rectification circuit has a return path through one of the diodes in the AC bridge, and thus has a 2-diode drop error in the sensed voltage.

In contrast with conventional approaches, embodiments of the present invention reference the controller to a "ground" at the "bottom" of the bulk capacitor in a bridgeless converter and implement a novel AC input voltage sensing (and zero-crossing detection system and method) based on this reference point. As a result, bulk voltage sensing is enabled with the controller referenced to the same reference. According to embodiments of the present invention, a digital system is provided in which bulk voltage is sampled via an ADC, and the scaling circuit (i.e., voltage divider) can be coupled in, for example, via a switch, during sampling and coupled out otherwise in order to save power dissipation. It would be appreciated by one of skill in the art that a series rectifying diode in the input voltage sensing path, i.e., in series with the resistor divider, (and bulk voltage sensing path for symmetry) may provide additional guaranteed protection against a (mistakenly) negative input voltage on the ADC, however is not fundamentally required/necessary (for standard 'rectification' of negative voltage).

Figure 21:
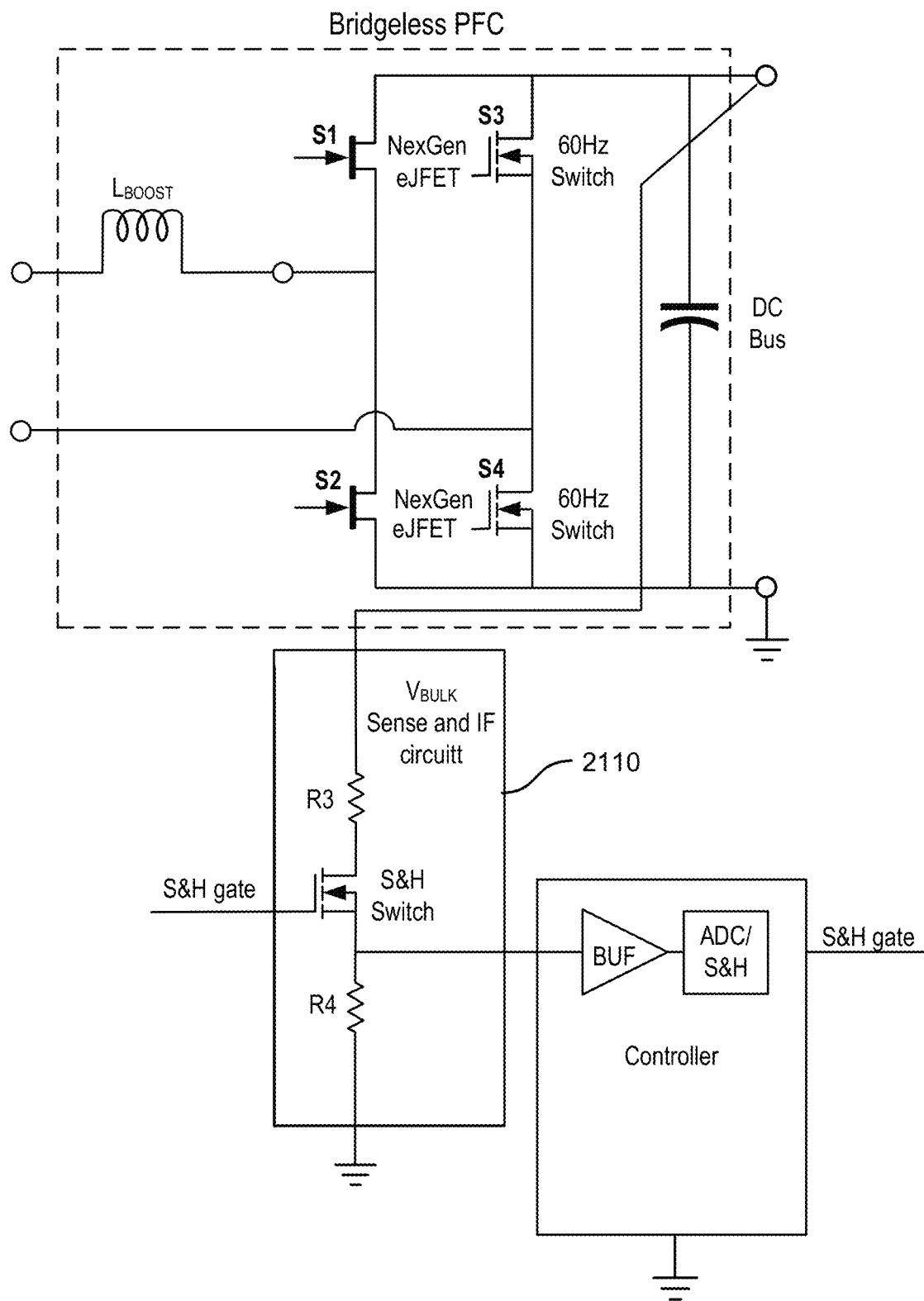
FIG. 21 is a simplified schematic diagram illustrating a circuit for performing bulk voltage sensing according to an embodiment of the present invention.

FIG. 21 is a simplified schematic diagram illustrating a circuit for performing bulk voltage sensing according to an embodiment of the present invention. In this exemplary bulk voltage sensing system, sampling is performed via ADC in a digital system. The sample and hold (S&H) gate of the bulk voltage sensing and interface (IF) circuit 2110 is toggled HI to turn ON the S&H switch prior to (e.g., immediately) the sampling of $V_{BULK}$. After settling and sampling, the S&H gate signal is toggled LO until next sample-event.

Because the bulk voltage is always positive compared to the reference, no rectifying diode is required by embodiments of the present invention. Moreover, no amplifier is required either, since R3/R4 may be dimensioned appropriately for full scale utilization of the ADC range.

The AC input voltage sensing discussed herein can utilize an ADC sampling method for digital control. However, the methods and systems described herein are applicable in other sensing domains. The input voltage sensing system and zero-crossing sensing system and method described herein utilizes knowledge of the bulk voltage and the ability to apply appropriate arithmetic function(s) in either the analog or digital domain.

As illustrated in FIG. 21, the bulk voltage is sensed using the S&H circuit and the controller including an ADC. In addition to the circuit illustrated in FIG. 21, the S&H switch could be removed and the bulk voltage could be measured using a voltage divider. Because the DC bus voltage (i.e., the bulk voltage) is always positive, an ADC can be used to measure the voltage produced by the voltage divider.

Figure 22:
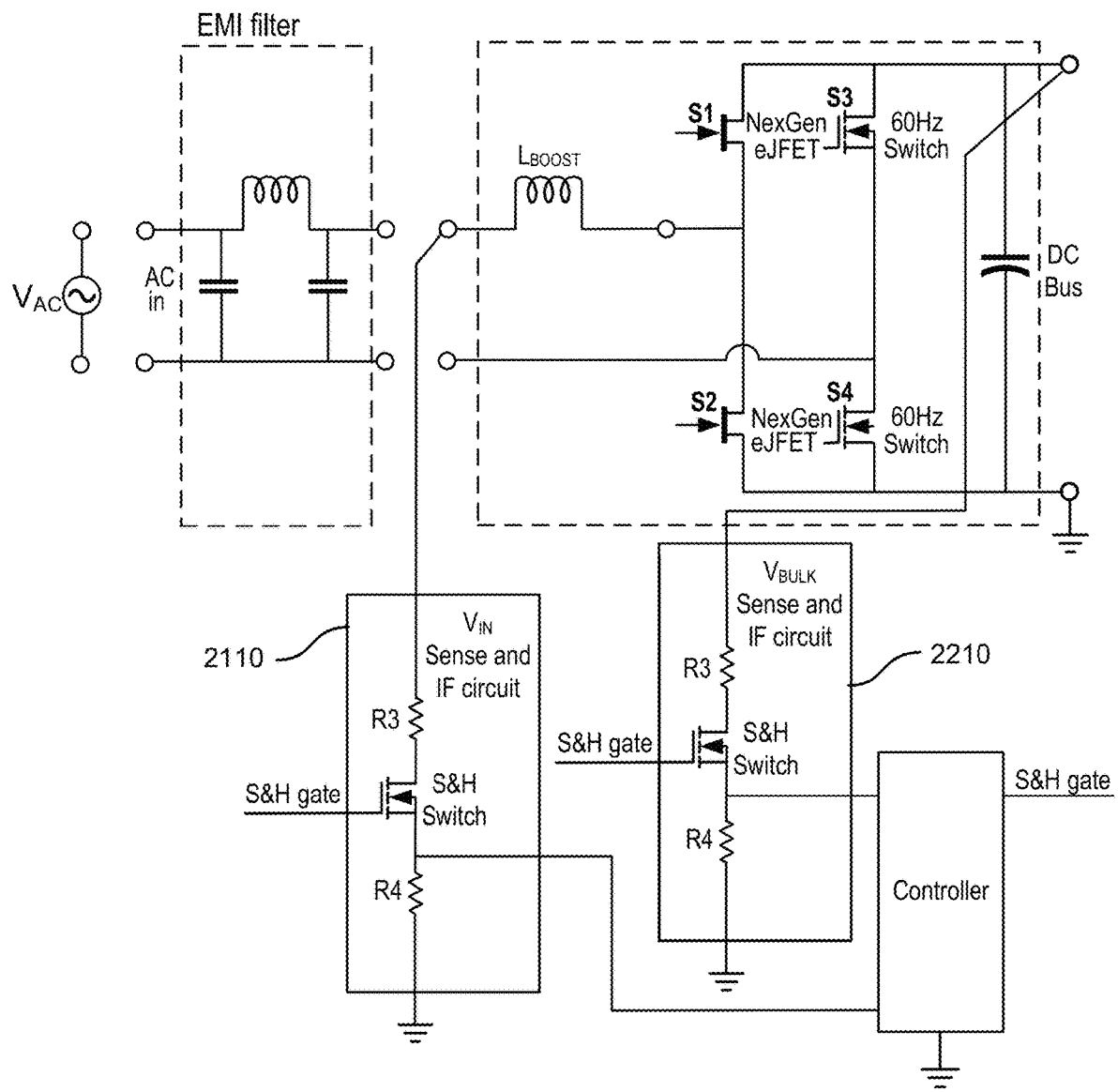
FIG. 22 is a simplified schematic diagram illustrating a circuit for performing input voltage and bulk voltage sensing according to an embodiment of the present invention.

FIG. 22 is a simplified schematic diagram illustrating a circuit for performing input voltage and bulk voltage sensing according to an embodiment of the present invention. In this circuit, the input voltage can be sensed for a bridgeless converter referenced to the 'bottom' of the bulk capacitor. As described more fully below, the system and method are different depending on whether the input voltage is positive or negative.

Figure 23A:
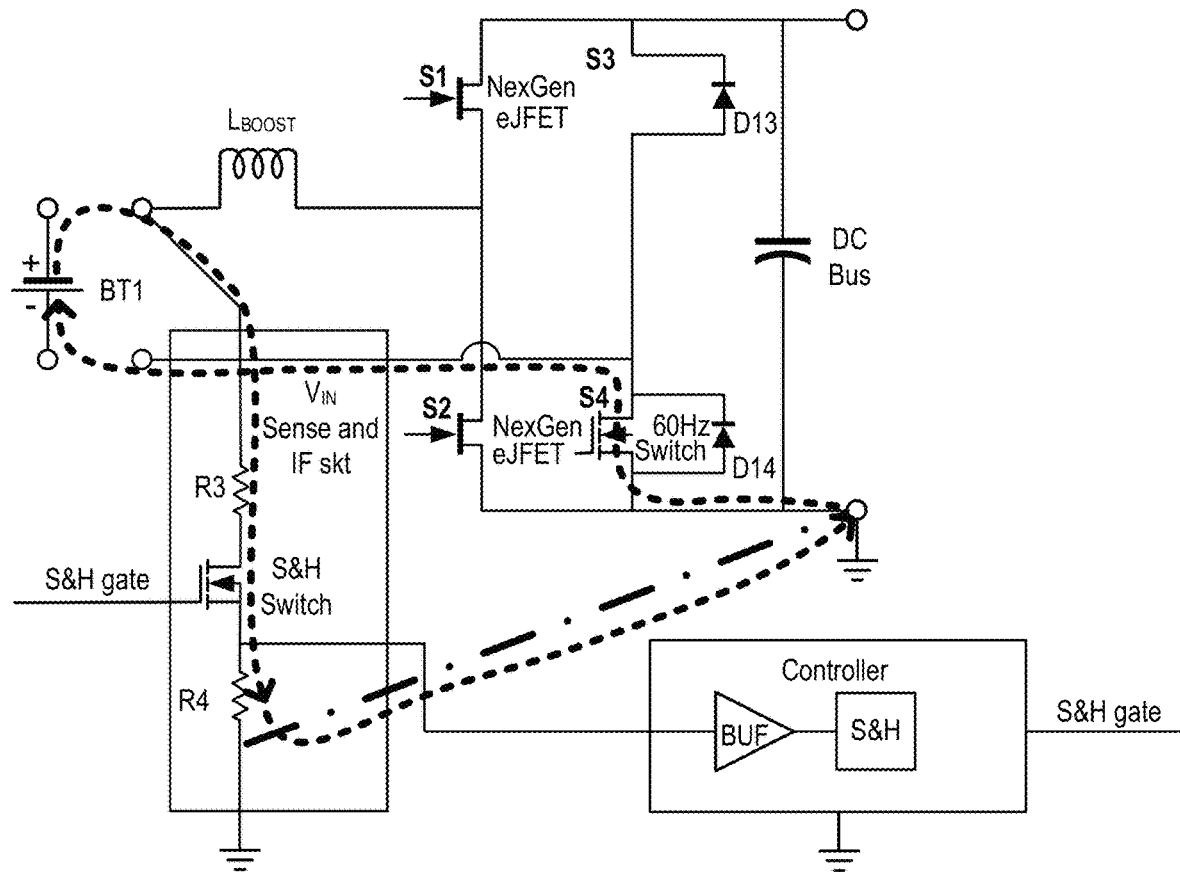
FIG. 23A is a simplified schematic diagram illustrating a circuit for performing input voltage sensing during a positive AC half-cycle according to an embodiment of the present invention.

FIG. 23A is a simplified schematic diagram illustrating a circuit for performing input voltage sensing during a positive AC half-cycle according to an embodiment of the present invention. During the positive input voltage half-cycle, the current loop for sensing $V_{IN}$ is as shown in FIG. 23A using a voltage sensing circuit including no diodes. During positive $V_{IN}$, a current loop is closed from BT1'+' through R3, the S&H switch, R4, S4 and back to BT1'−'. In case S4 is also OFF, D14 will close the loop (with 'penalty' of a diode drop error voltage in the loop, for example, no resolution of voltage between 0V to a diode forward voltage). During the positive AC half-cycle, S3 is kept OFF.

Assume the on-resistance of the S&H switch is near 0Ω, when the S&H gate signal is "high," and that the S&H switch can block sufficiently high voltage (i.e., higher than the highest potential positive input voltage), when the gate signal is "low". When the S&H gate signal is "high," a resistive voltage-divider is in-place, which enables sensing of a (scaled-down) version of the input voltage. S4 may be ON, in which case D14 is bypassed by a (low-ohmic) contact as illustrated by the current flow illustrated in FIG. 23A. In that scenario, R3 and R4 are substantially the only non-zero impedances in the path, which does not have any forced voltage drops, such as forward-biased diodes. Assuming an appropriate selection of R3 and R4, the highest anticipated input voltage may be scaled to present the ADC with a full scale voltage for optimum use of the range. Analog filtering may be implemented by a capacitor in parallel with R4 (or an RC LP filter may be implemented prior to "BUF" in FIG. 23A. S1 and S2 may switch during measurement, since $L_{BOOST}$ is 'decoupling' the switch-node from the sensing circuit. However, S3 and S4 are operated so that they are not ON simultaneously. It should be noted that if S3 is 'accidentally' ON instead of S4 during the positive input voltage, the input voltage is added to the bulk-voltage across the voltage divider. Accordingly, the absolute maximum voltage across R4 may be clamped by a TVS or similar device to ensure that no damage to the controller in the case that S3 is ON during the positive input voltage.

It should be noted that the positive input voltage can be measured even if both S4 and S3 are OFF. As shown in FIG. 23A, diode D14, which is a component of the switch, provides a current path from ground (i.e., the bottom of the voltage divider) to BT1'−' even if S4 is OFF.

Figure 23B:
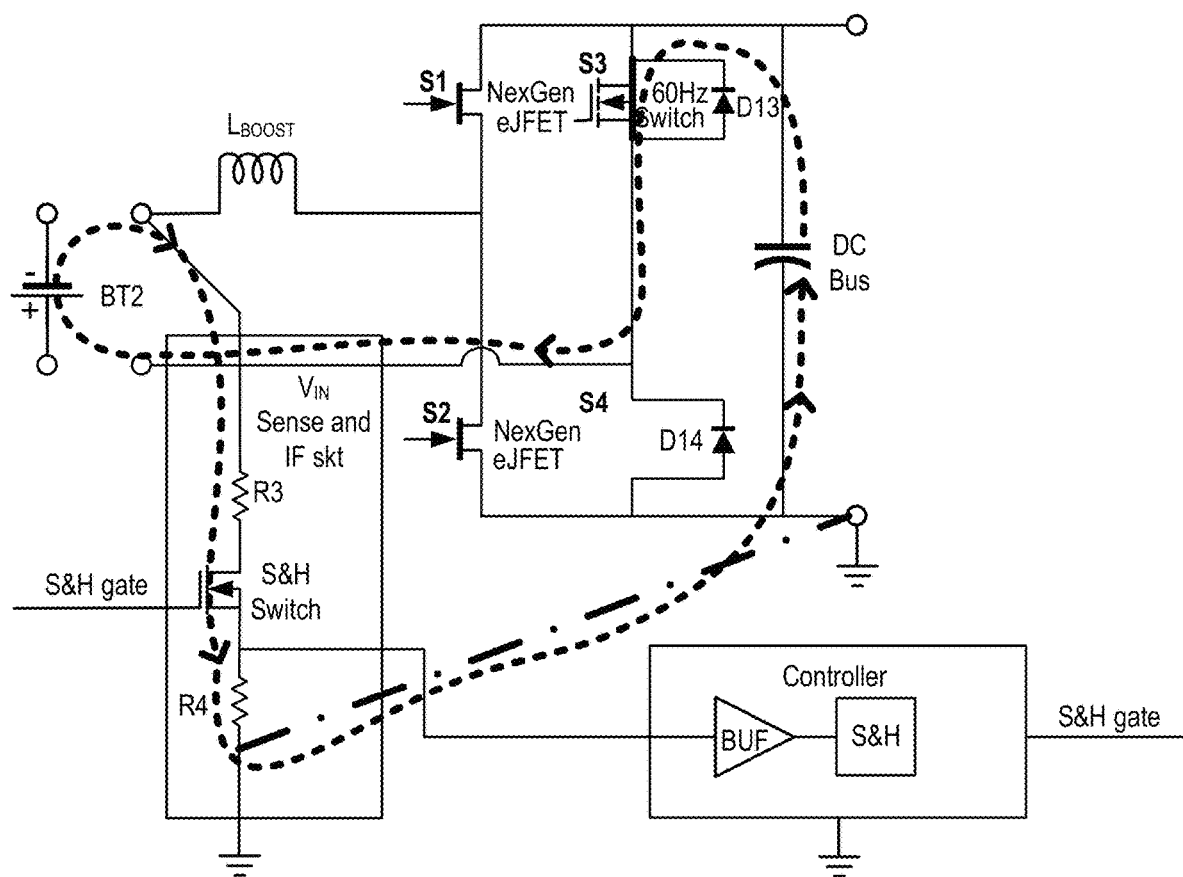
FIG. 23B is a simplified schematic diagram illustrating a circuit for performing input voltage sensing during a negative AC half-cycle according to an embodiment of the present invention.

FIG. 23B is a simplified schematic diagram illustrating a circuit for performing input voltage sensing during a negative AC half-cycle according to an embodiment of present invention. During the negative input voltage half-cycle, S3 is ON and S4 is OFF. When the S&H switch is ON, the voltage across the R3/R4 resistor divider is equal to the bulk voltage (DC Bus voltage) plus the input voltage, which is negative. Due to the "boost" nature of the converter, the bulk voltage (DC Bus voltage) is necessarily higher than (or equal to) the absolute input voltage. As a result of the absolute value of the bulk voltage being higher than the absolute value of the input voltage, the series combination of the two voltages, even given a negative input voltage, is positive. As a result, the sensing system measures (a) the bulk voltage as well as (b) the bulk voltage plus the negative input voltage. Using the bulk voltage, which can be measured using the system illustrated in FIG. 21, the actual input voltage can be computed.

The current loop is from the 'top' of the bulk capacitor (i.e., the DC Bus capacitor) through S3 (which is ON), through BT2'+' and BT2'−', through R3/S&H switch/R4 and back to 'bottom' of the bulk capacitor (i.e., the DC Bus capacitor). As illustrated in FIG. 23B, the circuit does not include any diodes and there are no diode voltage drops or other forced voltage errors in the path. To the extent that the S&H Switch and S3 are very low On-resistance switches, R3 and R4 are the only non-zero impedance elements in the loop. As a result, embodiments of the present invention provide a high-precision sensing circuit with good resolution close to 0V (uninhibited by diode forward voltage drops).

According to embodiments of the present invention, power dissipation optimization through the S&H switch is performed as follows. The S&H switch may be completely omitted and be substituted for a short-circuit. However, the optional switch may facilitate a power-savings by coupling out R3 and R4 whenever the system is not sampling. The sampling sequence is therefore:
1) Turn ON the S&H switch
2) Wait for settling
3) Sample
4) Turn OFF the S&H switch
5) Wait for next sampling instance R3 and R4 may be dimensioned for better SNR (Signal-to-Noise-Ratio) by decreasing their impedance. This causes higher static power dissipation with the input voltage across them. The power dissipation may be modulated by the use of the S&H switch in the same or a similar way as for the S&H switch in the bulk voltage sensing circuit described above. Moreover, R3 and R4 may be used as an X-Cap discharge path if S&H switch is held ON 'permanently' upon detection of "loss of AC" (a safety requirement)—or at least long enough for the sensed X-Cap voltage (in that case) to be less than safety requirement (SELV~42V {Safe Electric Low Voltage}).

Figure 24A:
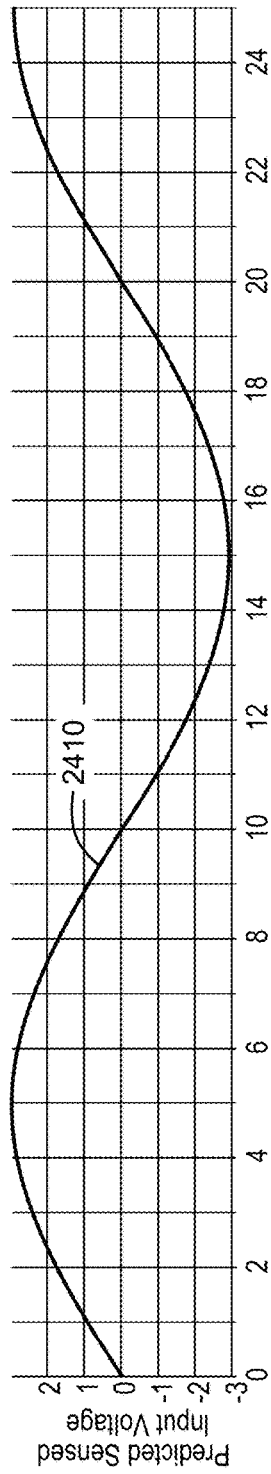
FIGS. 24A-24C are a set of plots illustrating a reconstructed input voltage, an actual bulk voltage, an actual input voltage, a sensed bulk voltage, and a sensed input voltage according to an embodiment of the present invention.
Figure 24B:
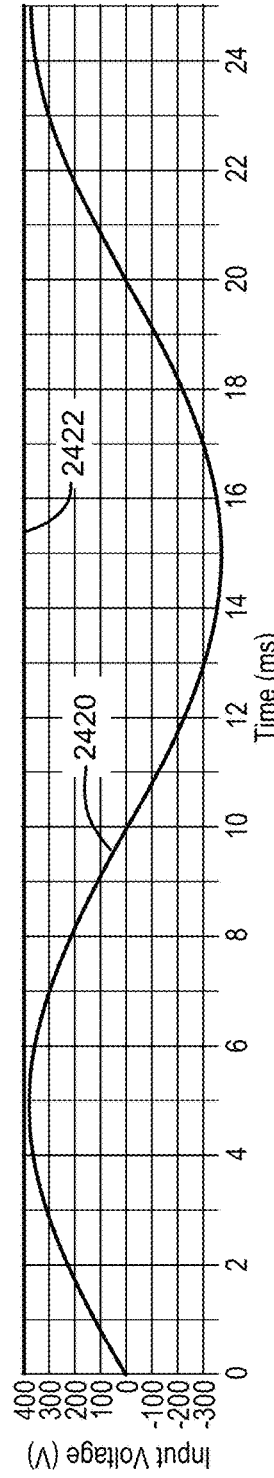
Figure 24C:
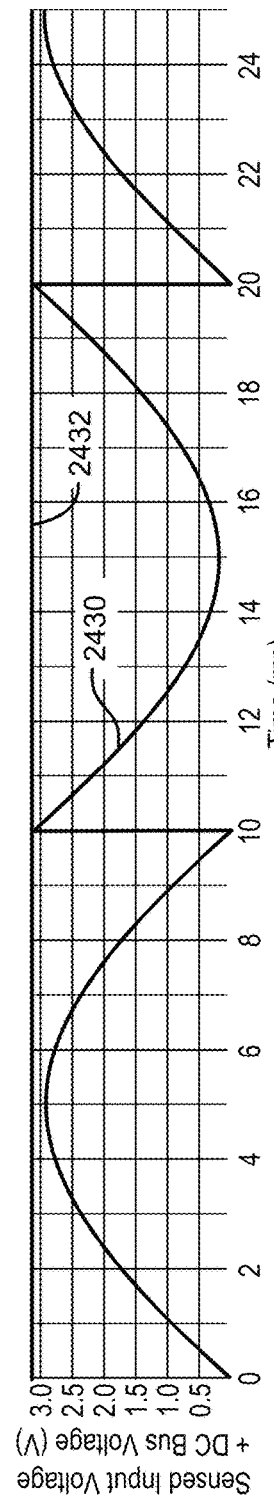

The arithmetic to determine $V_{IN}$ during the negative input voltage half-cycle can be computed as follows. During the positive input polarity, the sensed voltage is a direct expression for input voltage. However, during the negative input voltage polarity, the sensed voltage is the bulk voltage plus the negative input voltage. FIGS. 24A-24C are plots from a simulation showing the waveforms including the arithmetic to determine the actual input voltage, sensed from sensed voltage, over a full AC cycle.

FIGS. 24A-24C are a set of plots illustrating a reconstructed input voltage (2410), an actual input voltage (2420), a sensed bulk voltage (2432), and a sensed input voltage (2430) according to an embodiment of the present invention. The arithmetically determined/reconstructed input voltage 2410 (i.e., scaled to 3.3 V full-scale) is shown in FIG. 24A. FIG. 24B is a plot of the 400 V full-scale actual bulk voltage 2422 and the actual input voltage 2420. FIG. 24C is a plot of the sensed bulk voltage 2432 scaled to 3.3V full-scale and the sensed input voltage 2430 as measured by the voltage across R4.

As illustrated in FIG. 24B, the actual bulk voltage 2422 in this example is 400 V and the actual input voltage 2420, from 0 ms to 10 ms, is positive during the positive AC half-cycle, increasing from 0 V to almost 400 V and then returning to 0 V. The sensed input voltage 2430, during the period from 0 ms to 10 ms, also increases to ~3 V and returns to 0 V. At 10 ms, when $V_{IN}$=0V, S4 is turned OFF and S3 is turned ON. As a result, the sensed voltage increases from 0 V to ~3.1 V, coinciding with the scaled bulk voltage 2432 since the sensed voltage is the series combination of the bulk voltage and the input voltage, which is 0 V at 10 ms.

From 10 ms to 20 ms, the actual input voltage 2420 is negative during the negative AC half-cycle, decreasing from 0 V to almost –400 V and then returning to 0 V. The sensed input voltage 2430, during the period from 10 ms to 20 ms, is the actual input voltage, which is a negative value, added to the bulk voltage. As a result, as the actual input voltage decreases and then increases during this period, the sensed input voltage also decreases and then increases as illustrated in FIG. 24B. At 20 ms, when $V_{IN}$=0V, S3 is turned OFF and S4 is turned ON. As a result, the sensed voltage decreases from ~3.1 V to 0 V, since the sensed quantity is now a 'direct' (i.e., scaled) representation of actual input voltage again.

Thus, the ADC measures the sensed input voltage 2430, which is always positive, and the system is able to compute the reconstructed input voltage 2410, which corresponds to the actual input voltage 2420, demonstrating the efficacy of the method and system discussed herein.

Figure 25:
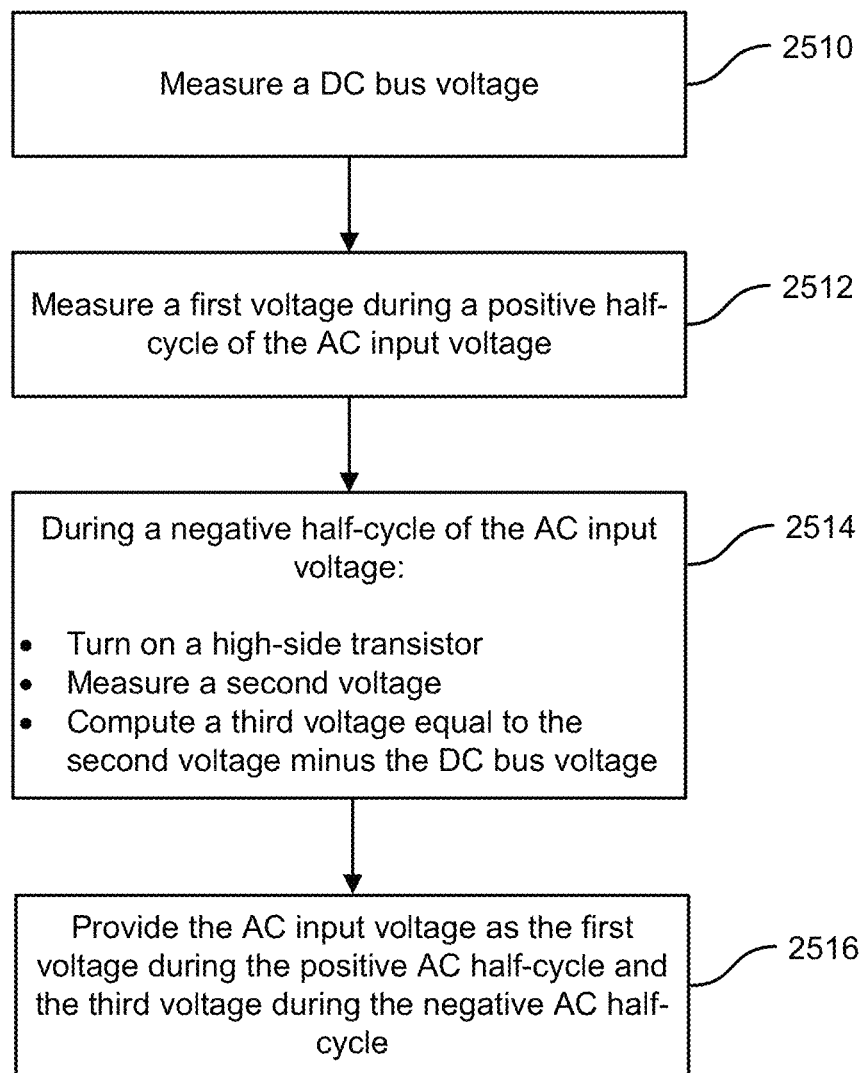
FIG. 25 is a simplified flowchart illustrating a method of measuring input voltage according to an embodiment of the present invention.

FIG. 25 is a simplified flowchart illustrating a method of measuring input voltage according to an embodiment of the present invention. The method 2500, which can be utilized to measure an AC input voltage at an input of a power converter, includes measuring a DC bus voltage corresponding to the power converter (2510). During a positive half-cycle of the AC input voltage, the method includes measuring a first voltage at the input of the power converter (2512). Measuring the voltage at the input of the power converter during the positive half-cycle of the AC input voltage can include measuring a voltage drop across a resistor in a voltage divider. The voltage divider can include a switch. In this case, the voltage drop is measured during a fraction of the half-cycle of the AC input voltage corresponding to the time that the switch is turned on. The first voltage can be positive during the positive half-cycle.

During a negative half-cycle of the AC input voltage, the method includes turning on a high-side switch, measuring a second voltage at the input of the power converter, and computing a third voltage equal to the second voltage minus the DC bus voltage (2514). The second voltage can be positive during the negative half-cycle. The method further includes providing the AC input voltage as the first voltage during the positive AC half-cycle and the third voltage during the negative AC half-cycle (2516).

In some embodiments, the power converter includes a first control/synchronous rectifier switch, a second control/synchronous rectifier switch, a low-side switch, and a high-side switch. As illustrated in FIG. 7, first switch S1 can be the first control/synchronous rectifier switch, second switch S2 can be the second control/synchronous rectifier switch, fourth switch S4 can be the low-side switch, and third switch S3 can be the high-side switch. During the positive half-cycle of the AC input voltage, current flows through the low-side switch (e.g., fourth switch S4). The low-side switch can be turned on during the positive half-cycle of the AC input voltage.

It should be appreciated that the specific steps illustrated in FIG. 25 provide a particular method of measuring input voltage according to an embodiment of the present invention. Other sequences of steps may also be performed according to alternative embodiments. For example, alternative embodiments of the present invention may perform the steps outlined above in a different order. Moreover, the individual steps illustrated in FIG. 25 may include multiple sub-steps that may be performed in various sequences as appropriate to the individual step. Furthermore, additional steps may be added or removed depending on the particular applications. One of ordinary skill in the art would recognize many variations, modifications, and alternatives.

Some embodiments of the present invention utilize zero-crossing detection as a component of the methods and systems described herein. For some implementations, the zero-crossing information is used to turn S3 ON. As shown in FIG. 24, when the input voltage is negative, there is no current path through R3/R4 if S3 is not ON. As discussed above, the input voltage may still be sensed during the positive AC half-cycle even without S4 (or S3) being ON, since D14 provides the necessary current path. As a result, positive input voltage can be measured if there is positive input voltage. If a negative input voltage is present and S3 and S4 are OFF, the measured voltage will be 0 V. During the zero-crossing, when the input voltage transitions from positive to negative, the input voltage can be directly sensed all the way to 0 V, while S4 is kept ON. S3 may be turned on whenever S4 is turned OFF, with S3 and S4 being operated as mutually exclusive switches. During the zero crossing when the input voltage transitions from negative to positive, the input voltage can be sensed indirectly using the arithmetic process discussed above all the way to 0 V, while S3 is kept ON.

Embodiments of the present invention enable the use of a guard-band near the AC zero crossing. The transitions may be operated as follows:

Positive to Negative Transition:
1) S4 is ON
2) Voltage decreases to a 'low' level (e.g., 3 V), while voltage is sensed 'accurately'
3) S4 is turned OFF
4) Input voltage can still be sensed via D14, albeit with a diode forward-drop error until an input voltage of less than the diode forward drop occurs (~0.7V). At input voltages lower than a diode drop (~0.7V), the input voltage is not typically sensed with S4 being OFF, and would appear to be ~0V. In other embodiments, the input voltage is sensed until a first threshold is reached, for example, a first threshold is on the order of 3 V.
5) System waits for some time after input voltage was 'assumed' lower than 0 V. This can be accomplished by sensing through D14 and employing a buffer time
6) When system assumes zero-crossing already occurred, S3 is turned on 'tentatively', i.e., only long enough to sample $V_{IN}$
7) If a negative voltage beyond a threshold was sensed/calculated, S3 can be turned on 'permanently', i.e., for the remainder of the AC half-cycle. Otherwise, the system may wait and repeat steps 6-7.

Negative-to-Positive Transition:
1) Voltage increases from negative to a low value greater than a threshold, and S3 is turned OFF
2) System waits until a positive voltage is sensed, which can be measured using D14, which is conducting, so the input voltage will be positive and greater than a diode drop
3) S4 is turned ON, and 'normal' $V_{IN}$ sensing can commence In another embodiment, a boot up phase can be implemented during which both S4 and S3 can be turned OFF and the input voltage can be measured to determine the timing of several positive AC half-cycles since the measured voltage will be positive during positive AC half-cycles and zero during negative AC half-cycles as a result of S3 being in the OFF state. This can aid in determining the AC input voltage frequency and amplitude, such that timing of future zero-crossings may be predicted, and the timing of alternatively operating S3 and S4 in the OFF/ON state can be determined and utilized, including being optimized. One of ordinary skill in the art would recognize many variations, modifications, and alternatives.

Embodiments of the present invention utilize the symmetry between input and bulk voltage sensing circuits as described below. The controller can utilize the bulk voltage sensing for the arithmetic. Any error in the bulk voltage sensing, compared to the input voltage sensing, gives rise to a greater error in sensed input voltage during the negative half-cycle vs. the positive AC half-cycle due to the asymmetric "direct" sensing during positive vs. the arithmetically derived (i.e., based on bulk voltage) sensing during the negative half-cycle. The controller is additionally using input- and bulk-voltage to derive the PWM signal used to control the switches, and it is beneficial to reduce or minimize any errors on each and the mismatch between both quantities. Therefore, symmetric/identical sensing circuits can be utilized for both $V_{IN}$ sensing and $V_{BULK}$ sensing using input voltage sense and IF circuit 2110 and bulk voltage sense and IF circuit 2210, respectively. As illustrated in FIGS. 21 and 22, R3/R4 and the S&H switch can be implemented using the same value/part number for both input voltage sense and IF circuit 2110 for $V_{IN}$ sensing and bulk voltage sense and IF circuit 2210 for $V_{BULK}$ sensing in order to reduce error in the voltage measurements.

One of ordinary skill in the art will recognize that not only is in-circuit calibration of input voltage (e.g., input voltage sense and IF circuit 2110) and bulk voltage (e.g., bulk voltage sense and IF circuit 2210) possible using embodiments of the present invention, but it is relatively simple using standard in-circuit calibration techniques (e.g., for ADCs, using gain and offset correction factors/adders). Calibration assists in further reduction of error terms on the individual and combined voltage sensing.

As will be evident to one of skill in the art, the use of the S&H switches will enable the voltage measurements to be turned off when not used in order to accomplish power savings. Thus, the resistive voltage divider, which consumes power during operation, will only be present in the circuit when voltage sampling is occurring. When sampling is not occurring, the S&H switches can, therefore, be used to prevent current flow through the resistive voltage divider and reduce the operating power.

The ability to determine the zero-crossing time is useful, not only in setting the timing for operating S3 and S4 in the ON/OFF modes, but also for determining the PIT time interval, which as described above, is used combination with the measured input voltage in operating S1/S2 as either a control switch or a synchronous rectifier switch during the positive and negative AC half-cycles. Accordingly, the ability to measure not only the zero-crossing timing, but the input voltage amplitude in both the positive and negative AC half-cycles, is useful in setting the pulse width for the synchronous rectifier switch signal $T_{SR}$. In addition the (constant) on-time (control switch conduction time) is a function of input voltage in a PFC circuit as discussed/determined previously herein.

In-circuit calibration at the time of manufacturing can be utilizing the fact that calibration can also be done for the arithmetically derived input voltage with negative input voltage.

A boost-converter may have several phases in order to distribute/share the current between multiple switching devices and inductors, such that the current amplitude, and therefore power losses, are lowered in each inductor and switch. Multiple interleaved phases have further benefits such as simpler/smaller EMI filtering, due to less input DM current, and lower switching frequency ripple current on the bulk capacitor. The additional switching-related losses of more switches can be somewhat mitigated in light-load conditions, when the currents are small enough that conduction losses do not dominate, by "phase-shedding". Phase-shedding is the method of disabling (stopping operation) one of the phases when load is light enough, and re-enabling it when load is heavier again.

In a conventional 2-phase interleaved boost PFC converter, Phase A and Phase B are controlled individually, with each having their own PWM signal generated by a PWM generator inside the controller. The converter works in CCM mode at fixed frequency, and the two phases are operated 180° apart resulting in a fixed time-delay of half the fixed frequency period between the two control switches.

In a conventional power factor correction controller, the phases each have individual current sense inputs (CSA and CSB), compensations/Current Amplifier Outputs (CAOA, CAOB) and PWM comparators (PWM1 and PWM2) leading to two individual Gate Driver outputs (GDA and GDB). The individually closed current loops for each phase enable the current to be shared appropriately between the two phases.

According to some embodiments of the present invention, a single PWM signal is generated using a single channel and this single PWM signal is replicated and distributed to the other channel(s) in the multi-phase system. Since the inductors in the various channels will have inductance values in a given tolerance range, the inventors have determined that timing errors introduced during the replication and distribution process will be low enough to enable acceptable system operation with sufficient current-sharing between phase legs. By using one control system for the phase associated with the PWM signal, system complexity and cost is reduced since separate control systems for each phase are not needed in these embodiments.

Figure 26:
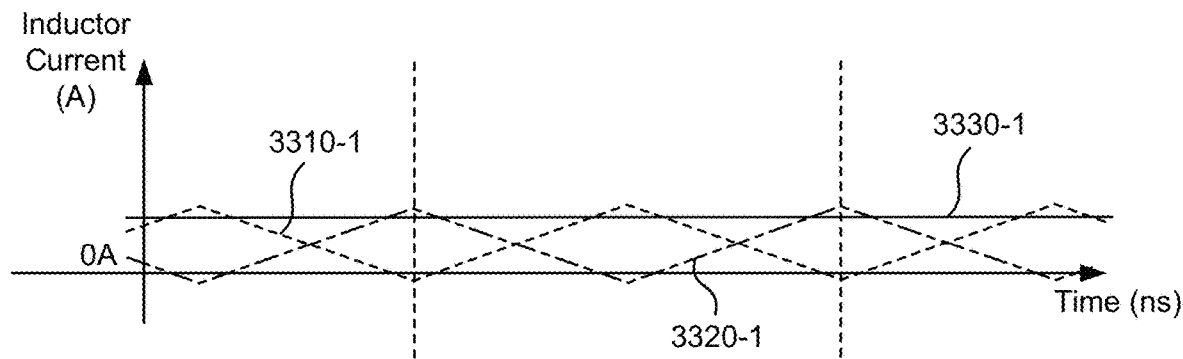
FIG. 26 is a plot illustrating inductor currents for two interleaved phases when the input voltage is approximately half of the bulk voltage and the resulting total input current.

FIG. 26 is a plot illustrating inductor currents for two interleaved phases when the input voltage is approximately half of the bulk voltage and the resulting total input current (3330-1). The inductor currents are shown for two interleaved phases when the input voltage is approximately ½ of the bulk voltage. Phase A inductor current is 3310-1, phase B inductor current is 3320-1. The sum of inductor currents is 3330-1 (i.e., input and bulk capacitor current). Perfect ripple cancellation is achieved with two phases and a 180° shift between phases.

Figure 27:
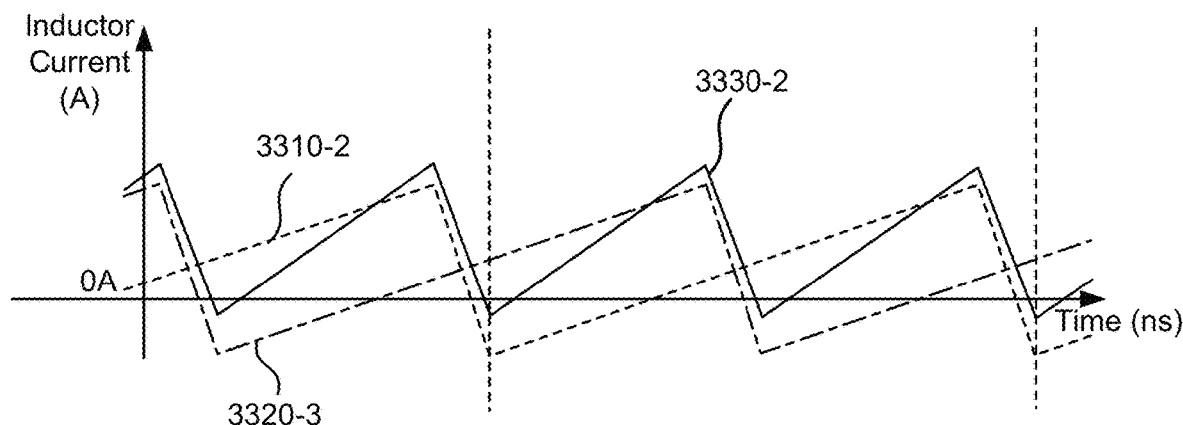
FIG. 27 is a plot illustrating partial current ripple cancellation when the input voltage is low compared to half of the bulk voltage.

FIG. 27 is a plot illustrating partial current ripple cancellation when the input voltage is low compared to half of the bulk voltage. As illustrated in FIG. 27, Phase A 3310-2 and Phase B 3320-2 are illustrated with the ripple associated with the sum 3330-2 being twice the switching frequency.

Figure 28:
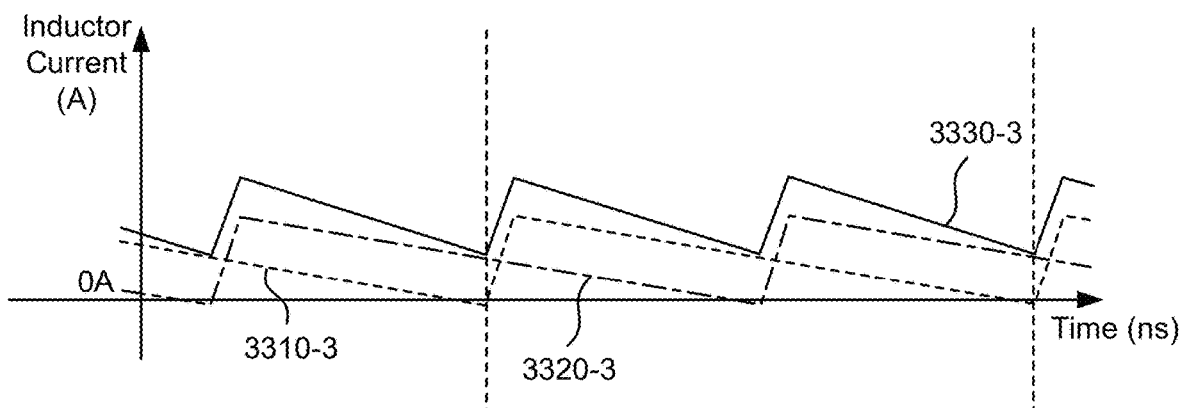
FIG. 28 is a plot illustrating partial current ripple cancellation when the input voltage is high compared to half of the bulk voltage.

FIG. 28 is a plot illustrating partial current ripple cancellation when the input voltage is high compared to half of the bulk voltage. In this case, Phase A 3310-3 and Phase B 3320-3 are illustrated with the ripple associated with the sum 3330-3 being reduced with respect to the values shown in FIG. 27.

Embodiments of the present invention utilize accurate timing between the PWM signals of the various phases. If the PWM signal timing is identical between the phases, except for an intentional phase-shift depending on the number of phases, then the current sharing 'error' between phases will be a function of the inductor value tolerance, which will generally be satisfactory for applications. If some timing error is present between the phases, the result will be a current inequality that can be controlled based on the inductor value tolerance and the maximum timing errors between copies of the PWM signal. The inventor has determined that for some applications, a timing error between phases less than the clock cycle time of the master clock of the digital circuit generating the PWM signal is suitable to achieve desired system performance. As an example, a timing error of less than 10 ns for a 100 MHz master clock, which also be expressed as a percentage of the PWM signal switching period, for example, 10 ns at 1 MHz is 1%. In other applications, a timing error between phases less than two clock cycle times of the master clock is suitable to achieve desired system performance, for example, 20 ns for a 100 MHz master clock, 3% corresponding to 10 ns for a 3 MHz switching period.

The inductor current in one phase may start 'wandering' more and more negative if there are slight voltage-drop differences between the magnetizing and demagnetizing loops (e.g. due to the Rds (ON) tolerance of the switches). Such errors may be limited by the design to not exceed a certain level such that the maximum 'wandering' stays below a desirable maximum value. Such inductor current 'wandering' will be reset (e.g., organically) at every AC zero-crossing.

If the PWM signal applied to each phase differs, the $T_{SR}$ can be shorter or longer in one phase with respect to the other phase(s). The consequence of the SR switch being on for too short a time period is hard-switching and, thereby, a significant increase in power dissipation. On the other hand, the consequence of the SR switch being on for too long is circulating current (i.e., input to output back to input), which causes additional conduction losses. However, these conduction losses are much less dramatic than hard-switching events. Therefore, in some embodiments of the present invention, some 'negative' inductor current is allowable, but not 'positive' inductor current. As a result, if there is error in one or more of the phases, this error results in the inductor current in one of the phases being too negative, but not too positive. In use, this results in the inductor current reaching 0 A and becoming negative as illustrated during the $T_{DT2}$ period in FIG. 7 for all phases. Hence, the 'master' PWM signal is generated with a $T_{SR}$ that is long enough to ensure CrCM for all phases. In other words, using the embodiments of the present invention described herein, the phase with the 'highest' minimum inductor current still does not enter "CCM" mode (i.e., hard switching in which the inductor does not fully demagnetize in every cycle). If combined with the fully digital control methods and systems described herein, in a two-phase implementation, the pulse-counting can be OR'ed for both phases, thereby comparing the total SP pulse count between both phases with the total TCM pulse count between both phases. Similar operating principles can be extended for three-phase (or more) systems. The control will thereby adapt to the number of phases being driven, even dynamically or during fault conditions.

Embodiments of the present invention utilize a single PWM signal generator to generate a single PWM signal including all four switching intervals as shown in FIG. 7 ($T_{CTRL}$, $T_{DT1}$, $T_{SR}$ and $T_{DT2}$) and then replicate or copy the PWM signal to each additional phase with the appropriate phase-shift (i.e., 360°/number of phases). Since the power converter described herein is fundamentally variable frequency, the phase-shifting is not necessarily simply a fixed (i.e., pre-programmed) time-shift based on a fixed switching frequency. Rather, the time-shift can be, and usually is, performed cycle-by-cycle to match the switching period $T_{SW}$ of that cycle. The present invention is also applicable to fixed frequency systems (i.e., either fully DCM or fully CCM or multi-mode) as well. The inventors have determined that an error in the phase-shifting or time-shifting is allowable despite the consequence that ripple-cancellation may be less than optimal.

Figure 29:
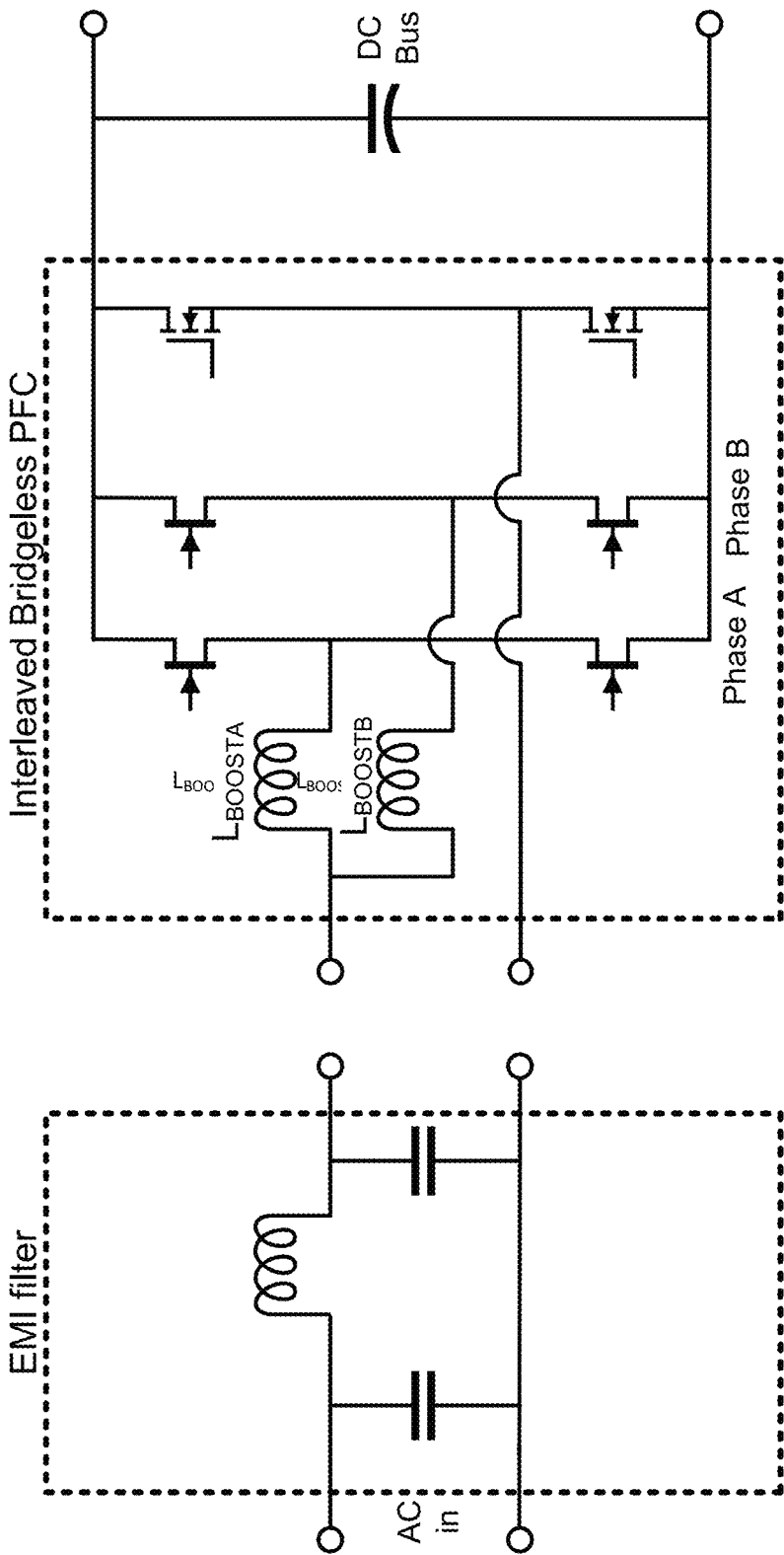
FIG. 29 is a simplified schematic diagram illustrating a two-phase interleaved bridgeless PFC circuit according to an embodiment of the present invention.

FIG. 29 is a simplified schematic diagram illustrating a two-phase interleaved bridgeless PFC circuit according to an embodiment of the present invention. In this circuit, two inductors $L_{BOOSTA}$ and $L_{BOOSTB}$ are connected to Phase A and Phase B respectively, which can be 180° out of phase.

An EMI filters is utilized to filter the AC input signal prior to inputs being provided to the two-phase interleaved bridgeless PFC circuit.

Figure 30:
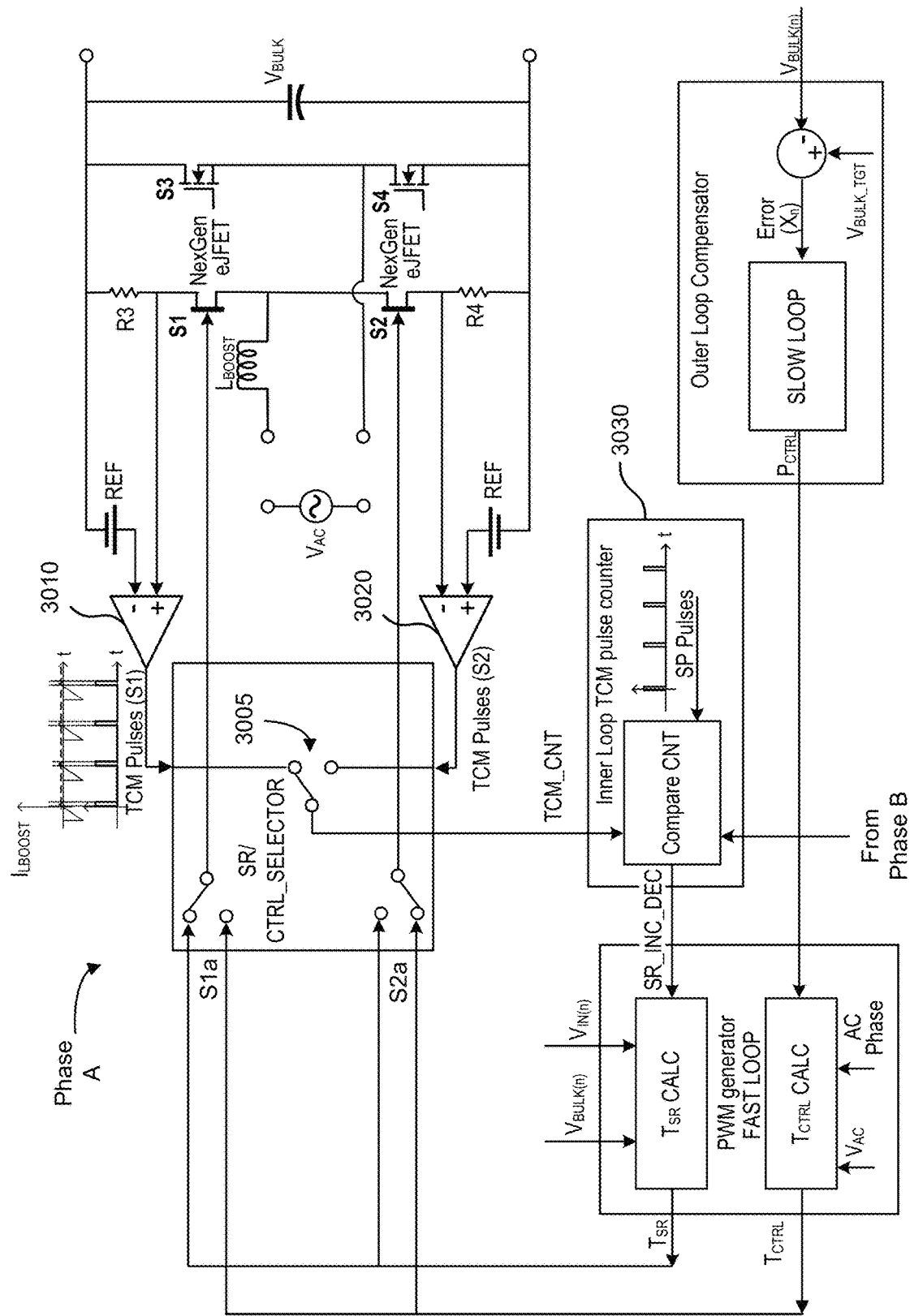
FIG. 30 is a simplified schematic diagram illustrating a control circuit for the two-phase interleaved PFC circuit illustrated in FIG. 29.

FIG. 30 is a simplified schematic diagram illustrating a control circuit for the two-phase interleaved PFC circuit illustrated in FIG. 29. In FIG. 30, a first phase is illustrated, sharing common components with the circuits illustrated in FIGS. 10A, 11A, 12A, 14, and 16. During operation, as discussed more fully herein, TCM pulses, which can be referred to as TCM compare-counter pulses, are generated by comparators 3010 and 3020 as MST_S1_PLS (labeled IBST_S1.INCR in FIG. 12A) and MST_S2_PLS. Depending on whether S1 or S2 is being utilized as the CrCM switch, switch 3005 is used to direct the TCM pulses to the Inner Loop TCM pulse counter 3030, which uses the SP pulse count and the TCM pulse count TCM_CNT to determine the difference between the SP pulse count and the TCM pulse count as discussed herein. In the example illustrated in FIG. 30, S1 is being utilized as the CrCM switch and TCM pulses from comparator 3010 are utilized to provide TCM_CNT accordingly.

Since two phases are in operation, a corresponding set of TCM pulses and SP pulses are received from the second phase as indicated by the second input (Phase B) and provided to Compare CNT in Inner Loop TCM pulse counter 3030. As an extension to the discussion of pulse counting and adjustment of $T_{SR}$ in FIGS. 20A and 20B, for two phases, the number of TCM pulses from both phases is compared to twice the number of SP pulses from each phase to determine the adjustment to $T_{SR}$. As illustrated in FIG. 30, Cycle_CNT would be increased by a factor of two for two phases in comparison with a single-phase system. In other embodiments, the Cycle-CNT can be determined by summing the number of SP pulses received from each phase. In FIG. 30, for two phases, and continuing with the four SP pulses illustrated in FIG. 8A, if four TCM pulses are received from Phase A and only two TCM pulses are received from Phase B, then the difference between the number of SP pulses for both phases and the total number of TCM pulses is two. This value greater than zero will result in $T_{SR}$ applied to each phase being increased until full demagnetization is accomplished. Thus, the method described in relation to FIG. 20A is utilized, with the SP pulses and the TCM pulses from each phase being summed in Compare CNT to provide the value computed at block 2012 of FIG. 20A. The output of Compare CNT is provided as SR_INC_DEC to $T_{SR}$ CALC, which then computes the updated $T_{SR}$. The updated $T_{SR}$ is then provided to the controller of both phases. As a result, the least negative phase will be driven more negative until the difference in the summed SP pulses and the summed TCM pulses is zero.

For a three-phase system, TCM pulses from Phase C would also be provided and summed with the TCM pulses from Phase A and Phase B before subtraction from the tripled value of the SP pulses. Thus, using embodiments of the present invention a single PWM signal generator can be utilized to providing CrCM timing signals to two or more phases, with the CrCM timing signals being shifted by the appropriate phase shift as appropriate. In contrast with conventional systems that would utilize a separate control system for each phase, embodiments of the present invention can utilize a single control system that receives the TCM pulses from multiple phases, compares the received TCM pulses to the number of SP pulses times the number of phases, and then utilizes the single control system to modify the $T_{CTRL}$ and $T_{SR}$ values, which are then provided to the individual phases. One of ordinary skill in the art would recognize many variations, modifications, and alternatives.

In case a phase is shut down, for example, due to phase shedding as a result of a light load or a fault condition, the system may be perturbed since ripple cancellation is lost and the processed power is halved, assuming the same $T_{CTRL}$ is maintained. This case will be similar for both systems including one loop and individual PWM signal per phase or a single loop and single PWM signal for all phases. In a purely digital system, this perturbation can be minimized or eliminated by allowing phase enabling/disabling during an AC zero crossing, but not within an AC half-cycle. If desired, the new $T_{CTRL}$ can be doubled/halved for the proceeding AC cycles during that AC zero crossing, i.e., when the $2^{nd}$ phase in a 2-phase interleaved system was enabled/disabled.

According to embodiments of the present invention, when a phase is disabled, $T_{SR}$ is simply based on the difference between the reduced total number of SP pulses, which is decreased as the number of phases decreases, and the number of TCM pulses. If only one phase is active, regardless of which phase is active, $T_{SR}$ is naturally optimal for that phase.

If the control scheme (e.g., CrCM operation) is based on pulse-counting of 'negative' inductor current(s) compared to the number of switching cycles, the switching cycle counts for all phases are simply added as are the TCM pulses. As described above, the SP pulses can be pulses indicating the $T_{CTRL}$ rising edge OR'ed together before counting the pulses and the TCM pulses can be the "CrCM" count of pulses indicating 'negative' inductor current for all phases OR'ed together. In this way, the control system described herein will naturally find a balance where the worst-case phase is moving in/out of hitting the current threshold, which is a negative threshold, or potentially zero, with the minimum inductor current for each cycle or bunch of cycles. Accordingly, the control system described herein is independent of the number of phases and will always determine the $T_{SR}$ pulse pattern ensuring CrCM for the worst-case phase. Although the inductor current for one phase may be more negative than other phases, the inventor has determined that the system tolerances are sufficient to provide desired system operation.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of measuring an AC input voltage at an input of a power converter, the method comprising:
    measuring a DC bus voltage corresponding to the power converter;
    during a positive AC half-cycle of the AC input voltage:
        measuring a first voltage at the input of the power converter;
    during a negative AC half-cycle of the AC input voltage:
        turning on a high-side switch;
        measuring a second voltage at the input of the power converter;
        computing a third voltage equal to the second voltage minus the DC bus voltage; and
    providing the AC input voltage as the first voltage during the positive AC half-cycle and the third voltage during the negative AC half-cycle.

2. The method of claim 1 wherein measuring the first voltage at the input of the power converter during the positive AC half-cycle of the AC input voltage comprises measuring a voltage drop across a resistor in a voltage divider.

3. The method of claim 2 wherein the AC input voltage is characterized by an AC period and the voltage divider includes a switch and the voltage drop is measured during a fraction of the AC period.

4. The method of claim 3 wherein the switch is a component of a sample and hold circuit operating at the fraction of the AC period.

5. The method of claim 1 wherein:
    the power converter includes a first control/synchronous rectifier switch, a second control/synchronous rectifier switch, a low-side switch, and a high-side switch; and
    current flows through the low-side switch during the positive AC half-cycle of the AC input voltage.

6. The method of claim 1 further comprising turning on a low-side switch during the positive AC half-cycle of the AC input voltage.

7. The method of claim 1 wherein the first voltage is positive during the positive AC half-cycle and the second voltage is positive during the negative AC half-cycle.

* * * * *